United States Patent [19]
Gregory et al.

[11] Patent Number: 5,937,190
[45] Date of Patent: *Aug. 10, 1999

[54] ARCHITECTURE AND METHODS FOR A HARDWARE DESCRIPTION LANGUAGE SOURCE LEVEL ANALYSIS AND DEBUGGING SYSTEM

[75] Inventors: Brent Gregory; Trinanjan Chatterjee; Jing C. Lin; Srinivas Raghvendra, all of Sunnyvale; Emil Girczyc, Los Altos; Paul Estrada, Mountain View; Andrew Seawright, Cupertino, all of Calif.

[73] Assignee: Synopsys, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/417,147

[22] Filed: Apr. 3, 1995

Related U.S. Application Data

[63] Continuation-in-part of application No. 08/253,470, Jun. 3, 1994, abandoned, which is a continuation-in-part of application No. 08/226,147, Apr. 12, 1994, abandoned.

[51] Int. Cl.$^6$ ........................................... G06F 9/45
[52] U.S. Cl. ............................................... 395/704
[58] Field of Search .................... 395/700, 705, 395/707, 704; 364/489, 490, 488, 491

[56] References Cited

U.S. PATENT DOCUMENTS

| | | | |
|---|---|---|---|
| 4,546,435 | 10/1985 | Herbert et al. | 395/705 |
| 4,667,290 | 5/1987 | Goss et al. | 395/707 |
| 4,703,435 | 10/1987 | Darringer et al. | 364/489 |
| 4,827,427 | 5/1989 | Hyduke | 364/489 |
| 4,852,173 | 7/1989 | Bahl et al. | 704/240 |
| 4,866,663 | 9/1989 | Griffin | 395/500 |
| 4,868,770 | 9/1989 | Smith et al. | 364/578 |
| 4,882,690 | 11/1989 | Shinsha et al. | 364/490 |
| 4,907,180 | 3/1990 | Smith | 364/578 |
| 4,942,536 | 7/1990 | Watanable et al. | 364/490 |
| 4,942,615 | 7/1990 | Hirose | 364/578 |
| 4,967,386 | 10/1990 | Maeda et al. | 364/578 |
| 4,970,664 | 11/1990 | Kaiser et al. | 345/346 |

(List continued on next page.)

OTHER PUBLICATIONS

"7A Programming the User Interface," Manual of Symbolics, Inc., 4 New England Tech Center, 555 Virginia Road, Concord, MA 01742, title page, pp. iii–v and pp. 1–134, Sep. 1986.

Design Analyzer Reference, "Text Viewer," V.3.1, Mar. 1994.

Louis Trevillyan, "An Overview of Logic Synthesis Systems," 1987, pp. 166–172.

Timothy Kam, et al., "Comparing Layouts with HDL Models: A Formal Verification Technique," 1992, pp. 588–591.

Brian Ebert et al., "SeeSaw: A Verilog Synthesis Viewer," pp. 55–60, 2nd Annual International Verilog HDL Conference, Design Excellence for Today and Tomorrow; Santa Clara, CA, Mar. 22–24, 1993, sponsored by Open Verilog, Int.

D. E. Thomas et al., "Algorithmic and Register–Transfer Level Synthesis: The System Architect's Workbench," pp. 257–274, publication date unknown.

(List continued on next page.)

*Primary Examiner*—Tariq R. Hafiz
*Assistant Examiner*—Peter J. Corcoran, III
*Attorney, Agent, or Firm*—Jonathan T. Kaplan; McDermott, Will & Emery

[57] ABSTRACT

A digital circuit is synthesized from a text description of a digital system. During synthesis, a parse tree with parse nodes is constructed and retained. The relationship between the parse nodes and the circuit elements synthesized from those parse nodes is retained. Using that relationship, analysis results associated with circuit elements can be related to the text that generated those circuit elements. In particular, the analysis results can be used to set the display characteristics, such as font or size, of the text associated with those results.

65 Claims, 61 Drawing Sheets

U.S. PATENT DOCUMENTS

| | | | |
|---|---|---|---|
| 5,111,413 | 5/1992 | Lazansky et al. | 364/578 |
| 5,146,583 | 9/1992 | Matsunaka et al. | 395/500 |
| 5,191,541 | 3/1993 | Landman et al. | 364/489 |
| 5,191,646 | 3/1993 | Naito et al. | 345/349 |
| 5,265,254 | 11/1993 | Blasciak et al. | 395/704 |
| 5,282,146 | 1/1994 | Aihara et al. | 364/489 |
| 5,282,148 | 1/1994 | Poirot et al. | 364/491 |
| 5,329,471 | 7/1994 | Swoboda et al. | 364/578 |
| 5,335,191 | 8/1994 | Kundert et al. | 364/578 |
| 5,377,997 | 1/1995 | Wilden et al. | 463/43 |
| 5,437,037 | 7/1995 | Furuichi | 395/707 |
| 5,446,900 | 8/1995 | Kimelman | 395/700 |
| 5,452,239 | 9/1995 | Dai et al. | 364/578 |
| 5,541,849 | 7/1996 | Rostoker et al. | 364/489 |
| 5,544,066 | 8/1996 | Rostoker et al. | 364/489 |
| 5,544,067 | 8/1996 | Rostoker et al. | 364/489 |
| 5,544,068 | 8/1996 | Takimoto et al. | 364/489 |
| 5,553,002 | 9/1996 | Dangelo et al. | 364/489 |
| 5,555,201 | 9/1996 | Dangelo et al. | 364/489 |
| 5,557,531 | 9/1996 | Rostoker et al. | 364/489 |

OTHER PUBLICATIONS

Pure Software Inc., Pure Coverage Data Sheet (Web Page), copyright 1996.

Pure Software Inc., Quantify Data Sheet (Web Page), copyright 1996.

Pure Software Inc., Purify, Finding Run–Time Memory Errors (Web Page), copyright 1996.

Reed Hastings et al., Pure Software, Inc., Purify, Usenix White Paper on Purify (Web Page), copyright 1996.

Printout of Web Page for Centerline, Code Center, Release 4, Nov. 1994.

HDC Computer Corporation, FirstApps User's Guide, pp. 112–116, copyright 1992.

Joseph S. Lis et al., VHDL Synthesis Using Structured Modeling, pp. 606–609; 26th ACM/IEEE Design Automation Conference©; Las Vegas Convention Center, Jun. 25, 1989, Proceedings 1989.

Sougata Mukherjea et al., Applying Algorothm Animation Techniques for Program Tracing, Debugging, and Understanding; Proceedings 15th International Conference on Software Engineering, May 17, 1993, Baltimore, MD, pp. 456–465.

Weiss, Ray, "ASIC's forcing logic synthesis' hand," Electronic Engineering Times, n516, T16 (pp. 1–2), Dec. 12, 1988.

Weiss, Ray, "Designers moving toward high–level logic representation via logic synthesis—Logic synthesis edging up design hierarchy," Electronic Engineering Times, n526, 81 (pp. 1–10), Feb. 6, 1989.

Weiss, Ray, "Synopsys fine–tunes logic synthesis," Electronic Engineering Times, n534, 138 (pp. 1–3), Apr. 17, 1989.

| i | f | | ( | C | | a | n | d | | B | ) | | t | h | e | n |

| \n | \t | Z | | < | = | | n | o | t | ( | A | | o | r | | B | ) | | ; |

| \n | e | l | s | e |

| \n | \t | Z | | < | = | | n | o | t | | B | ; | \n | e | n | d | | i | f | | ; |

```
if (C and B) then
    Z <= not( A or B)
        -- Synopsys probe_statement
    ;
else
    Z <= not B ;
end if ;
```

```
if ( C and B) then
      -- Synopsys block_probe_begin
      Z <= not (A or B) ;
      Y <= B and D ;
      -- Synopsys block_probe_end
else
      Z <= not B ;
      Y <= B or D ;
end if ;
```

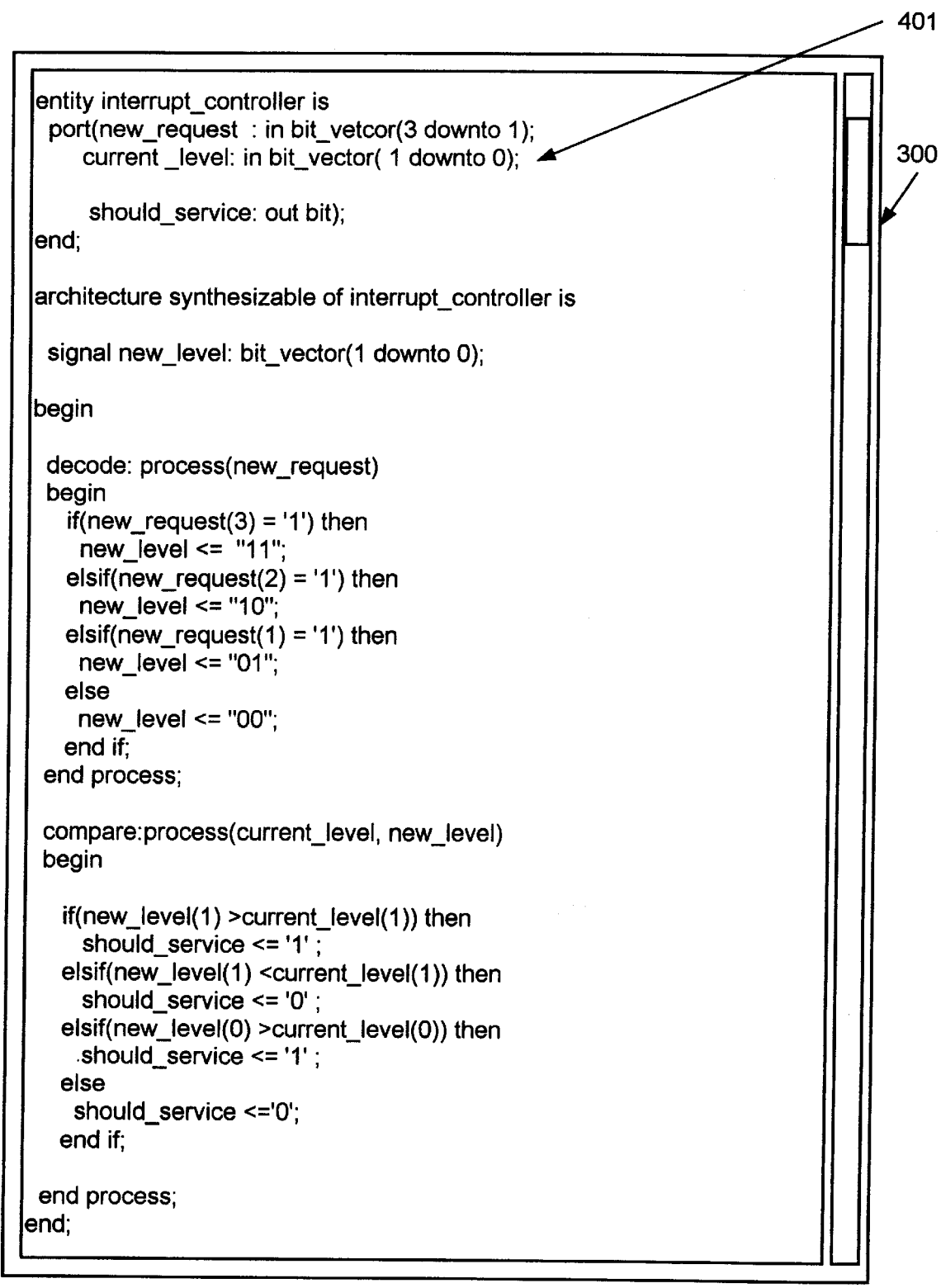

```
entity interrupt_controller is
  port(new_request : in bit_vetcor(3 downto 1);
    current_level: in bit_vector( 1 downto 0);

should_service: out bit);
end;

architecture synthesizable of interrupt_controller is signal new_level: bit_vector(1 downto 0);

begin decode: process(new_request)
  begin
    if(new_request(3) = '1') then
      new_level <= "11";
    elsif(new_request(2) = '1') then
      new_level <= "10";
    elsif(new_request(1) = '1') then
      new_level <= "01";
    else
      new_level <= "00";
    end if;
  end process;

compare:process(current_level, new_level)
  begin if(new_level(1) >current_level(1)) then
      should_service <= '1' ;
    elsif(new_level(1) <current_level(1)) then
      should_service <= '0' ;
    elsif(new_level(0) >current_level(0)) then
      should_service <= '1' ;
    else
      should_service <='0';
    end if;

end process;
end;
```

Figure 32

| | TIME | AREA |
|---|---|---|
| entity interrupt_controller is<br>  port(new_request : in bit_vector(3 downto 1);<br>    current _level: in bit_vector(1 downto 0);<br><br>    should_service: out bit);<br>end;<br><br>architecture synthesizable of interrupt_controller is<br><br>  signal new_level: bit_vector(1 downto 0);<br><br>begin | 21 ns | 9 gates |
|   decode: process(new_request)<br>  begin<br>    if(new_request(3) = '1') then<br>      new_level <= "11";<br>    elsif(new_request(2) = '1') then<br>      new_level <= "10";<br>    elsif(new_request(1) = '1') then<br>      new_level <= "01";<br>    else<br>      new_level <= "00";<br>    end if;<br>  end process; | ? | ? |
|   compare:process(current_level, new_level)<br>  begin<br><br>    if(new_level(1) >current_level(1)) then<br>      should_service <= '1';<br>    elsif(new_level(1) <current_level(1)) then<br>      should_service <= '0';<br>    elsif(new_level(0) >current_level(0)) then<br>      should_service <= '1';<br>    else<br>      should_service <= '0';<br>    end if;<br><br>  end process;<br>end; | ? | ? |

Figure 35

```
entity interrupt_controller is
  port(new_request : in bit_vector(3 downto 1);
    current_level: in bit_vector(1 downto 0);

should_service: out bit);
end;

architecture synthesizable of interrupt_controller is signal new_level: bit_vector(1 downto 0);

begin
  --Synopsys block_probe_begin
  decode: process(new_request)
  begin
    if(new_request(3) = '1') then
      new_level <= "11";
    elsif(new_request(2) = '1') then
      new_level <= "10";
    elsif(new_request(1) = '1') then
      new_level <= "01";
    else
      new_level <= "00";
    end if;
  end process:
  --Synopsys block_probe_end compare: process(current_level,new_level)
  begin if(new_level(1) > current_level(1)) then
      should_service <= '1';
    elsif(new_level(1) < current_level(1)) then
      should_service <= '0';
    elsif(new_level(0) > current_level(0)) then
      should_service <= '1';
    else
      should_service <= '0';
    end if;
  end process;
end;
```

Figure 36

| | TIME | AREA |
|---|---|---|
| entity interrupt_controller is<br>  port(new_request : in bit_vector(3 downto 1);<br>    current_level: in bit_vector(1 downto 0);<br><br>    should_service: out bit);<br>end;<br><br>architecture synthesizable of interrupt_controller is<br><br>  signal new_level: bit_vector(1 downto 0);<br><br>begin<br><br>  --Synopsys block_probe_begin  ← 4750<br>  decode: process(new_request)<br>  begin<br>    if(new_request(3) = '1') then<br>      new_level <= "11";<br>    elsif(new_request(2) = '1') then<br>      new_level <= "10";<br>    elsif(new_request(1) = '1') then<br>      new_level <= "01";<br>    else<br>      new_level <= "00";<br>    end if;  ← 4720<br>  end process:<br>  --Synopsys block_probe_end | 9 ns | 5 gates |
| compare: process(current_level,new_level)<br>begin<br><br>  if(new_level(1) > current_level(1)) then<br>    should_service <= '1';<br>  elsif(new_level(1) < current_level(1)) then<br>    should_service <= '0';<br>  elsif(new_level(0) > current_level(0)) then<br>    should_service <= '1';<br>  else<br>    should_service <= '0';<br>    end if;<br>  end process;<br>end; | 15 ns | 6 gates |

```
entity interrupt_controller is
  port(new_request : in bit_vector(3 downto 1);
    current_level: in bit_vector(1 downto 0);

should_service: out bit);
end;

architecture synthesizable of interrupt_controller is signal new_level: bit_vector(1 downto 0);

begin decode: process(new_request)
  begin
    if(new_request(3) = '1') then
      new_level <= "11";
    eisif(new_request(2) = '1') then
      new_level <= "10";
    eisif(new request(1) = '1') then
      new_level <= "01";
    else
      new_level <= "00";
    end if;
  end process;

compare:process(current_level_new_level)
  begin if(new_level(1) > current_level(1)) then
      should_service <= '1';
    eisif(new_level(1) < current_level(1)) then
      should_service <= '0';
    eisif(new_level(0) > current_level (0)) then
      should_service <= '1';
    else
      should_service <= '0';
    end if;

end process;
end;
```

Figure 53

```
entity interrupt_controller is
  port(new_request : in bit_vector(3 downto 1);
    current_level: in bit_vector(1 downto 0);

should_service: out bit);
end;

architecture synthesizable of interrupt_controller is signal new_level: bit_vector(1 downto 0);

begin decode: process(new_request)
  begin
    if(new_request(3) = '1') then
      new_level <= "11";
    eisif(new_request(2) = '1') then
      new_level <= "10";
    eisif(new request(1) = '1') then
      new_level <= "01";
    else
      new_level <= "00";
    end if;
  end process;

compare:process(current_level_new_level)
  begin if(new_level(1) > current_level(1)) then
      should_service <= '1';
    eisif(new_level(1) < current_level(1)) then
      should_service <= '0';
    eisif(new_level(0) > current_level (0)) then
      should_service <= '1';
    else
      should_service <= '0';
    end if;

end process;
end;
```

```
HDL Browser 1 - .../hadv_beta/2910/vhdl/src/core.vhd
File   Browse   Data   View   Window   Help

[OPEN FILE...] [PREV FILE] [NEXT FILE] [FOLLOW SELECTED] [FIND SELECTED] [FIND TEXT] [FIND DECLAR.] [PUSH IN] [POP OUT] [EXIT]
```

| Component Count | Comp Cnt |
|---|---|
|     CLOCK      : In    std_logic; | 0 |
|     D_IN       : In    ADDRESS; | 0 |
|     OPS        : In    UPC_OPS; | 0 |
|     UPC_DATA  : OUT ADDRESS ); | 0 |
| end component; | |
| | |
| component REGCNT | 0 |
|   Port ( CLOCK    : In    std_logic; | 0 |
|          LOAD     : In    std_logic; | 0 |
|          D_IN     : In    ADDRESS; | 0 |
|          OPS      : In    REG_OPS; | 0 |
|          REG_DATA : Out  ADDRESS; | 0 |
|          ZERO     : Out  std_logic ); | 0 |
| end component; | |
| | |
| begin | |
| | |
|   MUX_OUT_BLK : MUX_OUT | 124 |
|     Port Map ( ENABLE=>OE, DATA_OUT=>Y , DATA=>D, REG_D. | 0 |
| 5910          SEL=>MUX_CNTL, STK_DATA=>STACK_DATA, UPC | 0 |
|            MUX_OUT=>MUX_DATA ); | 0 |
| STACK_BLK : STACK | 1978 |
|     Port Map ( C LOCK=>CLOCK, D_IN=>PC , OPS=>STACK_CNTL, | 0 |
|            STK_DATA=>STACK_DATA, FULL=>FULL ); | 0 |
| CNTL_BLK : CONTROL | 119 |
|     Port Map ( ZERO=>ZERO, COND_CODE=>CC, COND_CODE_ENA | 0 |
|          INST=>I , REG_CNTL=>REG_CNTL , MAP_BAR=>PR | |
|          MUX_CNTL=>MUX_CNTL , PL_BAR=>PL , STK_CNTL | |
|          UPC_CNTL=>UPC_CNTL, VECT_BAR=>VECT ); | |
| UPC_BLK : UPC | 194 |
|     Port Map ( CIN=>CIN, CLOCK=>CLOCK , D_IN=>MUX_DATA, | 0 |
|          OPS=>UPC_CNTL, UPC_DATA=>PC ); | 0 |
| REG_BLK : REGCNT | 294 |
|     Port Map ( CLOCK=>CLOCK , D_IN=>D, LOAD=>RLD, OPS=>R | 0 |
|          REG_DATA=>REG_DATA, ZERO=>ZERO ); | 0 |
| | |
| end SCHEMATIC; | 0 |

Show the Profiler window

Figure 57

ARCHITECTURE AND METHODS FOR A HARDWARE DESCRIPTION LANGUAGE SOURCE LEVEL ANALYSIS AND DEBUGGING SYSTEM

RELATED APPLICATIONS

This application is a continuation in part of U.S. application Ser. No. 08/253,470, now abandoned, by Gregory et al, filed on Jun. 3, 1994 which is a continuation-in-part of U.S. application Ser. No. 08/226,147 by Gregory et al, filed on Apr. 12, 1994, now abandoned.

BACKGROUND OF THE INVENTION

1. Field of the Invention

This invention relates to the field of computer aided design for digital circuits, and particularly to analyzing and debugging digital circuits constructed from HDL source text using logic or behavioral synthesis.

2. Statement of the Related Art

A digital circuit designer needs to ensure that the digital circuit performs the correct function subject to many design constraints. For example, the digital circuit should perform the correct computation in the proper amount of time. The area that the digital circuit occupies on a semiconductor die should remain within certain bounds. The power that the digital circuit consumes while operating should also remain within specified bounds. To be economically manufacturable, the digital circuit should be testable. An economically useful digital circuit should not take too long to design, manufacture, test or use.

The digital circuit design process typically involves translating the designer's sometimes incipient thoughts about the function and constraints into the tooling necessary to produce a working digital circuit. For example, producing a full-custom semiconductor chip requires producing masks that define the deposition of chemicals into a substrate as well as producing test patterns that exercise the final product. As another example of tooling, producing a field programmable gate array requires generating the bit pattern to be downloaded into the chip to specify the configuration of the architecture. Computer Aided Design (CAD) tools facilitate the iterative translation of the designer's developing thoughts into the tooling required to produce a working digital circuit that satisfies the design constraints. The process of iteratively adjusting a design to meet its constraints is called debugging. The process of identifying various properties of different parts of a digital circuit is called analysis. In order to debug a digital circuit, the designer must first analyze the circuit to ascertain where problems occur.

The typical historical model of the digital design process using conventional CAD tools for a semiconductor chip is as follows. The designer first conceives of a particular function to implement, as well as constraints such as timing or area that the implementation must meet. Next, historically, the designer mentally transforms the desired function into a high level generic technology circuit consisting of components such as gates, adders, registers and RAMs.

The designer then chooses a technology provided by a semiconductor vendor from which the circuit components will be chosen. The process of choosing circuit components from a specific technology is called mapping; mapping creates a mapped circuit. To map a circuit, the designer draws a schematic of a mapped circuit that implements the desired function with a CAD schematic capture tool. The mapped circuit includes parts from a software representation of a specific technology library which is supplied by a silicon vendor. The schematic shows how more primitive functional elements, such as gates or transistors, connect together to form more sophisticated functions such as arithmetic logic units. In addition, modern schematic capture tools allow the designer to divide the design hierarchically into interconnected pieces, and then allow the user to specify the details of each of the pieces separately. For example, Design Architect by Mentor Graphics of Wilsonville, Oreg. provides these schematic capture functions.

Conventional CAD tools, such as those indicated above, can then take the connections in the schematic and other information to evaluate the mapped circuit and to specify the tooling necessary to construct the circuit. Such tools evaluate the mapped circuit in many ways. For example, commercial CAD tools often have a simulator that predicts the response of the mapped circuit to designer specified input patterns. QuickSim II by Mentor Graphics of Wilsonville, Oreg. is a commonly used simulator. Another common CAD tool is a path delay analyzer that identifies the longest timing path in a mapped circuit design. DesignTime by Synopsys, Inc. of Mountain View, Calif. is a tool that provides path delay analysis.

There are conventional CAD tools that have the ability to generate the geometric layout of the digital circuit with layout tools. Cell3 Ensemble by Cadence of San Jose, Calif. is an example of this type of tool. Layout tools are required to produce masks to make a semiconductor chip.

There are conventional CAD tools that have the ability to check that the digital circuit meets the design rules, and to identify the location of any errors to the designer. Design rules help ensure that the specified digital circuit will operate once manufactured.

There are conventional CAD tools that are used to determine how testable a mapped circuit is, and to generate test patterns automatically. Showing the designer the parts of the mapped circuit that are not testable allows the designer to make modifications that will increase the probability of making a successful chip or circuit. Generating test patterns automatically allows for more thorough testing of the digital circuit immediately after manufacturing.

As described above, the concept of analyzing a mapped circuit design historically refers to the process by which a digital circuit designer specified a particular implementation with a schematic capture tool, and then used various circuit evaluation tools to verify that the implementation did what the digital circuit designer wanted. For example, the designer would use a simulator to determine if the mapped circuit produced appropriate outputs from specified inputs. The designer could use the path delay analyzer to determine whether the current design was fast enough to meet the timing constraints. The layout tools could inform the designer whether the design meets the area constraints.

When a particular design did not meet the designer's constraints, the designer then modified the design. For example, if the mapped circuit was too slow, the designer identified the part of the mapped circuit that was too slow, and revised it to increase performance. If the mapped circuit was too large, then the designer revised the mapped circuit to use fewer or smaller components. If the mapped circuit did not behave as required, the designer changed the components and the interconnections to produce the correct function. Because the conventional CAD tools began the analysis with the mapped circuit, the timing or area problems could be readily identified to the designer. Because the designer specified the structure of the mapped circuit, the designer could thoughtfully make adjustments. However, the CAD tools were limited in their ability to identify functional problems because the designer had mentally performed the transformation from desired function to mapped circuit. In other words the CAD tools included structural information about the digital circuit, but did not include data concerning the high level functionality of the digital circuit.

Logic synthesis was developed to provide the designer with an automatic mechanism to translate a hardware description language (HDL) description of a desired function to a structural description of a digital circuit that performed the desired function. Logic synthesis begins with the designer describing the desired function using VHDL, Verilog, or any other logic synthesis source language, to specify the behavior. This allows the designer to specify the digital circuit at a higher level, and allows the CAD tools to assist the designer in defining the functionality of the digital circuit. A software translator then converts that description into generic technology structures that directly correspond statement by statement with the designer's description.

In logic synthesis, translation is followed by logic optimization. Optimization involves two steps. First, it replaces the directly translated structure with a functionally equivalent, yet improved structure. Second, the optimization process includes an optional step called mapping the design. Mapping replaces the generic technology structures with structures from a specific technology library. Technology libraries are provided by silicon vendors to specify the types of parts which the vendor can manufacture. Technology libraries include specific information regarding the functionality and physical characteristics such as area and delay of gates which can be built by the silicon vendor. Technology libraries are designed to work with synthesis systems. A synthesis system can use a technology library to choose available gates from which the silicon vendor can fabricate the digital circuit.

Unfortunately, the transformations performed by the logic optimizer usually modify the structure that was present in the pre-optimization circuit. This results in a mapped circuit that is not easily recognized by the designer. The fact that the designer generally can not readily recognize the original function performed by the mapped circuit makes analyzing optimized mapped circuits difficult. Conventional evaluation tools can determine the timing or area problems in the mapped circuit, but the designer often can not relate those problems easily to the HDL source specification. Theoretically, the designer could manually determine what part of the HDL specification caused the problem. With that insight, the designer could make the desired changes at the HDL specification, and resynthesize the entire digital circuit. If the designer's problem occurred in a part of the mapped circuit that passed through the optimizer with few changes, manual backtracking might work. However, the optimization process generally makes many changes, making it either difficult or impossible to backtrack because many points in the original generic technology circuit do not exist in the mapped circuit.

Furthermore, the level of circuit improvement produced by logic optimization is not consistent. Due to the computational complexity of the optimization problem, optimizers must rely upon approximate, rather than optimal algorithms. The effect of the optimizer is, in some senses, random, because a slightly different initial circuit can significantly affect the choices that the optimizer makes. Therefore, it is impossible to predict consistently the percentage improvement that the optimizer will deliver. A small change in the HDL specification may result not only in a substantially different mapped circuit, but may also result in a mapped circuit which is substantially larger or slower.

As one possible solution, the designer can directly modify the mapped circuit produced by the synthesis software. However, this does not allow the designer to resynthesize the design from the HDL specification because the designer's logic changes is overwritten by subsequent translation and optimization steps. This reduces the value gained by using the synthesis approach to design.

One prior system which attempted to link HDL source text to generic technology and mapped circuits was "Source to Gates" which is included as a feature of Design Analyzer by Synopsys Inc., located in Mountain View, Calif. Source to Gates allowed the designer to trace between HDL source and schematics. Source to Gates did not prove useful because its ability to trace post synthesis mapped structures to the HDL source was limited to optimization invariant circuit structures that were present in the HDL source. Although Source to Gates did allow the designer to trace between schematics of the generic technology circuit and the HDL source, this feature was not particularly useful because it required viewing of the generic technology circuit which was not directly meaningful to the designer and no analysis link to the source was provided.

An additional limitation of Source to Gates is that it stores text location in terms of row and column numbers. Thus, when tracing from a schematic to HDL text, Source to Gates only hilights the first character of the appropriate parse node. There is no indication of the range of the parse node. There are two modes in Source to Gates when tracing from text to the schematic. Exact match mode forces the user to place the cursor on the first character of a parse node in order to enable tracing to the schematic. Closest match mode searches forwards and backwards in the text to find the closest traceable character. In this mode, the user does not know exactly what will be traced.

Another method for minimizing the backtracking problem in the analysis of an optimized mapped circuit is to partition the design into hierarchical components, and translate and optimize the smaller pieces. Because the translation and optimization tools generally do not traverse primary inputs and outputs, the HDL description can be correlated with a particular resulting mapped sub-circuit, thus reducing the size of the backtracking problem. However, repartitioning has the disadvantage that the designer may have to rewrite functionally correct, but nonetheless problematic, HDL source code to isolate the troublesome parts of the mapped circuit. In addition, this approach will greatly limit the optimizer's ability to reduce the area and increase the speed of the resulting circuits because the optimizer will be constrained by the designer's partition.

In addition, it is possible for a designer to be mislead by the results obtained by analysis by partitioning. The designer's bug in the circuit might be that it is too slow or too big. Partitioning the HDL source to locate the cause will likely result in a different circuit than the unpartitioned source. Therefore, the problem that the designer is chasing may be affected by the analysis process itself.

Conventionally, using a synthesizer to transform an HDL source specification into a mapped circuit can also cause substantial computational problems if one needs to incorporate minor changes into a design late in the design process. For example, a designer could have the design fairly close to completion when the designer discovers the need to make a small functional change, such as inverting a particular signal. Intuitively, one would expect that such a small change would require only a small change in the digital circuit all the way to the layout level. However, it is quite possible that, with conventional translation and optimization tools, a small change could require substantial changes in the mapped circuit and the circuit layout. With current tools, a designer can often limit this kind of problem by partitioning the design into smaller pieces and thus limiting the effect to the directly implicated pieces. However, as described previously, inappropriate or unduly narrow partitioning can limit the ability of the optimization tools to construct a mapped circuit which meets the design constraints.

A CONVENTIONAL DESIGN AND DEBUGGING PROCESS OVERVIEW

FIG. 1 shows an overview of the conventional process for designing, analyzing, and debugging digital circuits specified with a Hardware Description Language (HDL). The process begins with the designer writing HDL source code 100. A typical language used for specifying digital circuits is VHDL which is described in the IEEE Standard VHDL Language Reference Manual available from the Institute of Electrical and Electronic Engineers in Piscataway, N.J., which is hereby incorporated by reference. VHDL stands for Very high speed integrated circuit Hardware Description Language. Another language used for specifying digital circuits is Verilog that is described in Hardware Modeling with Verilog HDL by Eliezer Sternheim, Rajvir Singh, and Yatin Trivedi, published by Automata Publishing Company, Palo Alto, Calif., 1990, which is hereby incorporated by reference. Verilog is also described in the Verilog Hardware Description Language Reference Manual (LRM), version 1.0, November 1991, which is published by Open Verilog International, and is hereby incorporated by reference. The examples used in this document are in VHDL, but the principles readily apply to other circuit specification languages.

After writing a HDL description of a desired function, the designer then simulates the function 101 embedded in the description with a HDL simulator. An example of a functional simulator is VHDL System Simulator that is available from Synopsys, Inc. of Mountain View, Calif. The functional simulator allows the designer to determine whether the circuit produces correct values in response to inputs without regard to timing, area or power constraints. A functional simulator can perform function-only simulation relatively quickly, thus enabling the designer to determine that the circuit will produce the desired output.

If there is a problem with the function, the designer can fix function problems 102 by examining the simulation output and going back to writing HDL code 100. Functional simulation executes the source specification directly without generating generic technology or mapped circuits. Therefore, problems identified during functional simulation can readily be linked to their cause in the HDL source.

If the designer believes that the digital circuit described by the HDL source provides the correct function, the designer specifies constraints for the synthesis process 103, e.g. maximum clocking periods, total circuit area, and maximum power. This part of the process is described in Design Compiler Family Reference Manual, Version 3.1a, which is available from Synopsys, Inc. of Mountain View, Calif. and is hereby incorporated by reference. Examples of Computer Aided Design software that use constraint specification are Synergy by Cadence, and Autologic by Mentor Graphics, and Design Compiler by Synopsys.

After developing constraints, the designer then proceeds to synthesize 104 a mapped circuit from the HDL description produced in the writing HDL 100 step. This step involves translating the HDL source description into an initial generic technology circuit that corresponds directly with the statements in the source HDL. An example of software that performs this function is described in the VHDL Compiler Reference Manual, Version 3.1a, which is available from Synopsys, and is hereby incorporated by reference. After translation, the initial generic technology circuit is then optimized into a mapped circuit that meets the performance constraints established in step 103. Prior to optimization, it is a straight-forward task to identify which element of the initial generic technology circuit corresponds to what part of the HDL source code. Conventionally, because of the extensive manipulations performed during the optimization process, such identification after optimization becomes almost impossible except at registers and module interface boundaries.

FIG. 2 shows the intermediate data structures involved in the synthesis process 104. The synthesis process begins with HDL source 900. The translator creates a data structure called a parse tree 901 that represents the organizational structure of the HDL. The translator then turns the parse tree into an initial generic technology circuit 902. Russ B. Segal's Master's Thesis, "BDSYN: Logic Design Translator" at the University of California at Berkeley, Memo#UCB/ERL M87/33, describes such a translator, and is hereby incorporated by reference. U.S. patent application 07/632,439, filed on Dec. 21, 1990, entitled "Method and Apparatus for Synthesizing HDL Descriptions with Conditional Assignments" by Gregory et al, and commonly assigned to Synopsys, Inc. also describes such a translator, and is hereby incorporated by reference. An example of a tool that does this is version 3.1a of the HDL compiler available from Synopsys, Inc.

An optimizer is used to produce the mapped circuit 903 from the initial generic technology circuit 902. The optimization process is explained in "Logic Synthesis Through Local Transformations" by J. Darringer, W. Joyner, L. Berman, and L. Trevillyan in the IBM Journal of Research and Development, volume 25, number 4, July 1981, pages 272–280, which is hereby incorporated by reference. It is also explained in "LSS: A System for Production Logic Synthesis" by J. Darringer, D. Brand, J. Gerbi, W. Joyner, and L. Trevillyan in the IBM Journal of Research and Development, volume 28, number 5, September 1984, pages 537–545, which is hereby incorporated by reference. It is also explained in "MIS: A Multiple-Level Logic Optimization System" by R. Brayton, R. Rudell, A. Sangiovanni-Vincentelli, and A. Wang in the IEEE Transactions on Computer Aided Design, Volume 6, number 6, November 1987, pages 1062–1081, which is hereby incorporated by reference. It is also explained in the Ph.D. dissertation "Logic Synthesis for VLSI Design" by R. Rudell at the University of California at Berkeley in 1989, which is hereby incorporated by reference. The optimization process is also described in the Design Compiler Family Reference Manual, version 3.1a which is available from Synopsys, and is hereby incorporated by reference. An example of software that performs this function is the Design Compiler available from Synopsys, Inc. Other examples of software that performs optimization include Synergy from Cadence, Inc., and AutoLogic by Mentor Graphics.

One approach to optimization is to group one or more logic elements together, and replace those elements with a functionally equivalent collection of elements that has better characteristics than the collection of elements replaced. This results in an intermediate circuit that is functionally equivalent to the original. This intermediate circuit can then have some or all of its elements grouped for another replacement. The process can be performed on either generic technology or mapped logic circuits. The process is repeated until the optimizer meets the constraints imposed in step 103 of FIG. 1, or is unable to make any further improvement.

The components of the initial generic technology circuit fall into two groups: those components that must be preserved through the optimization process, and those that can be replaced with functional equivalents. For example, a logic optimizer may replace a block of boolean logic with another block so long as function is maintained. Generally, replaceable components can also be eliminated. Examples of components that are generally preserved through the optimization process are primary inputs, primary outputs and registers.

After developing a mapped circuit, the designer can then analyze the mapped circuit 105 using conventional analysis tools, as shown in FIG. 1. For example, the designer could estimate the area that the mapped circuit consumes or what the longest delay path is in the mapped circuit. This analysis can identify problems to the designer. The analysis report 904 is often a text document, as shown in FIG. 1.

After identifying timing, area, testing or power problems with the analysis tools, the designer then adjusts the mapped circuit to fix these problems 108. Ideally, the designer goes back to the HDL where the function is specified and make adjustments there. However, because it is currently hard to identify the specific places in the source HDL that led to the problem, modifying the appropriate part of the HDL is currently not an effective debugging technique. The designer can usually identify which hierarchical module contains some of the problem. The designer can then manually rewrite that module to create more primary inputs and outputs to examine. This is very time consuming and is generally done as a last resort. A method for automatically adding additional primary inputs and outputs is needed to make this approach practical. Alternatively, the designer could adjust the constraints 103 and synthesize the mapped circuit 104 again to see if the problem is alleviated.

After analyzing the mapped circuit 105, the designer then releases the design for fabrication 106.

SYSTEM PERFORMANCE

In addition to the analysis problems presented by the transformations made by the logic synthesis process, there are also difficulties associated with efficiently and economically constructing CAD systems that compute and display analysis results. Conceptually, after specifying a design, analyzing a digital circuit involves having the designer repeatedly (1) determine a particular characteristic or property that the designer wants to know about, such as area, timing or power, (2) identify a kind of analysis that will provide information about that characteristic, (3) instruct the CAD system to perform that analysis, (4) display the results of that analysis, and (5) gain insight into the desired characteristic from the display. The designer is interested in completing these steps as quickly as possible. Digital circuit CAD tools have historically facilitated this goal by making the instruction and display steps computationally efficient. To improve response times, digital circuit CAD tools have often tightly coupled the software that performed the analysis to the software that performed the display function. This was often done by having the display software depend heavily on the data structure used to process or store the results of the analysis.

For example, timing analysis often reveals the portions of the mapped circuit that are too slow. Reviewing this analysis historically has involved examining the schematic and tracing the critical path. However, as described previously, the schematic may have little to do with the designer's HDL source specification of the digital circuit. Thus, the conventional analysis method does not relate the mapped circuit problem to its HDL source. Therefore, it is not easy for the designer to know what HDL to change to meet the design constraints.

BACKGROUND CONCLUSION

Using HDL synthesis can simplify the task of digital circuit design by allowing the designer to specify the required function in an HDL textual description without specifying the details of the mapped circuit implementation, After creating a mapped circuit using synthesis, the designer can use conventional mapped circuit analysis tools to determine characteristics of the mapped circuit. Conventional analysis will describe such things as the area consumed by different parts of the mapped circuit, or what the longest delay path is through the circuit. Using these analysis results, the designer can then identify which portions of the mapped circuit are problematic. However, because the optimization portion of synthesis often transforms the design substantially, it is difficult, if not impossible, except in certain special cases, to relate specific portions of the mapped circuit to the HDL source that generated those portions. This inability to trace the mapped circuit analysis results easily to the HDL source represents a substantial barrier for analyzing circuits efficiently. Thus, there has been a need for a system which allows the designer to analyze a digital circuit design in terms of the source HDL.

SUMMARY OF THE INVENTION

An aspect of the present invention provides a method for displaying the results of synthesized circuit analysis visually near the HDL source specification that generated the circuit. Circuit analysis provides information about the characteristics of each portion of the synthesized circuit. An aspect of the present invention relates the analysis results of each portion of the synthesized circuit to the particular part of the HDL specification that generated that circuit portion. This permits the designer to modify the part of the HDL specification that is responsible for problems identified by circuit analysis.

The synthesis process works by translating HDL source code into an initial circuit. Each point in the initial circuit corresponds directly with a particular construct in the HDL source. A final, more efficient circuit is constructed from the initial circuit by logic optimization. Connecting the results of the analysis to the source requires identifying points in the final circuit that be traced directly to the initial circuit. Circuit analysis results corresponding to these invariant points in the circuit can therefore be directly related to the appropriate part of the HDL source, and thus can be displayed near that part.

Another aspect of the present invention provides a method for introducing additional points in the design that remain traceable through the optimization process without requiring reorganization or modification of the HDL source. The present invention provides these additional points, for example, by artificially injecting primary inputs or outputs into the initial circuit, and noting where in the HDL source these points came from.

In another aspect of the present invention provides a method for linking information gleaned from evaluating and analyzing a synthesized circuit to the source code that produced the circuit. The present invention establishes the link by providing a designer with the ability to mark the synthesis source code in the places that the designer wants to be able to debug. In a current embodiment, the designer marks the source code with a particular text phrase, such as "probe", along with some additional optional information. During translation, the translator generates a circuit the provides the same function as it did without the "probe" statement, but adds additional information or components to the initial circuit that indicate that certain components should not be replaced during optimization. Because those components will not be replaced during optimization, the circuit analysis results corresponding to any unreplaced components that are in the final circuit will be directly and traceably related to those components in the initial circuit. Because those components are traceably related to the source HDL, the results are traceably related to the source HDL, and therefore be displayed near the appropriate portion of the HDL. Allowing for the interjection of unreplaced components by the designer facilitates debugging without rewriting the designer's original hierarchical design or manually backtracking through the optimization process.

In another aspect of the invention, the designer can assign a priority level to each probe to help manage the debugging process. These priority levels could then be used to activate or deactivate selected probes as a group. An activated probe would establish a link through the synthesis process to facilitate debugging. An inactive probe would have no effect on the synthesis process, and would not establish a debugging link. Establishing many links would provide the designer with a large degree of debugging information, but could limit the ability of the synthesis process to provide a good circuit. Establishing too few links may not provide enough guidance to the designer to resolve circuit problems. By selectively activating groups of probes at different times during the debugging process, the designer can analyze different portions of the design without the probes themselves unduly interfering in the process.

By providing a facility for displaying the results of circuit analysis near the HDL that created the circuit, the present invention allows a designer to make more effective use of logic synthesis and reduce the complexity of the circuit debugging process.

An aspect of the present invention provides a method and system for processing requests from designers about the characteristics associated with the HDL synthesis source specifying a circuit, and displaying the results of circuit analysis with a consistent set of display tools that are not intimately tied to the data structure used for the circuit analysis. Designing a chip involves constructing different representations for a circuit. Some of these representations, such as a synthesis description language are relatively compact and contain primarily functional information. Other representations, such as a gate level net list, contain correspondingly more information, such as the specific types of components to be used. Still other representations, such as a layout description, contain even more information, such as the specific location of the components on the chip. The different representations can be partitioned into domains with each domain containing circuit representations with a common structure. Then the tool builder can develop domain dependent display tools for examining the state of the design in that domain. In addition, the tool builder can also develop tools that evaluate or analyze the state of the circuit in a particular domain. Display tools showing the circuit structure in one domain can obtain information related to analysis obtained in another domain by the forward and backward linkages.

The designer can inquire about the characteristics related to a specific part of the design by first examining part of the design in one domain with a display tool. This domain is the inquiry domain. After identifying a relevant portion of the design in the inquiry domain, the designer selects a constituent piece of the design to evaluate, and makes an inquiry about that piece. This information constitutes a query. The display tool forwards the identification of the object in the inquiry domain and an identifier indicating the requested analysis or evaluation to a data manager. The data manager then determines the domain that would contain the relevant analysis results. If those results do not yet exist, the data manager invokes the appropriate analysis tool to compute those results, which then may be cached in the data manager. Using the linkage established with the HDL-debugging method, the data manager locates the related object in the analysis domain. From the related object, the appropriate information is passed back to the display tool where the designer can see it displayed appropriately.

One aspect of the present invention provides display tools that are not dependent on the structure of the domain in which the analysis is actually performed. Another aspect of the invention provides analysis tools that are not dependent on the structure of the display domain. Another aspect of the invention is to allow the different display and analysis tools to remain independent from one another. The display tools can maintain their independence by relaying all of their queries through a central data manager. The central data manager performs both domain mapping and analysis tool selection for each query issued by a display tool. Thus, neither the display tools nor the analysis tools need to be aware of the source or destination of any query.

One aspect of the present invention provides a selection manager which communicates a circuit selection made in one display tool to all of the display tools in the system. The selection manager allows the designer to select a circuit object via a display object in a display tool, and then to view an alternate display of the circuit object in an alternate display tool. For example, a circuit object can be selected using a histogram display, and then that circuit object can be viewed using a text display.

One aspect of the present invention simplifies digital circuit analysis before optimization. The direct relationship between the translated circuit and the HDL text is leveraged to allow the designer to improve the translated circuit by improving the HDL. An aspect of the present invention allows the designer to obtain characterizations of attributes such as area and timing of parts of the translated circuit and then to relate automatically selected translated circuit parts to the source HDL from which they were created.

The HDL Analysis System has several advantages over prior art systems such as Source to Gates. First, the HDL text browser uses the text to parse node links described earlier to draw a box around the entire selected parse node. Such boxes are drawn both when the cursor is moved across the display of the HDL text, as well as when a portion of the text is selected. The boxes around the HDL text are much easier to see, and indicate the entire range of the source for the selected circuit object. Secondly, the HDL Analysis System creates many more links than simply between HDL source and schematics. As described previously, many display and analysis tools can be linked to the HDL source. Additional display and analysis tools allow many different kinds of digital circuit analysis to be performed, rather than simply viewing the schematic.

One aspect of the present invention allows a designer to relate circuit analysis results visually and quickly back to the text that produced the portion of the circuit that was responsible for those results. This is achieved by the maintaining the parse tree generated during the translation portion of synthesis, and establishing a bidirectional relationship between a parse node and the circuit elements synthesized from that parse node. In particular, the present invention provides for storing the parse tree node number with each created circuit element, and storing a list of created circuit elements with each parse node.

One aspect of the present invention allows the designer to display a numerical physical characteristic of a circuit element near a reference to the portion of the source HDL text responsible for that circuit element. This is achieved by maintaining references between the parse nodes derived from the text and the circuit elements synthesized from the parse nodes. Among the kinds of physical characteristics the designer would want to know about are the area used by the circuit, the time delay from an input or a clock edge to a particular pin on a cell, the number of gates forming part of the design, the number of logic levels from an input to a particular net, or the power dissipated by one or more cells. Among the kinds of display techniques supported are a stacked bar graph, a histogram, text, a path display, a logic inspector, a selection inspector, and a virtual schematic. Among the kind of text display techniques supported, are hilighting, different fonts, different colors, and different sizes.

BRIEF DESCRIPTION OF THE DRAWINGS

FIG. 13: shows the HDL source of FIG. 11 as a text array.

FIG. 14: shows the text array of FIG. 13 with embedded brace "{" characters surrounding each portion of the text that forms a parse node.

FIG. 15: shows the annotated text array of FIG. 14 with each left brace "{" numbered.

FIG. 18: shows the HDL source of FIG. 11 with an improper probe directive.

FIG. 32: shows some VHDL source without probe directives using two process blocks.

FIG. 35: An example of a display relating data found from analysis of the optimized mapped circuit of FIG. 30 to the source VHDL showing that information can only be related to the highest level in the description.

FIG. 36: The VHDL source from FIG. 32 with a block probe directive installed.

FIG. 39: An example of a display relating data found from analysis of the optimized mapped circuit of FIG. 38 to the source VHDL showing information related to the block probes.

FIG. 49: shows another virtual schematic display tracing the output of the display in FIG. 48.

FIG. 50: shows another virtual schematic display tracing the output of the display in FIG. 49.

FIG. 53: Display of the transitive fan in trace of a particular signal in the source HDL in accordance with the present invention.

FIG. 54: Display of the primary inputs reached from transitive fan-in trace of a particular signal in the source HDL in accordance with the present invention.

FIG. 57: shows the HDL text browser with the source code for the STACK_BLK hilighted.

DETAILED DESCRIPTION OF THE INVENTION

Figure 1:
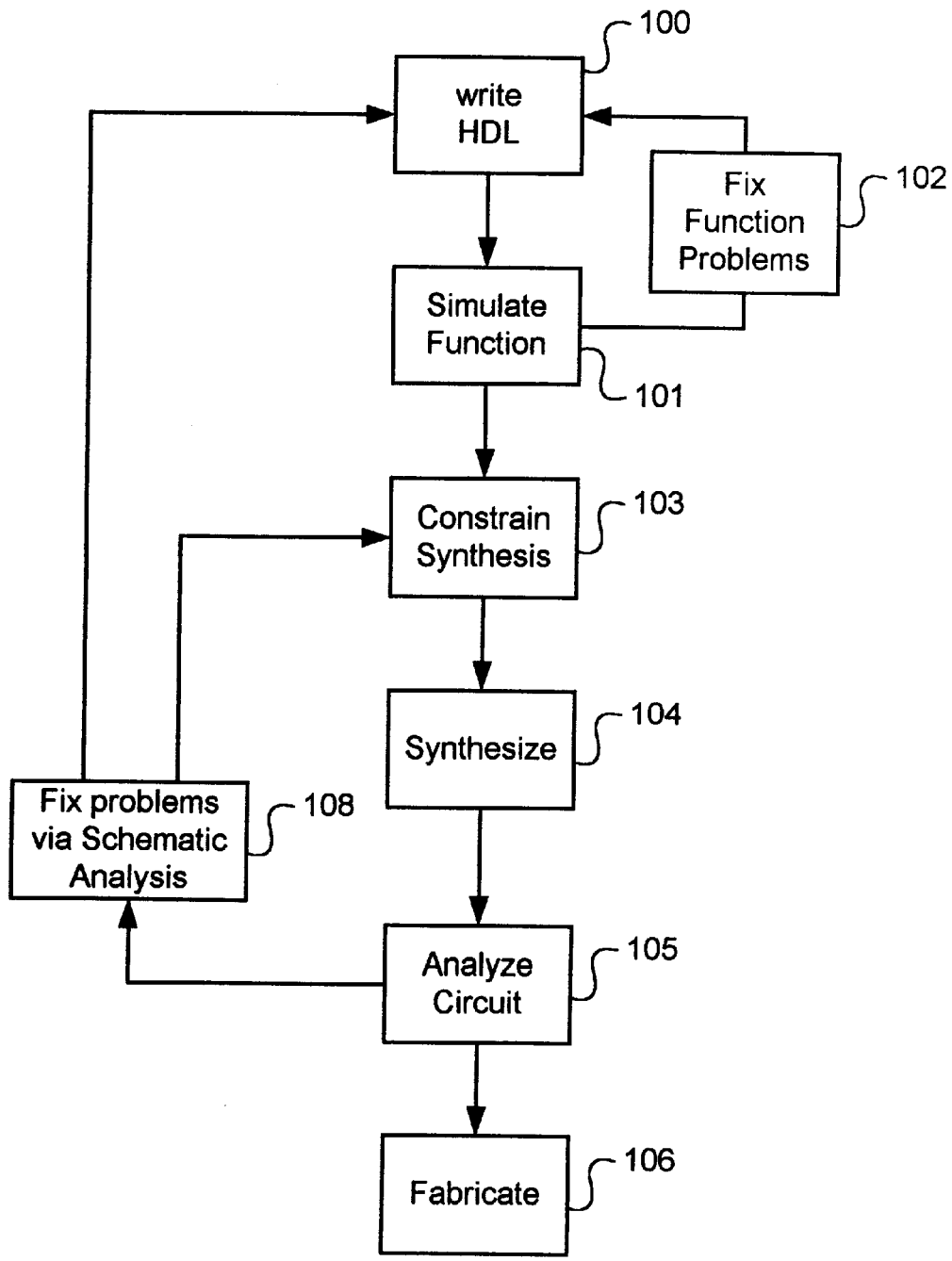
FIG. 1: A flow diagram showing an earlier synthesis-analysis process.

The present invention comprises a novel method for analyzing a digital circuit using the HDL source description from which the digital circuit was created. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

In one embodiment, the present implementation is a software system which is implemented using conventional techniques such as message passing, object oriented design, and opaque data structures. These concepts are described in many books on programming. Two such publications are *Fundamentals of Programming Languages* by Ellis Harowitz, 2nd Edition, published by Computer Science Press in 1984, ISBN 0-88175-004-2 and *Programming in C++* by Stephen Dewhurst and Kathy Stark, published Prentice Hall in 1989, ISBN 0-13-723156-3.

1.0 Digital Circuit Synthesis

HDL Synthesis creates a mapped circuit netlist description from an HDL description of the digital circuit's functionality. The present invention extends an HDL Synthesis tool. The following sections describe the structures created while synthesizing the mapped circuit, and how the mapped circuit is created.

1.1 Domain Definitions

A digital circuit is a physical piece of hardware. The outputs of a digital circuit are a function of its inputs. Thus, a property of a digital circuit is its functionality. Another property of a digital circuit is the area required to build it. Another property of a digital circuit is the amount of time required after a signal has been applied to its inputs for its outputs to contain a valid value. Properties such as area and delay are called constraints. A digital circuit designer specifies constraints during synthesis.

The design of a digital circuit can be represented or specified in different ways within the memory of a computer system. Each type of digital circuit representation is called a domain. Different domains contain different amounts of information regarding the physical structure of a circuit. Domains which contain more information regarding the structure of the circuit require more of the computer's memory and require more of the computer's time to construct and manipulate. In some cases, a representation of a digital circuit is treated as if the representation were the actual digital circuit. Some representations contain enough information to build a version of the digital circuit. This section describes the different representations of digital circuits which are used in CAD systems as a digital circuit is being designed.

Domains are used to store different representations of a digital circuit design in a CAD system. In going through the digital circuit design process, the designer, through the CAD system, manipulates and transforms digital data in one domain into other digital data in a new domain. Many digital circuit analysis tools are designed to work with a specific domain. For example, the timing verifier works in the mapped logic domain. Because more detailed domains are larger and slower to manipulate, it is desirable to manipulate the circuit in less detailed domains where possible. The following paragraphs describe what a domain is and the different domains used in the HDL Digital Circuit Analysis Tool.

Figure 2:
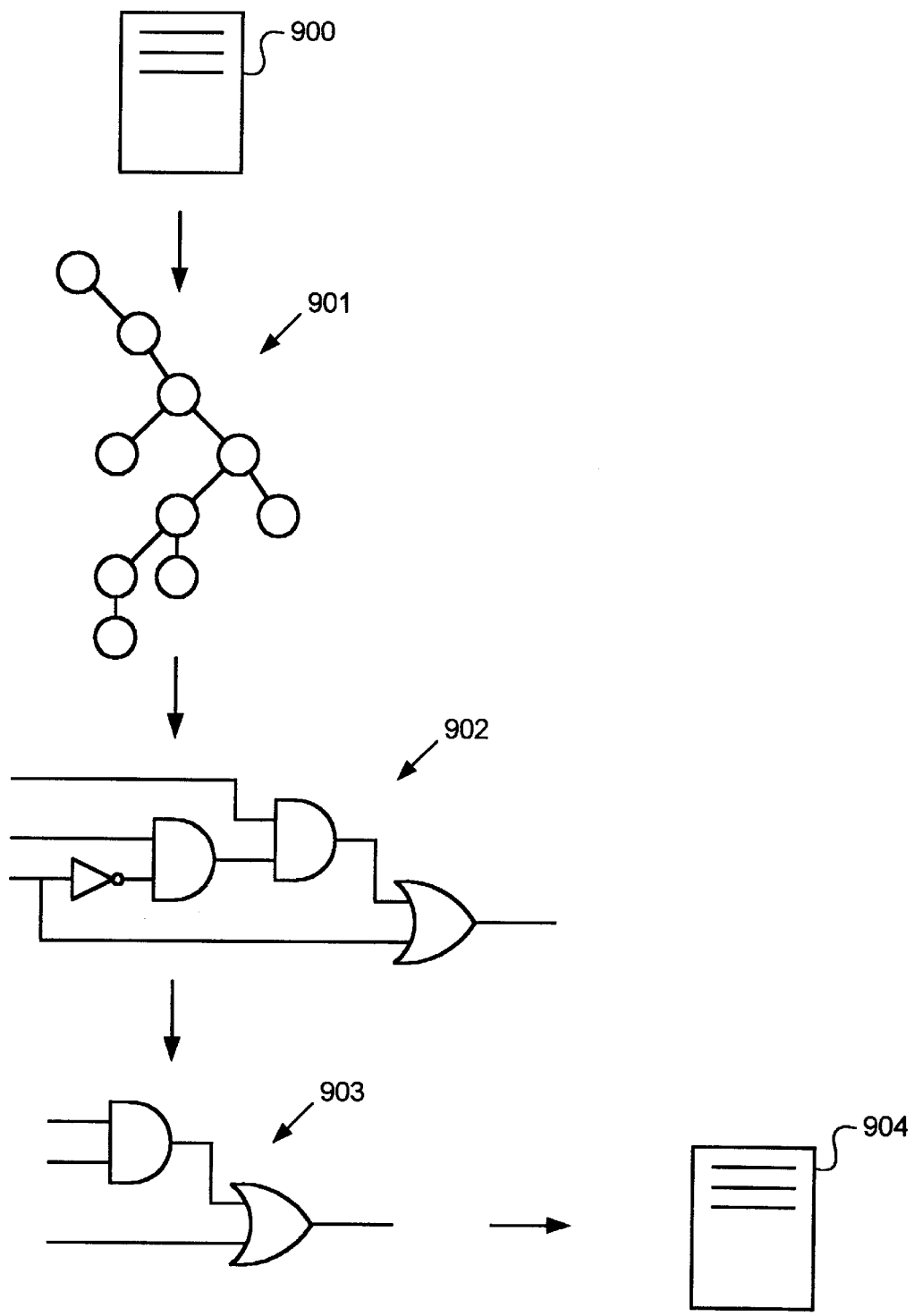
FIG. 2: shows intermediate data structures and domains involved in the synthesis process.

A domain is a software representation of digital circuit design data that includes common structural characteristics. Each domain represents a particular level of abstraction of the digital circuit design information. Some common domains include an HDL source domain, a generic technology domain, which is also known Is a GTech domain, a gate domain, a layout domain. In addition, other domains may be possible. The digital circuit design data in one domain can be the result of a transformation of digital circuit design data from another domain using digital circuit design tools, such as a logic synthesizer, and libraries of components. The intermediate data structures shown in FIG. 2 are all members of various domains.

Figure 3:
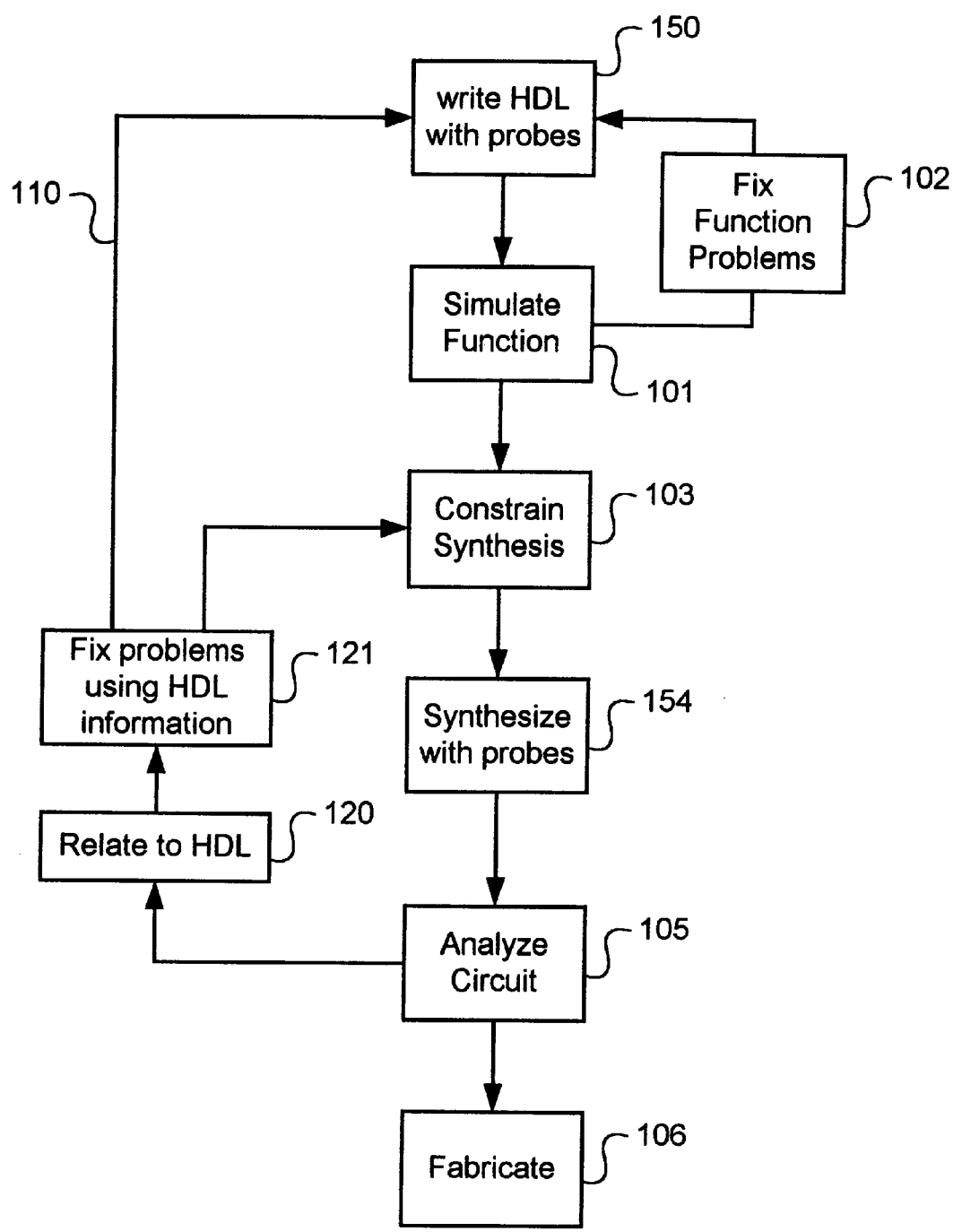
FIG. 3: shows the general design and debugging process in accordance with the present invention.

The source domain contains the HDL source files that the designer creates in step 100 of FIG. 1 or step 150 of FIG. 3. Circuit representations in this domain may also be called HDL source. The HDL source 900 is also shown in FIG. 2. The source domain also contains the parse tree 901 and symbol table generated during the translation step of logic synthesis. Although the HDL text and the parse tree are different representations of the circuit, they are in the same domain because they contain the same information about the structure of the digital circuit. However, it is necessary to establish efficient links between the HDL text and the parse tree. A method for accomplishing this will be described later. In the source domain, the digital circuit design representation contains information about the desired function of the digital circuit without reference to digital circuit topology. Although it is possible to explicitly instantiate technology dependent components in the source domain, the source domain generally does not reference a specific technology provided by a silicon vendor.

The generic technology, or GTech, domain contains the initial generic technology circuit 902 that arises from the translation step of the synthesis process, as shown in step 104 of FIG. 1 or step 154 of FIG. 3. Circuit representations in this domain may also be called the GTech circuit. VHDL compiler by Synopsys, Inc. of Mountain View, Calif. is a tool that creates GTech circuits. Data stored in the generic technology domain contains information about the topology of the digital circuit, but does not have information about the specific technology to be used. Thus, GTech circuits do not have exact timing or area data. However, one can characterize the timing and area of a GTech circuit by ascertaining the logic levels and component counts of the GTech circuit respectively. The logic levels of a path in a GTech circuit is the number of 2 input GTech gates used to construct the logic comprising the path. The component count of a GTech circuit is the number of 2 input GTech gates used to construct the GTech circuit.

The gate, or mapped logic, domain contains the mapped circuit 903 that arises after the mapping step of the synthesis process. Circuit representations in this domain may also be called mapped circuits. Design Compiler by Synopsys, Inc. of Mountain View, Calif. is a tool that creates mapped circuits. Like the generic technology domain, the data in the gate domain contains information about how components are connected together. However, in the gate domain, a particular technology from a specific silicon vendor is specified, thus providing information about the physical characteristics of the components used to implement the desired function. It is in this domain that preliminary timing, area, power, testability, and other calculations of step 105 of FIG. 1 and FIG. 3 can be made.

The layout domain contains information about the geometric placement of the components on the chip substrate and the connections between the components. Circuit representations in this domain may also be called the laid out circuit. Cell3 Ensemble by Cadence of San Jose, Calif. creates laid out circuits. The digital circuit design information in the layout domain is obtained from the digital circuit design information in the gate domain by using placement and routing tools.

It is also possible to have additional domains, as shown by other domains. However, the majority of analysis for HDL specified digital circuits occurs in the domains described above.

1.1.1 Objects within a Domain

The digital circuit design information within a domain is a collection of interconnected objects, with the objects and the connections possessing certain characteristics. For example, in the source domain the objects may include the text of the HDL source code or the nodes of the parse tree constructed from the source code or the entries in the symbol table. In the gate domain, the objects may include software representations of the individual gates or other library parts or the connections between them.

Subsequent sections describe how intra-domain relationships are established and maintained. Objects in different domains can be related to each other using links discussed in subsequent sections. For instance, objects in the source domain can be related to objects in the generic technology domain by tracking the parse node which creates each translated gate. The system leverages the intradomain links to allow the designer to perform analysis in one domain and view it in another.

1.2 Digital Circuit Definitions

This section defines some terms used to describe digital circuits. The same terms are also used for software data structures which represent digital circuit components in the various domains.

A digital circuit is an interconnected collection of parts. Parts may also be called cells. The digital circuit receives signals from external sources at points called primary inputs. The digital circuit produces signals for external destinations at points called primary outputs. Each part receives input signals and computes output signals. Each part has one or more pins for receiving input signals and producing output signals. In general, pins have a direction. Most pins are either input pins which are called loads, or output pins, which are called drivers. However, some pins may be bidirectional pins which are both inputs and outputs. Bidirectional pins must be handled specially by algorithms which manipulate digital circuit designs. Usually one of two strategies is used for bidirectional pins; either they are treated as both an input pin and an output pin, or they are disallowed by the algorithm in question. In this case, the algorithm cannot manipulate that part of the circuit.

One or more pins from one or more parts are connected together with a net. Each net establishes an electrical connection among the connected pins, and allows the parts to interact with each other. Pins are also connected to primary inputs and primary outputs with nets. For the sake of simplicity, parts may be said to be "connected" to nets, but it is actually pins on the parts which are connected to the nets.

Pins, cells, nets and ports may all be referred to as circuit elements. One or more circuit elements form a circuit element set.

A digital circuit can be specified hierarchically. Some or all of the parts in the digital circuit may themselves be digital circuits composed of more interconnected parts. When a high level part is specified as a digital circuit of other, lower level parts, the pins of the high level part become the primary inputs and primary outputs for the digital circuit comprising the lower level parts. If a high level part is composed of lower level parts, it is called a level of hierarchy.

In the GTech domain, a hierarchical digital circuit specification must terminate with primitive parts. Primitive parts are not specified as a GTech circuit, but with a fixed definition provided by the GTech specification or model maker. The definition for a primitive part specifies the logical function performed by the part. Typically, these parts are functionally simple, such as nand gates, or gates, inverters, or flip-flops. Some primitive parts perform a more sophisticated function, such as addition. In some cases, the primitive part performs a very sophisticated function, such as a microprocessor. The GTech specification or logic model supplier describes the functionality and characteristics of the primitive parts. This may include, but is not limited to, the logic performed by the primitive part.

As with GTech circuits, mapped circuit specifications must also terminate with primitive parts. In this case, the primitive parts are supplied by a semi-conductor vendor and are stored in a technology library. Each part in a semiconductor vendor technology library contains a description of its function, as well as physical characteristics such as area, timing and power usage. Primitive parts in both the GTech and mapped domains are also known as cells.

1.3 Synthesis Process Overview

Digital Circuit Synthesis consists of translating an HDL description into a netlist with equivalent functionality and then optimizing that netlist to create an improved mapped circuit with the same functionality. The following sections describe this process in more detail.

1.3.1 Translation Process Overview

The conventional translation portion of the synthesis process first converts the HDL text into a parse tree. This is done using conventional parsing techniques such as those described in *Compilers, Principles, Techniques and Tools* by Alfred V. Aho, Ravi Sethi and Jeffery D. Ullman. A parse tree represents the functional relationships established by the HDL text. Various nodes on the parse tree correspond to functions. The translator then constructs an initial GTech circuit using the parse tree as the guide to selecting the appropriate primitive parts and establishing nets among the pins of those parts. The initial GTech circuit will also be hierarchically specified as required by the parse tree. Importantly, every character in the HDL text is related to a node in the parse tree, and every parse node is directly related to a net or a part or a primary input or a primary output in the initial GTech circuit. For example, each variable declared in the HDL will correspond to a net in the GTech circuit. Also, registers specified in the HDL will correspond to flip-flops or other memory elements in the GTech circuit.

1.3.2 Generic Optimization Process

The conventional translation process produces initial GTech circuits that, if mapped directly to a technology library and built, would be slow and large. To remedy this, the translation process is followed by an optimization process to create a mapped circuit with superior characteristics than the initial GTech circuit, but that performs the same function as the initial GTech circuit. Using a GTech circuit consisting solely of primitive parts as an example, the conventional optimization process proceeds generally as described below.

Optimizing a GTech circuit includes improving the structure of the initial GTech circuit as well as mapping the logic in the initial GTech circuit into gates available in the specified technology library. Circuit improvement algorithms may function in either the GTech or the mapped logic domains. Therefore, mapping may occur at different points in the optimization process. Conventional logic optimization tools generally perform some logic improvement both before and after the GTech circuit is mapped. The following paragraphs describe a general approach to improving the logic in either a GTech or a mapped circuit. For readability, the following description of the optimization process describes optimizing GTech circuits. However, the same optimization techniques are applied to mapped circuits as well.

First, the optimization process identifies one or more parts in the GTech circuit. This may include identifying all of the parts of the GTech circuit. Those interconnected parts collectively form an identified GTech sub-circuit. The identified GTech sub-circuit has inputs and outputs. An identified GTech sub-circuit output is a net that connects an output pin of a part in the identified GTech sub-circuit to an input pin of a part not in the identified GTech sub-circuit or to a primary output. An identified GTech sub-circuit input is a net that connects a primary input or an output pin of a part not in the identified GTech sub-circuit to an input pin of a part in the identified GTech sub-circuit. The identified GTech sub-circuit therefore computes one or more outputs from one or more inputs.

Second, the optimization process devises a new GTech sub-circuit that performs the same function as the identified GTech sub-circuit. The new GTech sub-circuit has the same inputs and the same outputs as the identified GTech sub-circuit. Generally, the new GTech sub-circuit should be better than the identified GTech sub-circuit in some measurable manner. For example, if the designer is seeking to construct a digital circuit with the smallest area possible, then the new GTech sub-circuit provided by the optimization process should use fewer gates than the identified GTech sub-circuit. If the designer seeks speed, the new GTech sub-circuit should have a faster timing estimate than the identified GTech sub-circuit. In some optimization processes, such as simulated annealing, the identified GTech sub-circuit is sometimes replaced with a new GTech sub-circuit that has worse characteristics than the identified GTech sub-circuit.

Depending on the particular optimization process used, the measurable criterion used may be a surrogate for the actually desired measurement. For example, a designer may want to minimize area of an entire digital circuit being placed on a chip. The optimization process may estimate the actual new GTech sub-circuit area by counting the number of gates, or adding up an area estimate for each GTech part where the area estimate comes from the GTech part library. Obtaining a more accurate measurement generally requires further analysis of the mapped circuit.

Third, the optimization process replaces the identified GTech sub-circuit with the improved GTech sub-circuit. Replacement means deleting the parts associated with the identified GTech sub-circuit. The new GTech sub-circuit's inputs are connected to the same nets that were connected to the identified GTech sub-circuit's inputs. The new GTech sub-circuit's outputs are connected to the same nets as the identified GTech sub-circuit's outputs. This results in an intermediate GTech circuit.

The optimization process then repeats these three steps on the intermediate GTech circuit until an appropriate termination condition arises. For example, the process could terminate when no further improvement was made, or the total number of iterations reached a specified number. If necessary, the GTech circuit is mapped, and the optimization process may be repeated on the mapped circuit.

1.4 Optimization Invariant Digital Circuit Structures

Several kinds of circuit structures have a 1 to 1 correspondence between the GTech and mapped domains. Such parts are referred to as optimization invariant. Relating an analysis result for a particular net or part in a mapped circuit back to source text is straight-forward when that part of the circuit is not changed in the optimization process. The details of how this correspondence is established will be described in a subsequent section. Conversely, it is difficult, if not impossible, to relate a mapped circuit structure back to the HDL if that mapped circuit structure has no corresponding part in the unoptimized GTech circuit. This section describes several different digital circuit features that typical optimization processes leave unchanged during optimization.

First, optimizers generally do not eliminate registers and defined memory elements such as latches and flip-flops. The translation process typically creates a part in the initial GTech circuit for each bit of a register defined by the HDL text. These initial parts have a one-to-one correspondence with final library parts which are chosen by the optimization process. Therefore, partial analysis results associated with the register (such as its area) or nets connected to the register relate directly to those in the initial GTech circuit. Furthermore, the final register can be related back to the HDL which caused it to be created.

Second, optimizers generally do not eliminate primary inputs and primary outputs. Therefore, post optimization primary inputs and outputs can be related back to pre-optimization parts.

Third, optimizers generally do not optimize across levels of hierarchy. If a GTech circuit contains a part that is implemented as another GTech circuit, then the optimization process will optimize the GTech circuit within that lower level part separately from the rest of the GTech circuit at the higher level. Hierarchy is also respected in mapped circuits.

Fourth, the optimizer can be instructed not to "touch" a given cell or net. Thus, such cells and nets will exist in both the pre- and post-optimization circuit. However, such directives limit the ability of the optimizer to improve the GTech or mapped circuit. In one embodiment, this instruction is called "dont_touch." In one embodiment, dont_touch is a command which refers to a particular cell or net in the GTech or mapped circuit. In another embodiment, dont_touch is an attribute in the HDL language which refers to a part which is instantiated in the source HDL. Cells or nets which are labeled dont_touch are not changed in any way by the optimizer.

Relating Digital Circuit Structures to HDL Source

The goal of synthesis is to create a mapped circuit netlist description from a high level description of the digital circuit. The mapped circuit must meet a set of design constraints. Typically, an HDL is used to specify the high level description. It is desirable to analyze the final result in terms of the original source description.

Analysis of the digital circuit can be done in many ways. Generally, analysis involves taking a digital circuit and computing a numerical characteristic of that digital circuit or of parts in the GTech or mapped circuit or of nets connecting parts in the GTech or mapped circuit. The intermediate results of that analysis are often associated with parts or nets or both in the GTech or mapped circuit. For example, one way to estimate the area of a mapped circuit is to add up the areas of each of the parts in the mapped circuit. The area of each primitive part can be found in the library of primitive parts provided by the semiconductor vendor. The area of a hierarchical part is obtained by applying this area summing technique recursively.

As another example, the propagation delay through a mapped circuit is determined by first computing the longest delay from the primary inputs to each pin in the mapped circuit. This associates delay information with each pin in the mapped circuit. For a hierarchical part, the information could be consolidated to be the delay from each input of the part to each output of the same part.

Results such as area or propagation delay refer to the optimized mapped circuit. If a problem is discovered in analyzing such results, it is useful to ascertain which portion of the HDL description caused the problematic mapped circuit structure to be synthesized.

It is also useful to analyze the translated GTech circuit. Because generally it is not reliable to depend upon the optimizer for major improvements in circuit performance, it is useful to improve the translated GTech circuit before optimization. As there exists a direct correspondence between the structure of the source HDL and that of the translated GTech circuit, improving the translated GTech circuit is accomplished by modifying the source HDL. Furthermore, it is also possible to characterize the area and delay of the translated GTech circuit. Thus, it is useful to relate the structure and properties of the translated GTech circuit back to the source HDL. Therefore, the relationship between the translated GTech circuit and the source HDL can be used to create an HDL source level digital circuit analysis tool. GTech analysis will be discussed in further detail in a later section.

The following sections describe how the relationships between the source HDL, the parse tree, the translated GTech circuit, and the optimized mapped circuit are created and used. These relationships form the basis for HDL source level digital circuit analysis and debugging. Once these relationships are established, digital circuit analysis tools can be linked to the source HDL to assist the designer in analyzing and modifying the HDL.

1.5 Overview of HDL Source to Mapped Circuit Link

This section provides an overview of how the relationship between the source HDL text and the mapped circuit is established. Each of the links will be described in more detail in subsequent sections.

Figure 4:
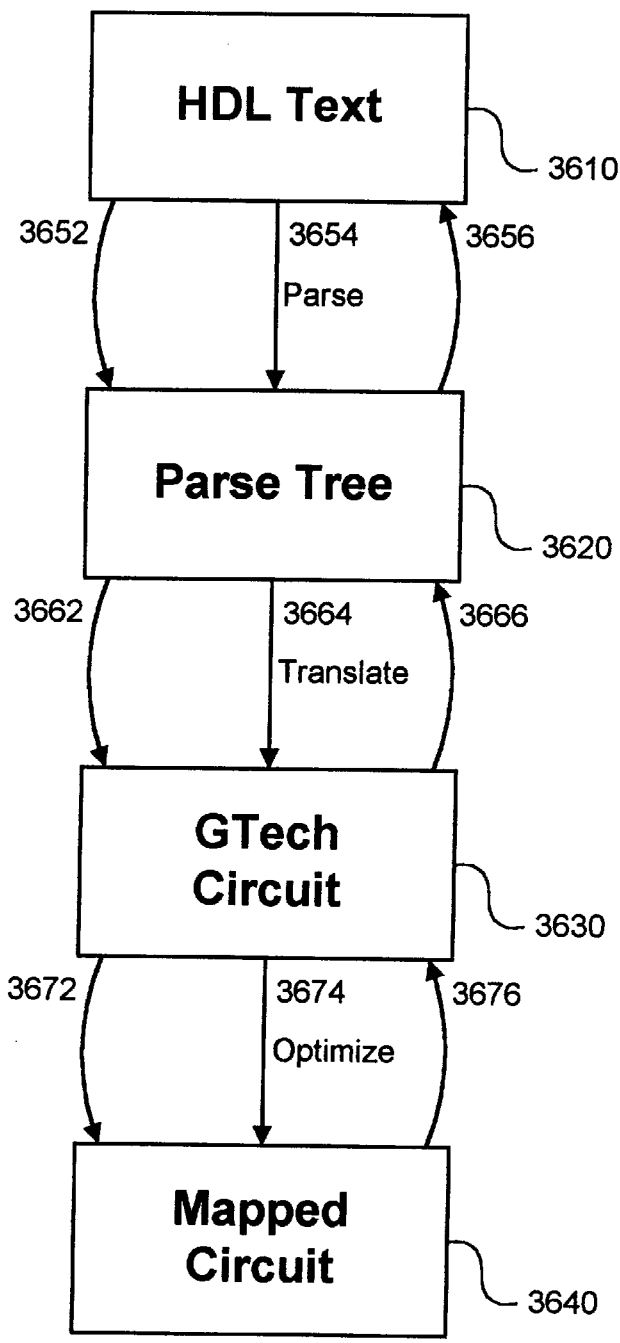
FIG. 4: shows the relationship between HDL text and the mapped logic which makes up a mapped circuit.

FIG. 4 shows the relationship between HDL text and the mapped circuit. The HDL text 3610 is the source representation of the digital circuit. The parse tree 3620 is ccreated by parsing 3654 the HDL text in accordance with conventional computer parsing methods. In addition, each node in the parse tree is assigned a unique numerical id called the parse tree node number which is used to identify the node. Both the HDL text and the parse tree belong to the source domain. The generic logic, or GTech domain 3630, representation of the digital circuit is created by translating 3664 the parse tree. The mapped domain 3640 representation of the digital circuit is created by optimizing 3674 the generic logic. Note that each of the software representations of the digital circuit design in HDL Text 3610, parse tree 3620, GTech domain 3630, and mapped domain 3640 are functionally equivalent. The transformations of parsing HDL text 3654, translating 3664, and optimizing 3674 change the way in which the digital circuit is represented, but not its underlying functionality.

Once each of these representations of the digital circuit has been created in the various domains, it is possible to relate components in one representation to components in either the previous or next representation of the digital circuit. It is possible to derive the relationship between components in any two domains by tracing the components through any intermediate representations.

Link 3652 indicates that the HDL text 3610 can be related to the parse tree 3620 by traversing the parse tree to find the node which represents the relevant text.

Link 3656 indicates that the parse tree 3620 can be related to the HDL text 3610. One technique for relating particular pieces of text with corresponding parts of a parse tree is described in a co-pending application by Gregory entitled "Method and Apparatus for Context Sensitive Displays", filed on Jun. 3, 1994 as U.S. application Ser. No. 08/253,453, which is hereby incorporated by reference. Another embodiment for this stores the file offset of the start and end of each parse node. Another embodiment stores the line and column number from the source HDL in the parse node.

Link 3662 indicates that the parse tree 3620 can be related to the GTech domain 3630 by storing a list of cell ids created from each parse node with the representation of that parse node.

Link 3666 indicates that the GTech domain 3630 can be related to the parse tree 3620 by storing the parse tree node number with each cell that is created in translation.

Link 3672 indicates that the GTech domain 3630 can be related to the mapped domain 3640 by relating optimization invariant digital circuit structures. Optimization invariant structures in the GTech domain 3630 have a one to one correspondence with structures in the mapped domain 3640. Therefore, link 3672 can be implemented by searching for a structure of the same type with the same name in the optimized mapped circuit. An alternate embodiment of tracking optimization invariant structures comprises assigning a unique reference number to each translated GTech circuit structure and then retaining this unique reference number in the corresponding optimized mapped circuit structure.

Link 3676 indicates that the mapped domain 3640 can be related to the GTech domain 3630 by relating optimization invariant digital circuit structures. This link is imlemented using the same method as link 3672.

1.6 Method for Relating Mapped Circuit to Source HDL

As described above, structures in the synthesized digital circuit can be related back to the HDL text. Thus, mapped or GTech circuit analysis results can be shown near the related source HDL. Relating an analysis result back to the source HDL is a several step process. First, the partial analysis result is associated with a part or a net in the final mapped circuit. That part or net is related to a part or a net in the initial GTech circuit. In circumstances described below, this relationship is easily established because that net or part did not change during the optimization process. In other circumstances, this relationship is very difficult or impossible to establish. Note however that it is always possible to establish the relationship between the GTech circuit and the source HDL.

Figure 5:
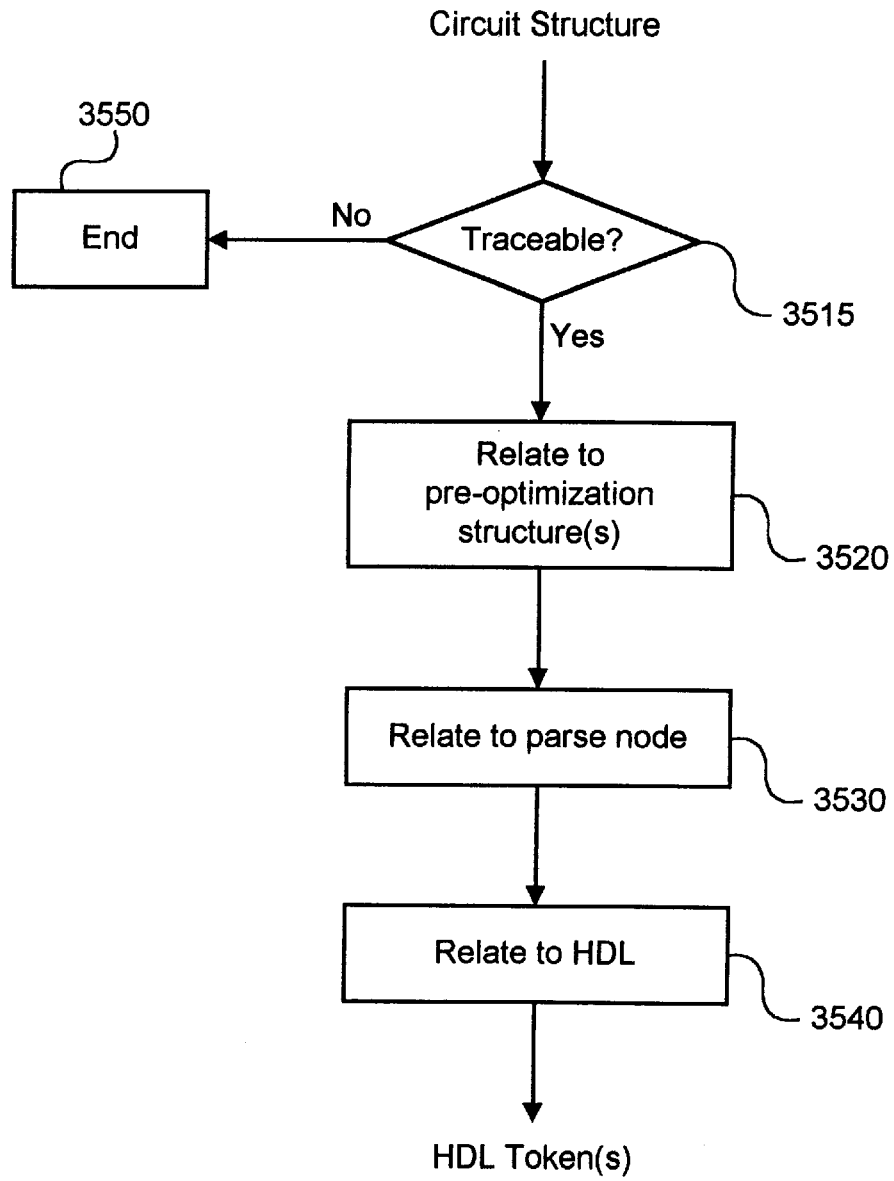
FIG. 5: shows how mapped and GTech circuit structures are related to HDL tokens.

FIG. 5 shows how a mapped circuit structure can be related to the source HDL. In step 3510, a mapped circuit structure is selected for tracing. In step 3515, the method checks to see if the mapped structure was derived from, and can therefore be traced to, an optimization invariant GTech circuit structure. If that mapped circuit structure is not traceable, then the process terminates. In one embodiment, a message might be issued to the user that the mapped circuit structure is not traceable. If the structure is traceable, step 3520 relates the mapped circuit structure to the pre-optimization GTech circuit structure which created it. As described previously, this is possible because the mapped circuit structure directly corresponds to a pre-optimization GTech structure with link 3676 of FIG. 4. Step 3530 relates the pre-optimization structure to the parse node from which it was translated. This is possible because the pre-optimization structure contains a record of the parse node from which it was created. This relationship is shown link 3666 of FIG. 4. Finally, step 3540 relates the parse node back to the source HDL token(s) using link 3656 shown in FIG. 4. The details of the method for establishing the parse tree to text link are described in a later section.

FIG. 5 shows the method for tracing from mapped circuit structure back to HDL source text. It is also possible to begin the method shown in FIG. 5 at step 3520 when one is tracing from GTech circuit structures rather than from mapped circuit structures.

Figure 6:
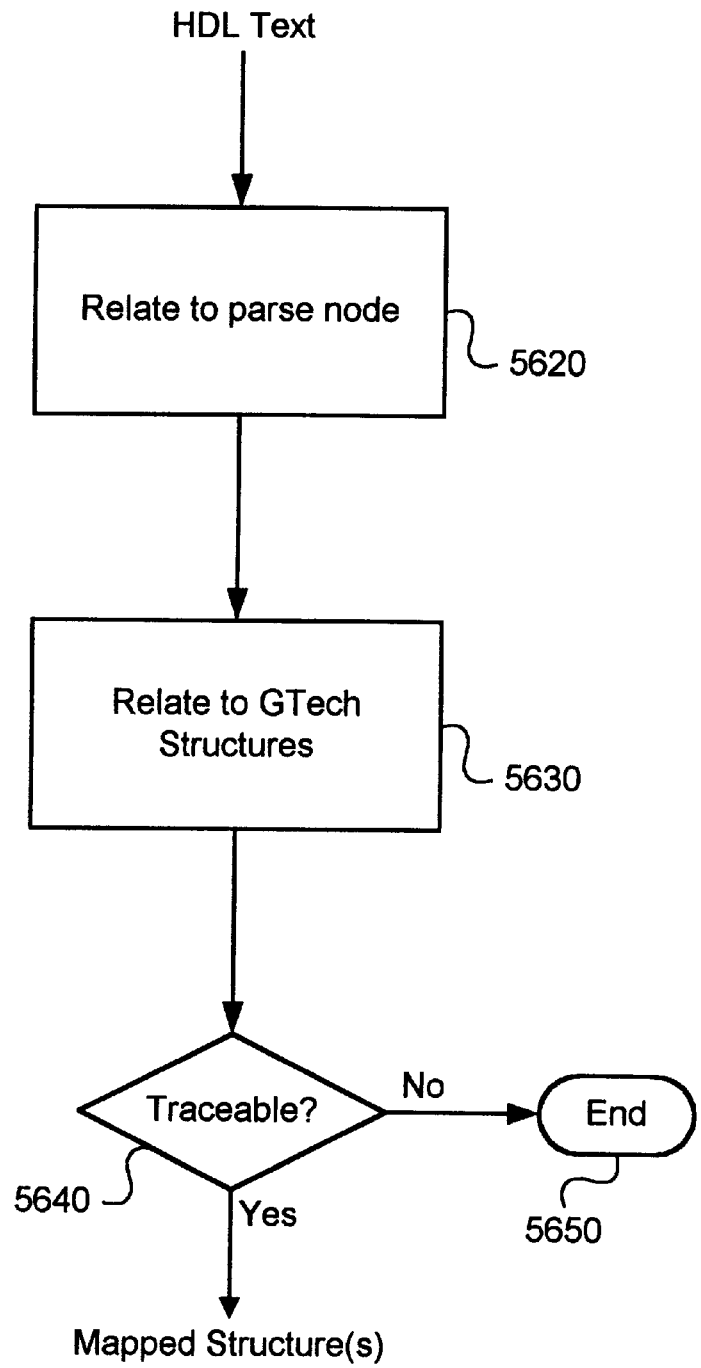
FIG. 6: shows how HDL text is related to mapped and GTech circuit structures.

Furthermore, as shown in FIG. 4, it is possible to trace from HDL text to a GTech or to a mapped circuit structure. The method is the reverse of that shown in FIG. 5, and uses link 3652, link 3662, and link 3672 from FIG. 4. A method for tracing from HDL text to either a GTech or a mapped circuit structure is shown in FIG. 6.

In step 5620, the selected HDL text is related to the appropriate parse node. This is possible by using link 3652 of FIG. 4. Step 5630 relates the parse node to the appropriate GTech part(s). As described previously, this is possible because the parse node is annotated during translation with a record of the GTech part(s) it creates. This annotation is indicated by link 3662 of FIG. 4. In step 5640, the program checks to see whether it is possible to trace from each GTech part to a mapped part. This tracing, as shown by link 3672 of FIG. 4, is possible if the GTech part remains invariant during optimization. If the GTech part remains optimization invariant, then the procedure returns a mapped part for each GTech part. Otherwise it terminates at step 5650.

2.0 Probe Directives

As described previously, it is possible to relate mapped circuit structures back to the HDL if there is a 1 to 1 correspondence to GTech for them. Although several kinds of GTech circuit structures are preserved by typical optimizers, these parts might not exist in sufficient numbers to derive a sufficient correspondence between the source HDL and the optimized mapped circuit in some cases. Furthermore, the distribution of where these parts are located in the mapped circuit might not correspond to the parts of the mapped circuit requiring analysis. Therefore, it might be necessary for the designer to specify additional parts of the HDL which can be traced to the final mapped circuit. An aspect of the present invention uses "probe" directives in the source HDL to specify the creation of additional optimization invariant parts in the GTech circuit.

Probe directives instruct the translator software to construct an initial GTech circuit with certain points in the GTech circuit marked so that those points are preserved during the subsequent optimization process. In addition, the usual optimization invariant structures will also be preserved during optimization. The following sections describe how an HDL description of a digital circuit with probes is synthesized and the resulting mapped circuit is analyzed. An example showing how probes guide the construction of the mapped circuit and allow analysis information to be related to the HDL source text is then provided.

2.1 Probe Directive Usage

It is important that the designer can easily control when and where probe directives cause optimization invariant structures to be inserted into the mapped circuit. The following sections describe different types of probe directives as well as a method for enabling and disabling probe directives without modifying the HDL source text.

2.1.1 Types of Probe Directives

In a presently preferred embodiment, a probe directive is a single text string that is a comment in the HDL language. The probe directive begins with characters that indicate the beginning of a comment. In VHDL, this is a "—". In Verilog, this is "//". The next word is a keyword that indicates to the translator that this comment is a translator directive, and not a mere comment. In one embodiment, this keyword is "Synopsys". After the keyword, comes a probe declaration to indicate what type of probe it is. In one embodiment, a statement probe is indicated with the phrase "probe_ statement". After the probe declaration comes an optional search string that is used to identify the type of nets in the GTech circuit to insert optimization invariant GTech circuit structures. An example of an optional search string is "all_mux_controls" indicating that the control lines to any multiplexors should be probed. The search string information will be described later. After the search string comes optional probe strength information. Probe strength is an aspect of the present invention which provides a convenient method of activating or deactivating groups of probes. In one embodiment, probe strength is indicated using a numerical value from 1 to 5. This feature will be described further in a later section.

Thus, a sample probe directive in the VHDL language is:

Synopsys probe_statement all_mux_controls 4

A basic type of probe directive is a statement probe. Statement probes use the syntax described above, but do not include any search string. In one embodiment, a statement probe selects the first parse node following it.

Another type of probe directive is the block probe. A block probe is defined by two text strings. The first text string is the block starting string. Like the statement probe, it begins with a comment starting symbol and a keyword. In one embodiment, the keyword is followed by the phrase "begin_block_probe". This phrase is followed by an optional search string. This phrase is followed by an optional string with probe strength information. The second text string is the block ending string. In one embodiment, the keyword is followed by the phrase "end_block_probe". A sample pair of block probe directives in the VHDL language is:

```
-- Synopsys begin_block_probe
<VHDL statements>
-- Synopsys end_block_probe
```

In one embodiment, the begin block probe/end block probe phrase pair cause all of the statements between the begin and end phrases to be probed. Details of how block probes are implemented will be explained later.

Multi-probes are implemented by using statement probes and block probes with search strings. Search strings are text descriptions that are used to choose the nodes or nets to probe. In one embodiment, the search string is used to select particular types of nets associated with the GTech circuit parts. For example, multiplexors are commonly used to implement conditional expressions. The multiplexor control lines are linked to GTech circuit structures associated with the condition, and the data lines are linked to GTech circuit structures associated with the alternatives. A search string such as "all_mux_controls" could probe the nets that are connected to multiplexor control lines. This would allow the designer to gain insight about the conditions. Following is an example of a multi probe which selects all mux controls in the VHDL language:

Synopsys probe_statement all_mux_controls 2.1.2 Selecting Probes

The mapped circuit produced when probes are used most likely will be different from the mapped circuit that occurs when probes are not used. Because probes interfere with the ability of the optimizer to produce higher quality mapped circuits, the designer generally will only use them when the designer needs to gather particular information. During the debugging process, a designer may insert many probe directives into the HDL source at various times to discover the characteristics of different parts of the mapped circuit. As the design process progresses, the designer should require fewer probes. One of the tasks that the designer faces is then managing the probes as the debugging needs change. One way to do this is for the designer to add and remove the text of each probe directive as required. This burdens the designer with a tedious text editing chore.

An aspect of the present invention use a probe strength field in the probe directive in the HDL source text. Before initiating the synthesis process, the designer specifies a processing strength. All probe directives with a probe strength greater than the processing strength are treated as active probes and therefore should be processed. All other probe directives are ignored. This means that a designer can set the probe strength to a small value in the detailed portions of the design, and then set the probe strength to a larger value at higher level portions of the design. By specifying a large processing strength, the designer would get a mapped circuit with fewer probes, and provide the optimizer with greater flexibility, but corresponding less information directly related to the source text. Specifying a smaller processing strength would increase the number of probes, but would also impact the mapped circuit.

Figure 7:
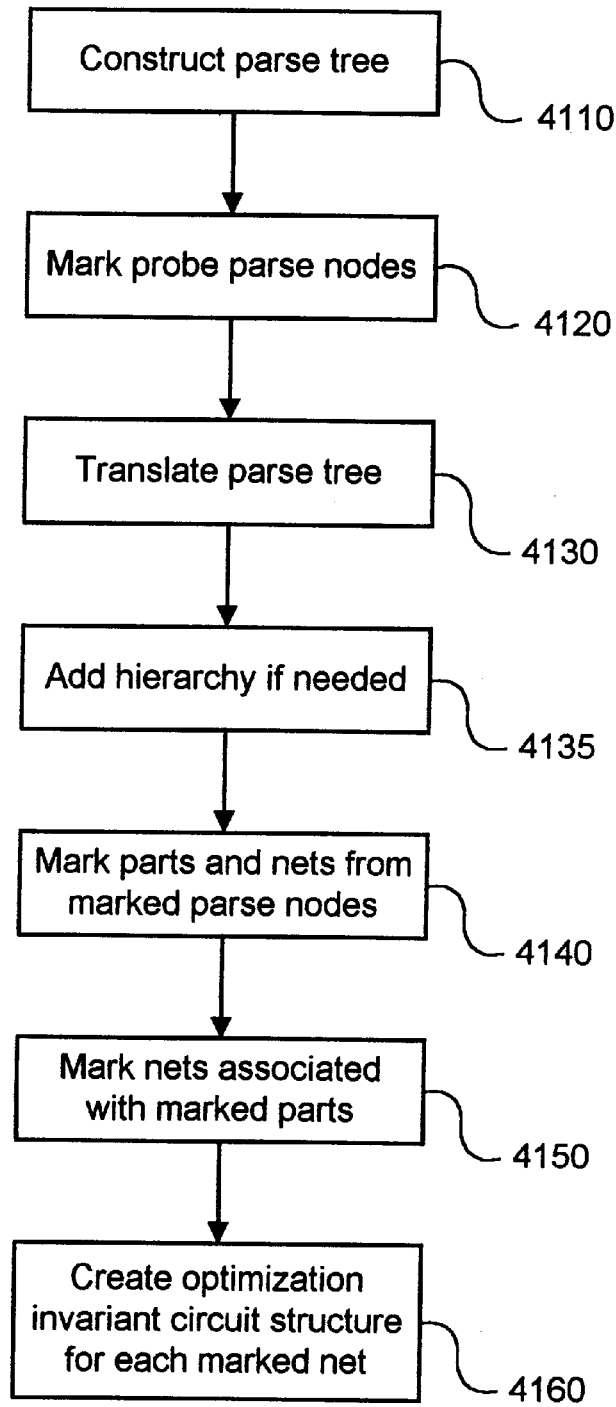
FIG. 7: shows how probe statements are translated.

One method of implementing this probe strength field is to modify the translation process shown in FIG. 7. In particular, in step 4120, the parse nodes corresponding to probe directives are marked. At this point, the probe directive's strength can be extracted from the text and compared with the specified processing strength. A probe directive lacking the requisite strength is simply ignored.

Another method would involve attaching the probe strength to the nets that get marked, and allowing the optimization process to select probe nets with probe strength less than or equal to the processing strength.

In another embodiment, the probe directive could include a specification field that contained text. The designer could specify a text search condition. Such a condition could include a regular expression used for defining text searches. The synthesis process would then process probe directives that satisfy the condition, and ignore probe directives that do not satisfy the condition.

2.2 Synthesizing with Probe Directives

FIG. 3 shows the general design and debugging process in accordance with the present invention. The designer writes HDL with probe directives 150. The probe directives identify the places in the resulting mapped circuit that the designer might wish to examine. The designer might not initially know where probes will be required until later in the design process. The probes have no impact on functionality so functional simulation 101 and functional repair 102 proceed as before. The designer also constrains synthesis 103 as before.

Synthesizing with probes 154 differs from conventional synthesis 104 in the translation step. When an improved translator encounters a probe directive, that translator creates an optimization invariant structure at that point in the GTech circuit. The optimizer then produces a new mapped circuit with additional optimization invariant structures. In one embodiment, the probed portions of the HDL source are treated as both primary inputs and primary outputs during translation and optimization. Alternate embodiments of implementing probe directives are described later.

The mapped circuit analysis step 105 proceeds as before. After analysis, the tool then uses information developed during translation to relate the results of the analysis to the HDL source as indicated by step 120.

With the information gleaned from the probes, the designer can now identify problems and evaluate solutions that directly change the HDL, as shown in step 121.

After completely analyzing and debugging the design, the mapped circuit is fabricated in step 106.

2.3 Method for Implementing Probe Directives

FIG. 7 shows a method of implementing probe directives. The process begins in step 4110 by constructing a parse tree from the HDL source text using conventional parsing techniques. The data structure representation of the parse tree should efficiently link the characters in the text to the parse node containing those characters, and additionally, it should efficiently allow identifying the characters associated with a parse node. One technique for relating particular pieces of text with corresponding parts of a parse tree is described in a co-pending application by Gregory entitled "Method and Apparatus for Context Sensitive Displays", filed on Jun. 3, 1994 as U.S. application Ser. No. 08/253,453, which is hereby incorporated by reference.

In step 4120, the parse nodes corresponding to various probe directives are marked. The details of this process are explained in a later section. There are three types of probe directives: statement probes, block probes, and multi probes. Multi probes can be transformed into zero or more statement or block probes and then treated as such. This transformation will be described in a later section; this section assumes that multi probes have been previously transformed.

A statement probe is a single text string. The parse node that "follows" the single text string is the parse node to mark. A block probe consists of two text strings: a begin block statement and an end block statement. In general terms, the parse nodes "between" the begin block and end block statements are the parse nodes to mark.

In step 4130, the unprobed GTech circuit is constructed from the marked parse tree constructed in step 4120 using conventional techniques, such as those described in the references incorporated earlier. The GTech circuit translation process also constructs a list of parts and nets associated with each parse node.

In step 4140, step 4150, and step 4160, optimization invariant GTech circuit structures are added for each marked parse node. One approach to adding an optimization invariant GTech circuit structure is to create a primary input and a primary output. The following paragraphs will elaborate on how this is done. Additional methods for creating optimization invariant circuit structures will be described in a later section. Note that the digital circuit functionality is preserved by connecting that primary input and primary output at the next higher hierarchical level. Therefore, in step 4135, an additional level of hierarchy is added if the digital circuit does not have a higher level of hierarchy and there are marked parse nodes.

In step 4140, all of the parts that were created from marked parse nodes are marked. Thus, some parts are marked.

In step 4150, nets associated with the marked parts are marked. These marked nets will be broken by new primary input/primary output pairs in order to form optimization invariant GTech circuit structures. The nets to mark are identified as follows. First, note that the marked parts form a GTech sub-circuit. The GTech sub-circuit has input nets and output nets. A particular net is a GTech sub-circuit input net if the particular net is connected both to an input pin of a part in the GTech sub-circuit and to an output pin of a part not in the GTech sub-circuit or to a primary input. A particular net is a GTech sub-circuit output if the particular net is connected both to an output pin of a part in the GTech sub-circuit and to an input pin of a part not in the GTech sub-circuit or to a primary output.

By probing the input nets and/or the output nets of the GTech sub-circuit, the behavior of the GTech sub-circuit can be observed. Thus, there are several choices for marking the nets associated with the marked parts to allow the insertion of optimization invariant GTech circuit structures. One choice involves marking only the input nets to the GTech sub-circuit. Another choice involves marking only the output nets to the GTech sub-circuit. A third choice involves marking both the GTech sub-circuit's input nets and output nets. A fourth choice involves selecting nets that meet a search criterion defined in the search string portion of the probe directive.

One of the preceding options is chosen for marking the nets. Then, each of the marked parts is examined. The order in which the marked parts are examined is unimportant. Any nets which are connected to the part and which meet the marking criterion are marked. There is no significance to marking a net more than once.

In step 4160, an optimization invariant GTech circuit structure replaces each net marked in step 4150. There are several choices for creating such a structure for a marked net. As mentioned previously, one choice involves creating a new primary input and a new primary output for each marked net. Another choice involves creating only a primary output. Another choice involves attaching the net to a register. Another choice involves attaching a property or a characteristic to the net that instructs the optimizer not to modify the net. Another choice involves creating a new optimization part which is marked so that the optimizer will not modify it during optimization. This part has one input pin and one output pin. The net is then split into two parts. One part remains connected to all of the input pins on the original net and is also connected to the output pin of the new part. The other part remains connected to all of the output pins on the original net and is also connected to the input pin of the new part.

Figure 8:
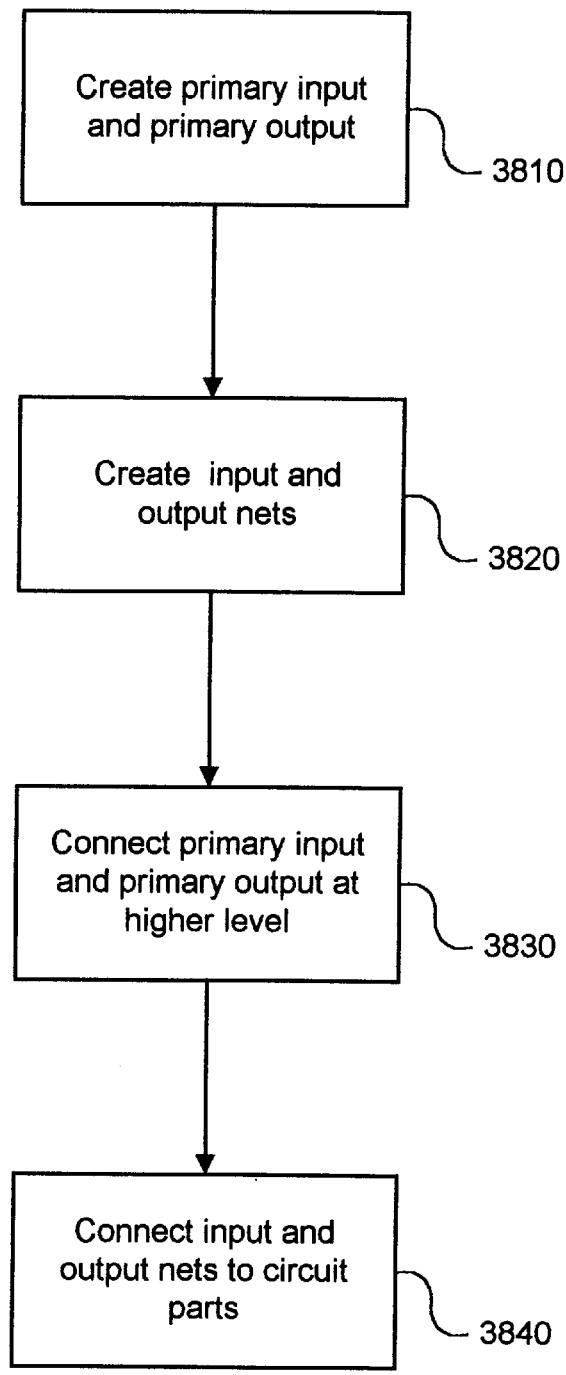
FIG. 8: shows how a primary input/primary output pair is created.

An advantage to creating the optimization invariant structure by adding a new primary input/primary output pair is that optimizers treat primary inputs and outputs as invariant. FIG. 8 shows how a new primary input/primary output pair is created for each marked net.

In step 3810, a new primary input and a new primary output are created.

In step 3820, an input net is created and attached to the new primary input. An output net is also created and attached to the new primary output.

In step 3830, because the GTech circuit being processed is part of a hierarchical design with a higher level, the new primary input and the new primary output are connected together with a new net at the higher level in the design.

In step 3840, the input and output nets are connected to the existing GTech ciruit. The output net is connected to every primary input connected to the marked net. The output net is also connected to any output (or driver) pins that are connected to the marked net. Note that if net marking was chosen to mark only output nets from the marked GTech sub-circuit, then the output net will be connected to the pins connected to the marked net that belong to parts that are not in the marked GTech sub-circuit. The input net is connected to every primary output connected to the marked net. The input net is also connected to any input (or load) pins that are connected to the marked net. Note that if net marking was chosen to mark only output nets from the marked GTech sub-circuit, then the input net will be connected to the pins connected to the marked net that belong to parts that are in the marked GTech sub-circuit.

In step 3840, the method shown may treat bidirectional pins as either input or output pins. However, all bidirectional pins should be treated in the same way.

2.3.1 Example

Figure 22:
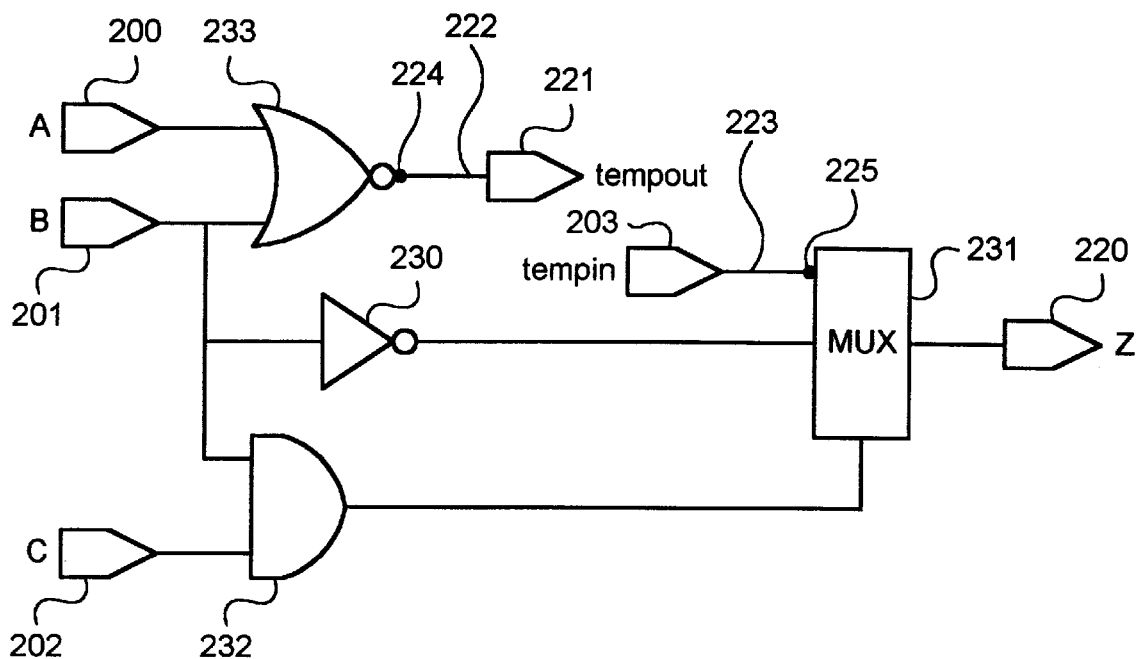
FIG. 22: Translation of the source in FIG. 16 according to the present invention.

The method described above can be used to create the GTech circuit shown in FIG. 22. First, consider the VHDL source shown in FIG. 16. The source text is repeated here for convenience:

```
1000if (C and B) then
1001 -- Synopsys probe_statement
1002Z <= not (A or B);
1003else
1004Z <= not B;
1005end if;
```

Figure 12:
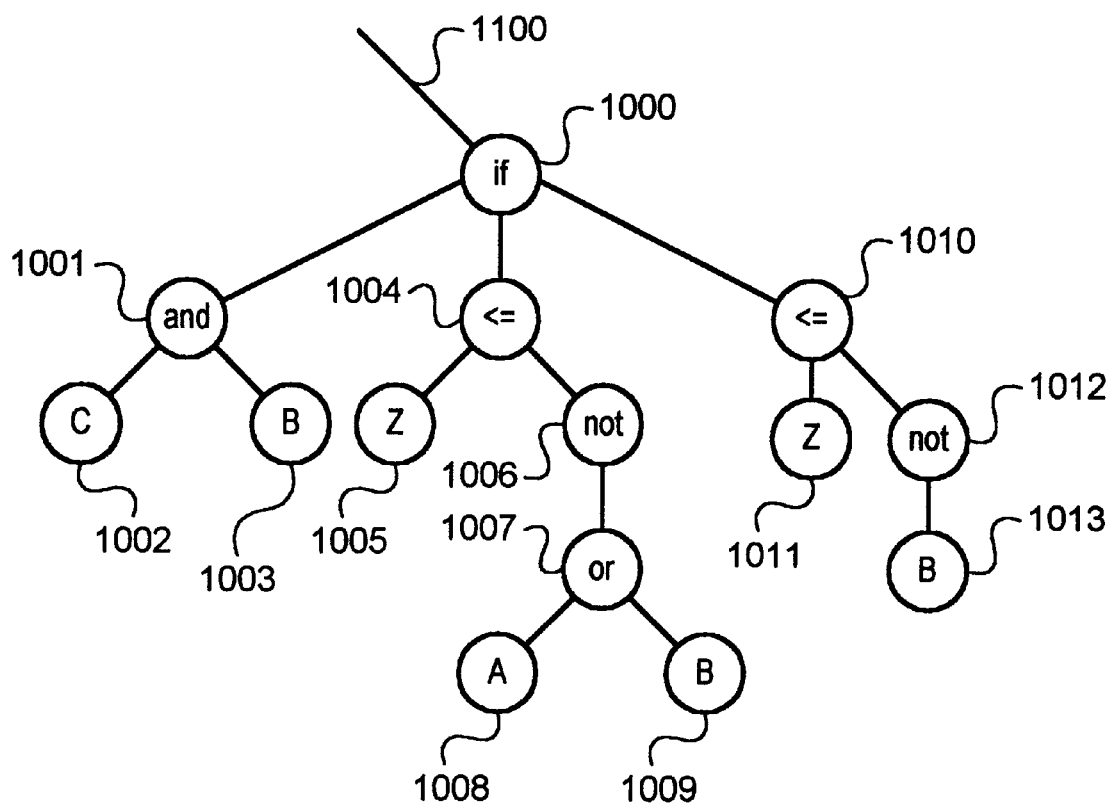
FIG. 12: A parse tree corresponding to the source fragment in FIG. 11.
Figure 16:
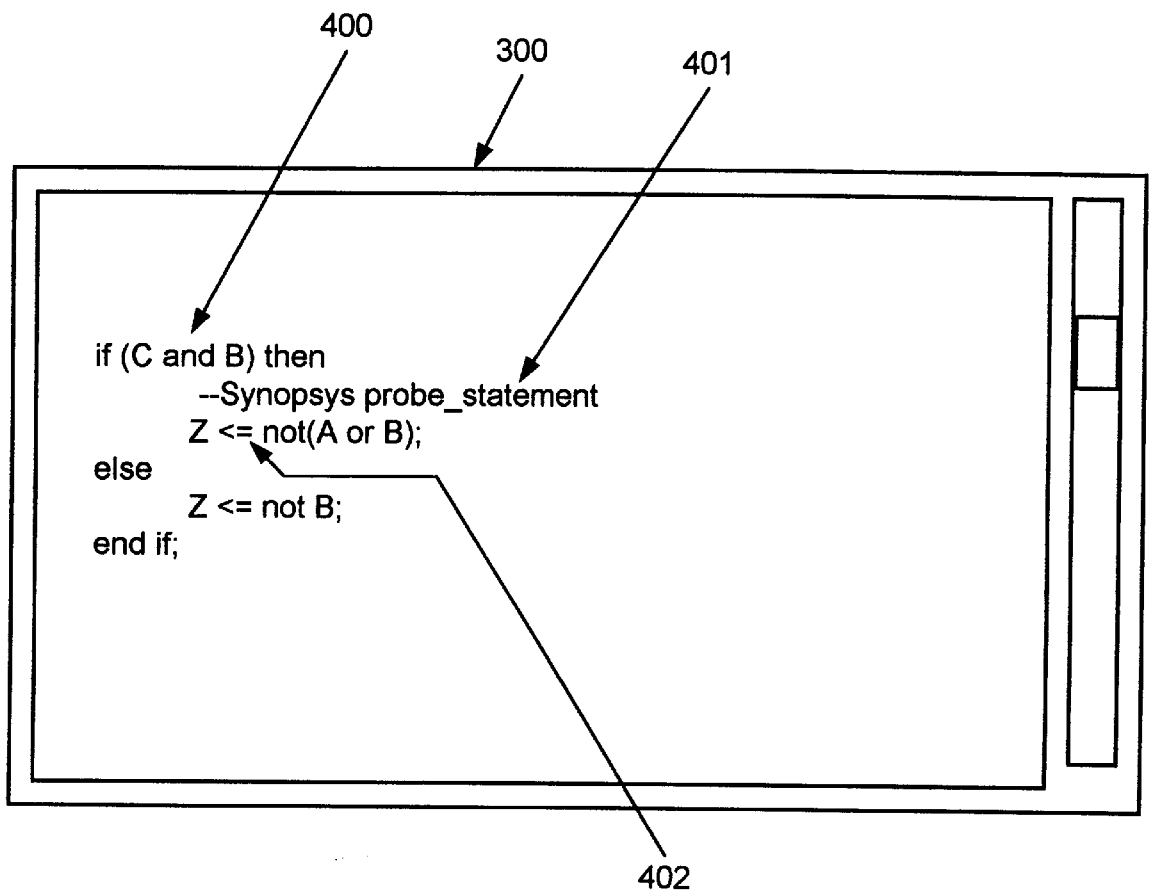
FIG. 16: The VHDL source in FIG. 11 with a statement probe inserted.
Figure 28:
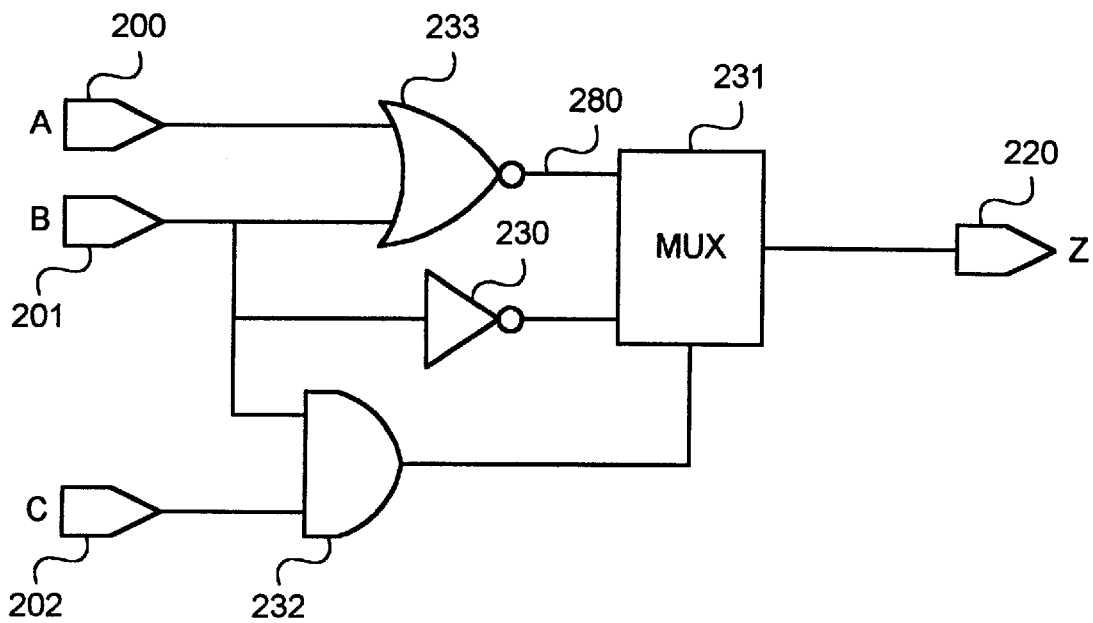
FIG. 28: A GTech circuit arising from the conventional translation of the source fragment in FIG. 11.

Comment 401 in FIG. 16 is a probe directive which causes statement 402 to be probed. The parse tree for the VHDL source is constructed in step 4110 of FIG. 7, and is shown in FIG. 12. In step 4120 the probe parse nodes are marked. In this case, node 1004 of FIG. 12 is marked. In step 4130, the parse tree is translated using conventional methods. The resulting GTech circuit is shown in FIG. 28. In step 4135, a level of hierarchy is added if necessary. For the purpose of this example, it is assumed that a level of hierarchy exists above the circuit fragment shown. In step 4140, the parts and nets from the marked parse node are marked. In this case, net 280 is marked, because it was created from statement 402. In step 4150, nets associated with marked parts are marked. Since there is only a marked net, no additional nets are marked. In step 4160, an optimization invariant circuit structure is added for each marked net.

In this example, a primary input and primary output pair will be added as shown in FIG. 8. The resulting GTech circuit is shown in FIG. 22. First, a new primary input 203 and primary output 221 are created in step 3810. Next, input net 223 and output net 222 are created in step 3820, and connected to primary input 203 and primary output 221 respectively. In step 3830, primary input 203 and primary output 221 are connected at a higher level of hierarchy. In step 3840, the input net 223 and output net 222 are connected to the rest of the GTech circuit. Input net 223 is connected to all of the driver pins that were connected to net 280. In this case, input net 223 is connected to driver pin 224 on nor gate 233. Output net 222 is connected to all of the load pins that were connected to net 280. In this case, output net 222 is connected to load pin 225 on multiplexor 231.

3.0 Implementation Particulars

This section contains specific details of how the links between the domains are established and maintained.

3.1 Creating the Text to Parse Node Link

HDL source is first parsed to create a parse tree. The nodes in the parse tree must be linked back to the original HDL source in order to enable tracing from the HDL source to the mapped circuit. This section describes how the parse tree to HDL source relationship is established and used.

Parsing involves creating a parse tree from an array of text in accordance with the rules of a language. Co-pending application by Gregory entitled "Method and Apparatus for Context Sensitive Displays", filed on Jun. 3, 1994 as U.S. application Ser. No. 08/253,453, provides an overview of the parsing process and provides an efficient data structure for relating text and parse nodes. This section explains how to use the relationship between text and parse nodes. In particular, a method to relate a probe directive to the appropriate parse node is discussed.

3.1.1 Notation Demarcating Text into Parse Nodes

Figure 9:
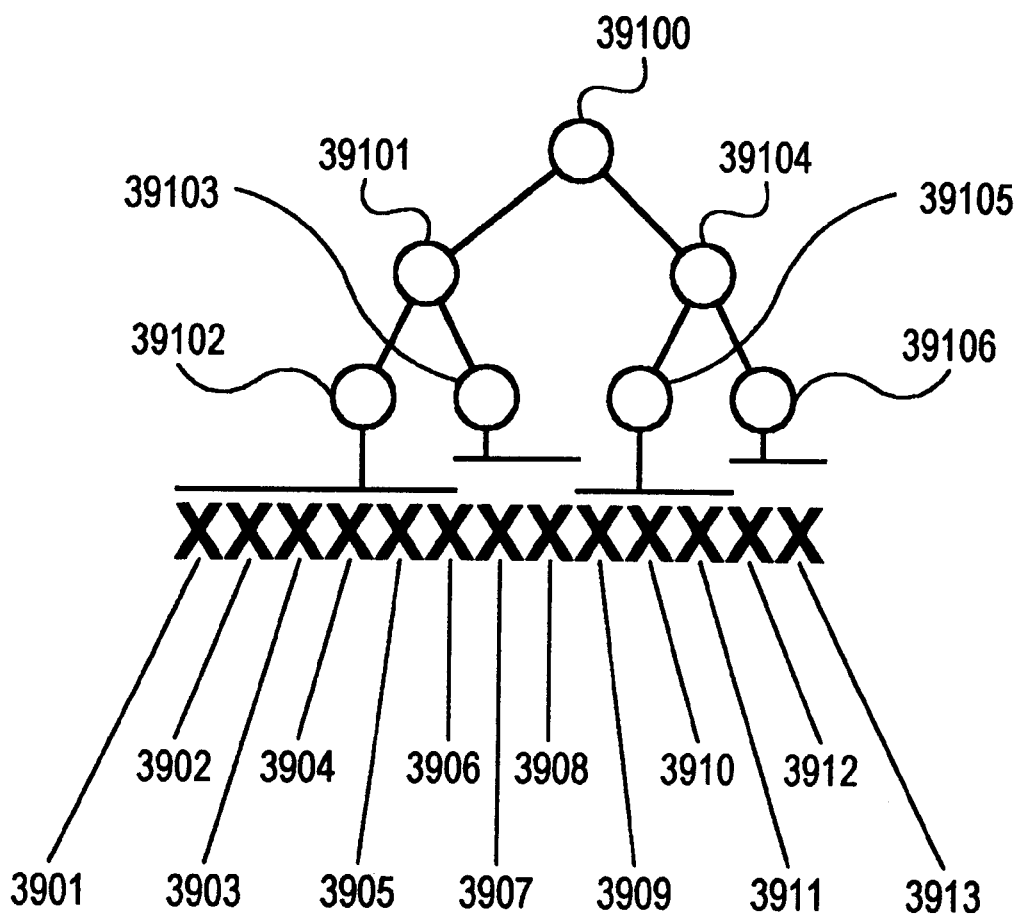
FIG. 9: illustrates a parse tree associated with some text.

FIG. 9 illustrates a parse tree associated with some text. This example comes from co-pending U.S. application Ser. No. 08/253,453. The parse tree consists of nodes 39100, 39101, 39102, 39103, 39104, 39105, and 39106. The characters 3901 through 39013 represent generic characters. Using conventional parsing methods, characters are grouped into parse nodes. When parsing is complete, characters are associated with the parse node they define. In this example, characters 3901, 3902, 3903, 3904, 3905 and 3906 are associated with node 39102. Characters 3907 and 3908 are associated with node 39103. Characters 3909, 3910 and 3911 are associated with node 39105 and characters 3912 and 3913 are associated with node 39106.

Figure 10:
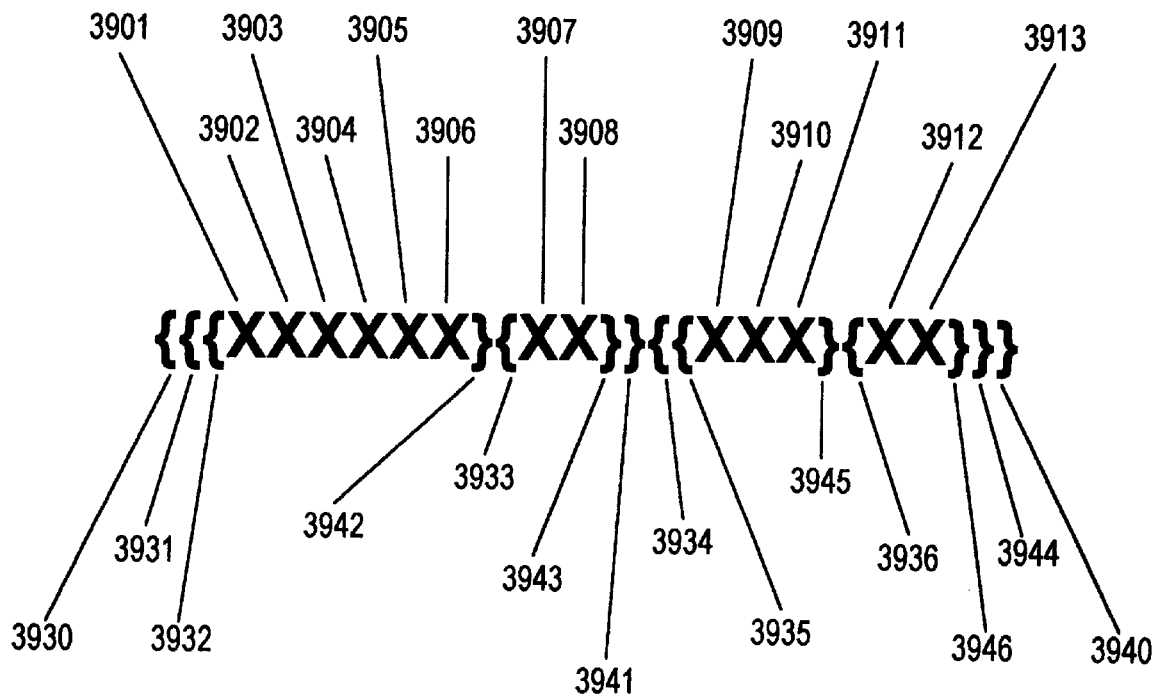
FIG. 10: illustrates a text representation of the parse tree" using "{" to mark the beginning of a node and "}" to mark the end of a node.

FIG. 10 illustrates a text representation of the parse tree using "{" to mark the beginning of a node and "}" to mark the end of a node. This representation is called a parse array. For example, left brace 3930 and right brace 3940 together contain all of the text and nodes associated with node 39100. Left brace 3931 and right brace 3941 demarcate the text and nodes associated with node 39101. Left brace 3932 and right brace 3942 demarcate the text associated with node 39102. Left brace 3933 and right brace 3943 demarcate the text associated with node 39103. Left brace 3934 and right brace 3944 demarcate the text associated and nodes with node 39104. Left brace 3935 and right brace 3945 demarcate the text associated with node 39105. Left brace 3936 and right brace 3946 demarcate the text associated with node 39106.

Note that pairs of left and right braces are nested within each other. For example, brace 3933 and brace 3943 are nested within brace 3931 and brace 3941. They are also nested within brace 3930 and brace 3940. Thus, characters may be surrounded by multiple pairs of braces. For example, character 3907 is surrounded by all three of the pairs of braces mentioned above. However, brace 3933 and brace 3943 make up the innermost pair of braces which surround character 3907. The concepts of leftmost and rightmost are also useful. An array is considered to be a contiguous list of characters, the first of which is the leftmost character of the array. Each successive character is considered to be to the right of its predecessor. The last character in the array is the rightmost character of the array. Thus, a character is considered to be "leftmost" if it is the character furthest to the left which fills a condition. Respectively, a character is considered to be "rightmost" if it is the character furthest to the right which fills a condition. For example, brace 3943 is the leftmost right brace to the right of character 3907.

3.1.2 Text-To-Parse Node Mapping and Parse-Node-to-Text Mapping

Mapping text to and from the containing parse node is explained in co-pending U.S. application by Gregory filed on Jun. 3, 1994 as U.S. application Ser. No. 08/253,453. The previous section showed a notation that related the parse nodes to braces implicitly embedded in the text. A given character in the text is mapped to the parse node that corresponds to the innermost braces that contain that character.

Figure 11:
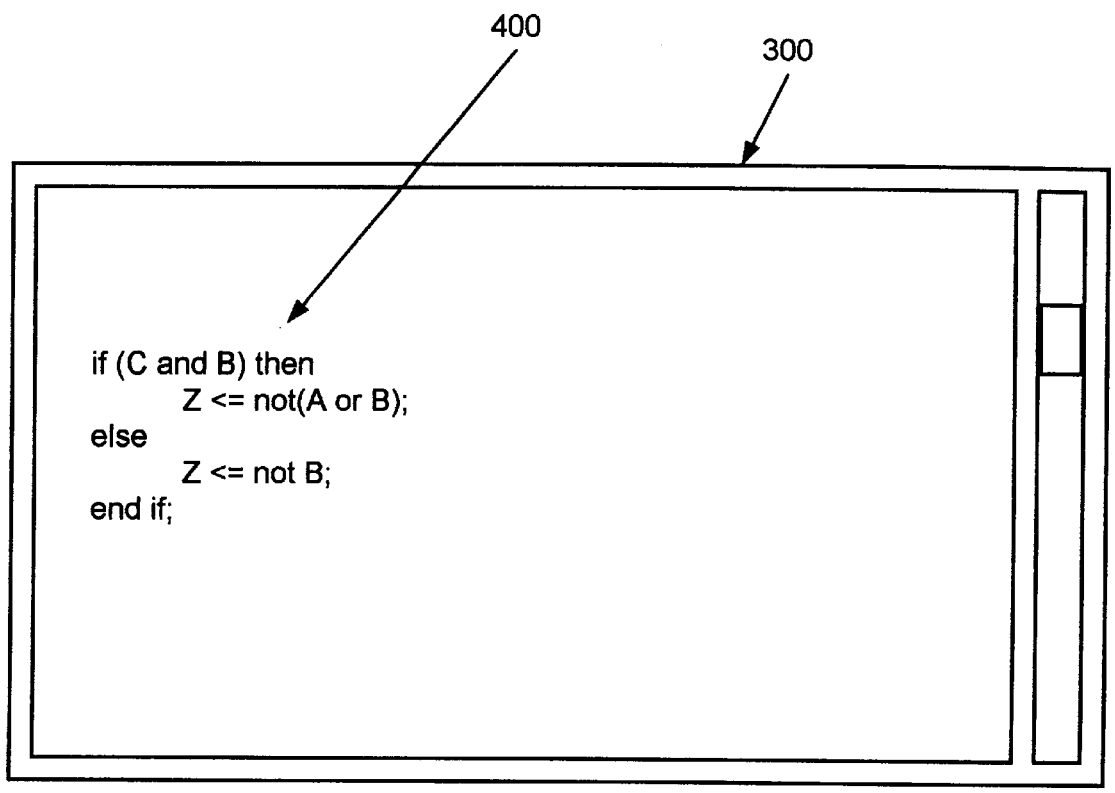
FIG. 11: An example of VHDL source with no probes.

FIG. 11 shows an example of HDL source. FIG. 12 shows the parse tree which is generated from this source. FIG. 13 shows the same HDL source as a text array. FIG. 14 shows the text array of FIG. 13 with embedded brace "{ }" characters surrounding each portion of the text that forms a parse node. FIG. 15 shows the annotated text array with each left brace "{" numbered. The line breaks in the figures depicting arrays exist only to allow the drawings of the arrays to fit on the page. A computer program treats arrays as contiguous lists of characters. The characters "\n" and "\t" indicate newline and tab characters respectively.

Note that FIG. 15 shows an alternate representation of the characters as "X" as explained in co-pending U.S. application by Gregory filed on Jun. 3, 1994 as U.S. application Ser. No. 08/253,453. For the purposes of clarity, the figures in this application will show the actual characters, although the technique explained in co-pending U.S. application, by Gregory filed on Jun. 3, 1994 as U.S. application Ser. No.

08/253,453 may be used to improve the performance and memory requirements of the system.

As an example, character 4132, the "o" in "or", will be traced to its corresponding parse node. First, the parse node containing character 4132 is determined. This is the parse node that begins with brace 4307, since it is the parse node corresponding to the innermost braces containing character 4132. Next, the parse node number is determined. This is done by counting the number of left braces which precede brace 4307. Since there are 7 left braces prior to brace 4307, it represents node number 7. Note that this number is the same number that is calculated by performing a preorder traversal of the original parse tree and numbering each node as it is traversed.

Locating the text which corresponds to a given parse node uses the same data structures. First, the number of the parse node is ascertained. In one embodiment, the number of the parse node of interest is stored with the parse node. In one embodiment, the number of the parse node of interest is calculated from the parse tree by performing a preorder traversal and numbering each node as it is traversed. In one embodiment, the number of the parse node is calculated from the parse array as described above. In one embodiment, the number of the parse node is available because it has been previously stored. Once the number of the parse node is determined, the associated text is found by counting left braces in the parse array until the correct number is reached. Any text between the correct left brace and its balancing right brace is related to the parse node.

For example, the or expression can be found by counting to the seventh brace, brace 4307 (starting from 0), in the annotated text array.

3.2 Parsing Probe Directives

In one embodiment, probe directives are comments within the HDL language. During conventional lexical analysis and parsing, comments are discarded by the lexical analyzer or the parser. Therefore, probe directives must be parsed specially in order to determine which parse nodes are affected by each probe directive. This section describes how probe directives modify the parse tree. The modified parse tree is used to determine where additional optimization invariant structures must be created during translation.

3.2.1 Processing Statement Probes

In one embodiment, the parse node associated with a statement probe corresponds to the HDL statement following the statement probe. One way to implement this is to determine the parse node associated with the text immediately following a statement probe using the text-to-node mapping previously described, and mark that node. This is possible because the parse array contains all of the characters in the source text. The parse array embeds the parse node boundaries into the text. The probe directives can be identified by scanning the parse array after it has been built. They are then used to mark the appropriate parse nodes.

Figure 17:
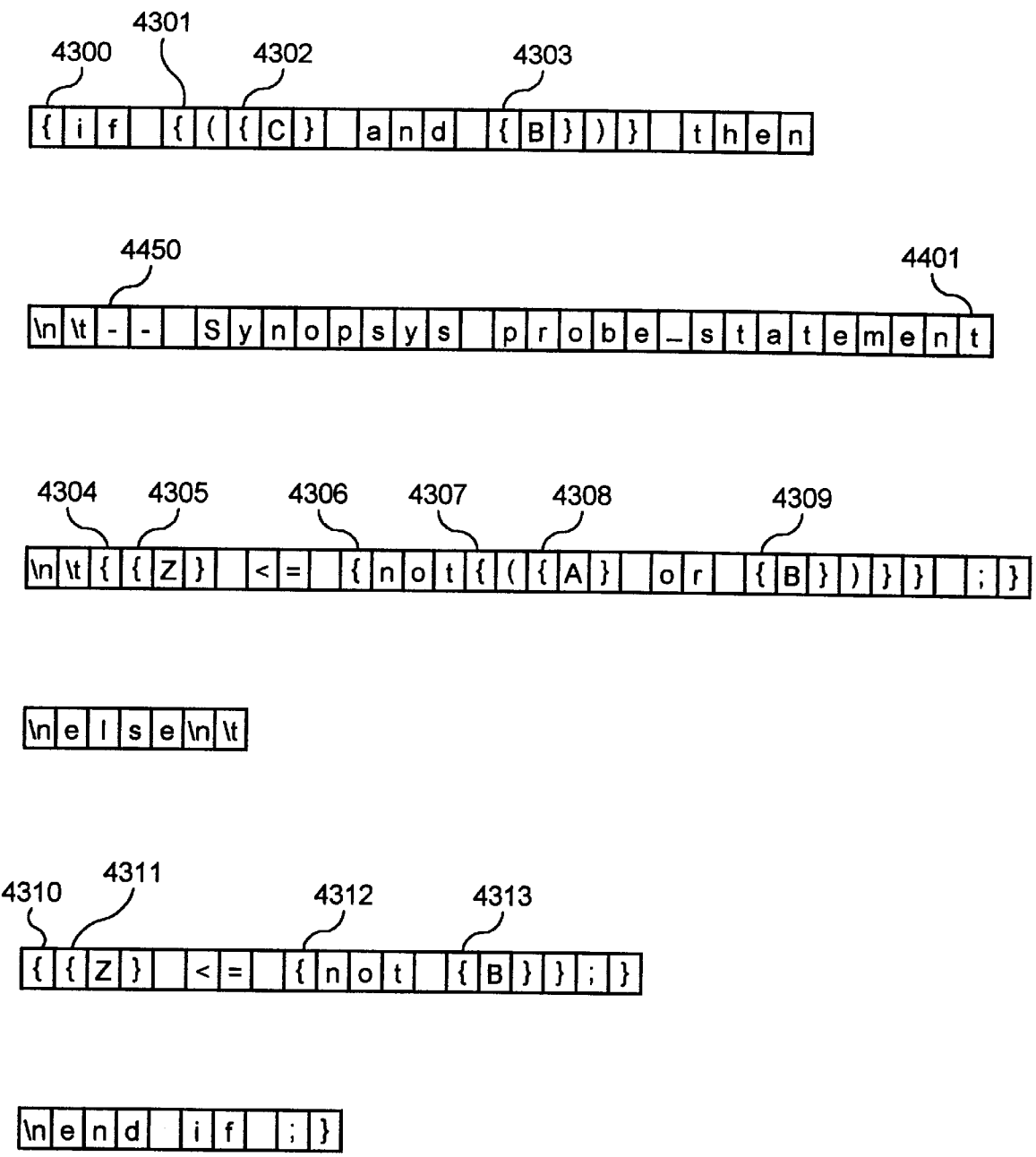
FIG. 17: shows the text of FIG. 16 as a linear array of characters with parse node braces inserted.

FIG. 12, FIG. 16, FIG. 17, and FIG. 11 illustrate processing probe directives with an example. FIG. 12 shows an HDL code fragment. FIG. 16 shows the same HDL code fragment containing a statement probe 401. FIG. 17 shows the text of FIG. 16 as a linear array of characters with parse node braces inserted. FIG. 11 shows the parse tree. After parsing is complete, a conventional text searching technique such as used in the "grep" command in UNIX can identify character 4450 as the first character of the statement probe. The text-to-node mapping will identify the parse node beginning at brace 4304 as the first parse node following the statement probe. This parse node is the node whose opening left brace is the first left brace to the right of the probe directive beginning at character 4450.

Note that text of the probe directive cannot contain a parse node nor can it be divided by a parse node because the probe directive is within a comment in the underlying HDL language.

Figure 19:
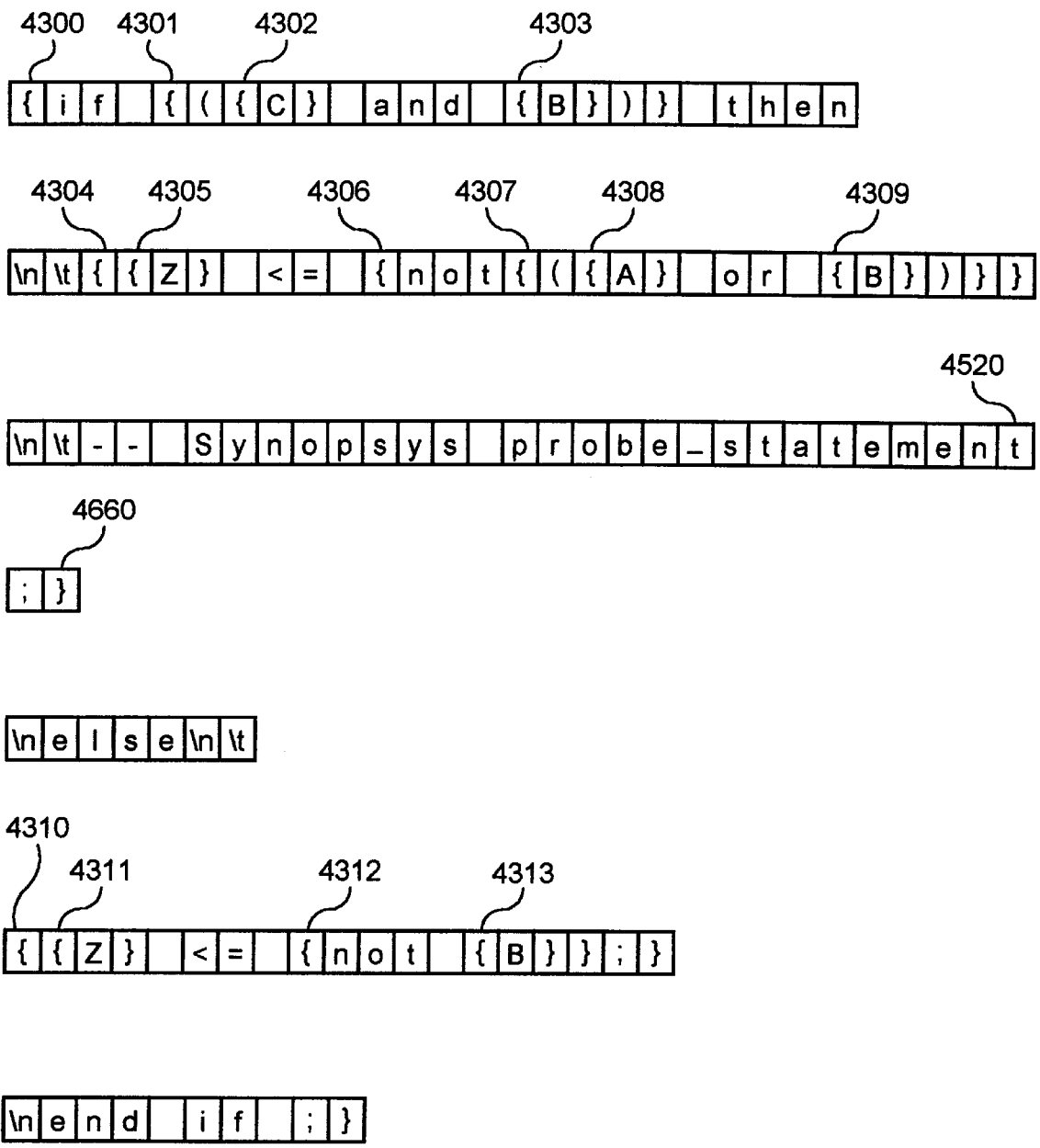
FIG. 19: shows the brace representation of FIG. 18.

FIG. 18 and FIG. 19 illustrate a situation that, in one embodiment, should be treated as an error. If the text of a statement probe does not immediately precede an HDL statement, then there is no next statement to select. The HDL text in FIG. 18 illustrates this situation. Statement probe directive 4520 should be treated as an error. FIG. 19 shows a brace representation of the situation. This error occurs whenever a right brace "}" is located after the probe directive text and before the next left brace "{". Brace 4660 is such a brace. One method of dealing with this situation is to stop processing probe directives. Another method of handling this situation is to ignore the probe. In one embodiment, a message can be sent to the designer by the HDL analysis system describing the problem and the action taken.

An alternate embodiment would use statement probes to select the HDL statement preceding the text of the probe. This would require that the parse node immediately preceding the probe directive be marked. This parse node can be found by finding the first right brace "}" to the left of the text of the probe directive. The corresponding left brace "{" for this right brace is then identified and the parse node number is ascertained from this left brace as described previously. One disadvantage to using probe directives which select the preceding text is that the probe directive must follow all lines of a complex statement.

3.2.2 Processing Block Probes

Block probe directives are defined by a starting text string and an ending text string. The starting and ending text strings are processed in a very similar manner to statement probes. The parse nodes to mark for block probes are found as follows. Identify the parse node immediately following the starting text string of the probe directive with the text-to-node mapping described earlier, and call this parse node the starting parse node. Identify the parse node preceding the ending text string with the text-to-node mapping described earlier, and call this parse node the ending parse node.

In addition, identify the parse node which contains the starting probe directive and the parse node which contains the ending probe directive. As described earlier, the containing node is the parse node whose defining braces are the innermost pair of braces which fully enclose the probe directive. If the starting probe directive and the ending probe directive are not contained by the same node, then a logical error has occurred.

Figure 20:
FIG. 20: shows some HDL source with a pair of embedded block probe directives.
Figure 21:
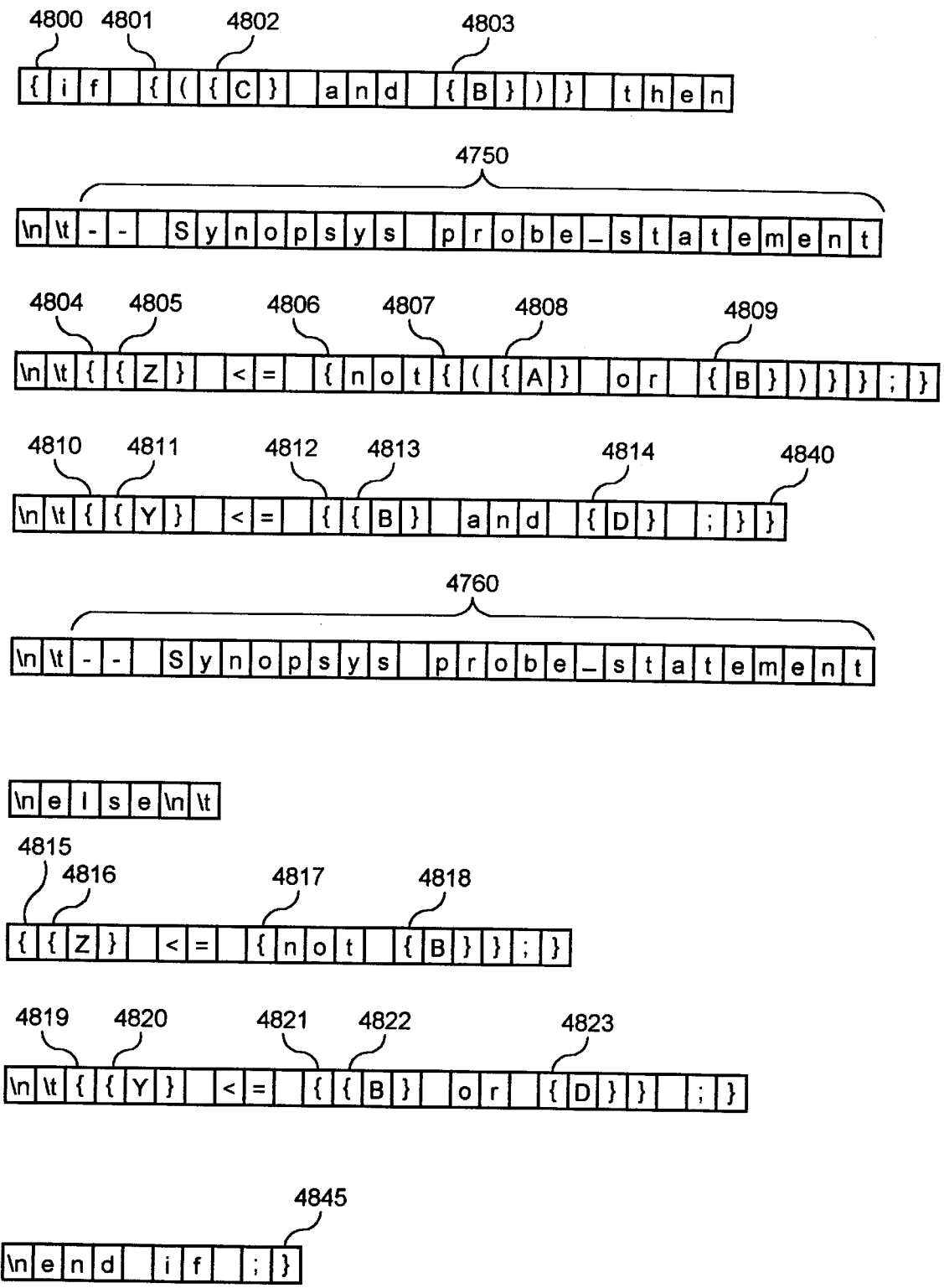
FIG. 21: shows the brace representation for the HDL source of FIG. 20.

Consider the HDL source text shown in FIG. 20. The parse nodes for this source text using the brace notation are shown in FIG. 21. As before, the parse node boundaries are denoted with the brace characters "{" and "}". Probe directive 4750 is the starting block probe directive. Probe directive 4760 is the ending block probe directive.

Applying the text-to-parse-node mapping function described earlier to starting block probe directive 4750 produces starting parse node begun by brace 4804. This is because brace 4804 is the leftmost right brace to the right of starting block probe directive 4750. Similarly, applying the text-to-parse-node mapping function to the ending block probe directive 4760 yields ending parse node begun by brace 4810. This is because brace 4840 is the rightmost right brace to the left of ending block probe directive 4760, and brace 4810 the left brace corresponding to brace 840.

The innermost containing parse node for both starting block probe directive 4750 and ending block probe directive 4760 is the parse node defined by starting brace 4800. A parse node is the innermost containing parse node for a probe directive if its left brace is before the probe directive, and its right brace is the leftmost right brace which comes after the probe directive but has its matching left brace before the probe directive.

Note that brace 4845 is the leftmost right brace to the right of starting block probe directive 4750 which has its matching left brace before starting block probe directive 4750. Brace 4845 is also the leftmost right brace to the right of ending block probe directive 4760 which has its matching left brace before ending block probe directive 4760. Thus, this is a legal pair of block probe directives.

Once it is determined which are the starting and ending parse nodes, those parse nodes and all parse nodes which fall between the starting and ending parse nodes are marked. During translation, the marked parse nodes are processed as described previously. For example, in one embodiment, the outputs of the logic block defined by the block probe will be preserved by optimization invariant structures.

One troublesome situation that might arise is that the text-to-parse-node mapping identifies different containing parse nodes when applied to the starting block probe directive and the ending block probe directive. This situation arises if the begin and end block probe directives are not placed within different syntactic blocks. Another troublesome situation occurs if the starting block probe directive is not placed immediately before a parse node or the ending block probe directive is not placed immediately after a parse node. In one embodiment, processing stops once an erroneous situation is detected. In another embodiment, the offending probe directives are ignored. In one embodiment, a message can be sent to the designer describing the problem and the action taken.

3.2.3 Processing Multi-Probes

A Multi-probe is a statement probe or a block probe with a search string which further specifies which logic is to be probed. In one embodiment, a multi-probe uses the phrase "multi-probe" following the keyword. The parse nodes associated with a multi-probe directive are identified using the methods described earlier if either a statement probe or a block probe is used. These parse nodes will be referred to as the initial parse node selection.

In one embodiment, the search string is used to mark some, or possibly all, parse nodes in the initial parse node selection. The marked parse nodes are then processed as before. There are different types of parse nodes, such as assignment, operator, or variable. The parse node types are defined by the particular HDL language. One use for the search string is to select parse nodes of a particular type. For example, the search string "all assignments" would result in marking the assignment parse nodes in the initial parse node selection. Another search string is "all statement sequences". This indicates that the parse nodes that correspond to the first and last statements in each statement sequence of the original selection are probed. Statement sequences are defined in the VHDL Language Reference Manual.

In another embodiment, the search string is used to specify which nets connected to the marked parts are marked. Recall that marked nets will be broken with optimization invariant structures. For example, the search string "all_mux_controls" indicates that the nets controlling muxes should be marked in the initial selection. This will cause all of the mapped mux controls to be linked to the HDL source after optimization.

Probe directives can be used to selectively group blocks of logic so that the effects of such logic blocks can be observed. Thus, another search string is "all case statements". This marks all parse nodes corresponding to case statements. A further search string is "all subroutine calls" which marks the parse nodes corresponding to subroutine calls. By using probe directives, which can be disabled using the priority feature, the designer can easily create temporary levels of hierarchy which can be used to analyze the mapped circuit structures created by specific portions of the HDL and then disabled once analysis is complete. Case statements and subroutine calls are two examples of common structures that the designer might wish to examine.

3.3 Alternate Implementations of Optimization Invariant Structures

Following are additional methods for creating optimization invariant GTech circuit structures for probe directives. Any of these methods can be used in step 4160 of FIG. 7. FIG. 22 shows an example of extracting both a primary input as well as a primary output.

3.3.1 Attaching Properties to Nets

Figure 23:
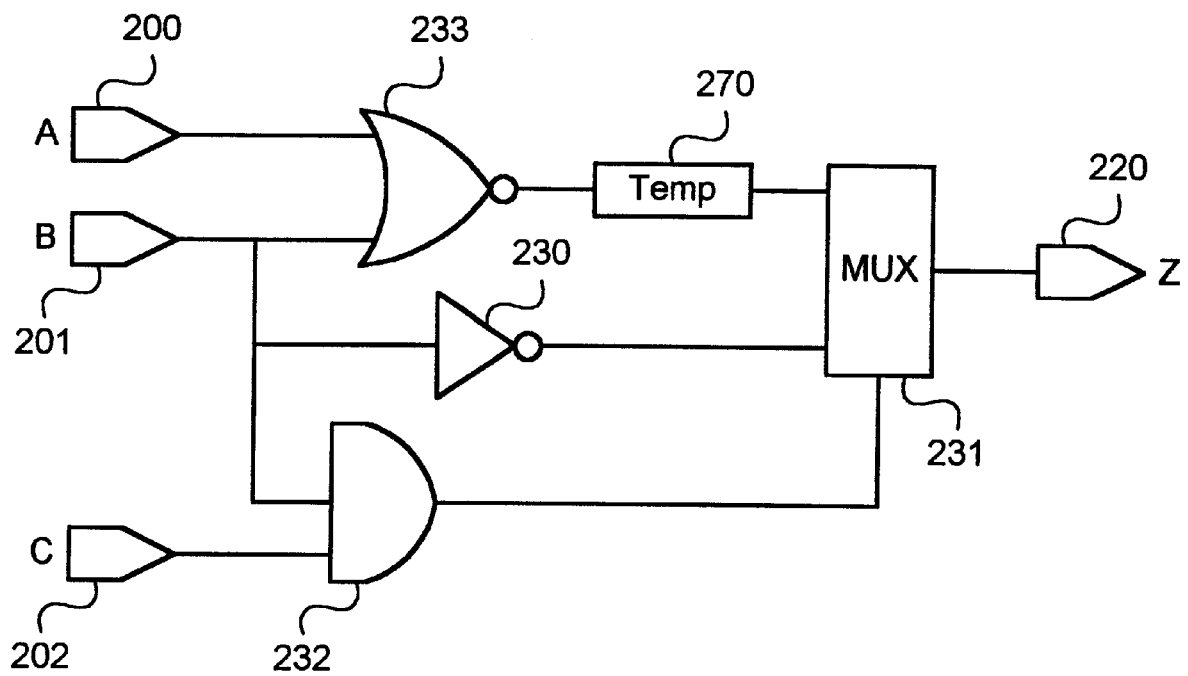
FIG. 23: An alternative method of implementing probes in accordance with the present invention.
Figure 24:
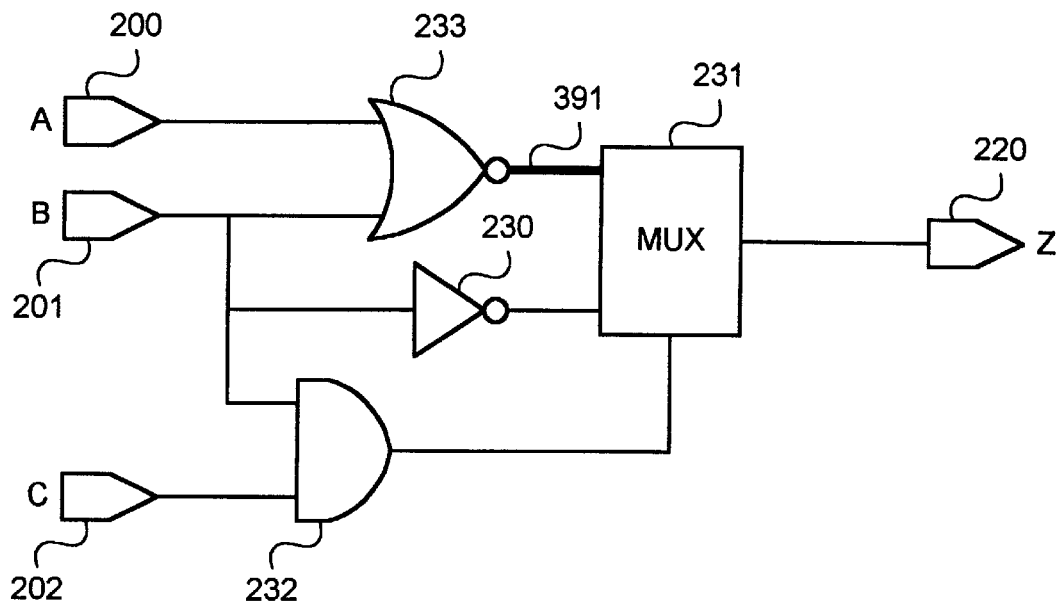
FIG. 24: A second alternative method of implementing probes in accordance with the present invention.

Another method of creating an initial GTech circuit with optimization invariant GTech circuit structures corresponding to the probe directives involves modifying the identification step in the optimization process. During the translation process, a net or a part corresponding to a probe directive is "marked." The identification step in the optimization process is changed to allow only "unmarked" nets or parts to be modified during optimization. The marking is implemented by attaching additional information to the net list prepared during the translation process. Alternatively, a marked net can be divided into an input net and an output net as before, and a new part added that connects the nets. This part is given a property that it may not be deleted during optimization. FIG. 23 and FIG. 24 show two example of a GTech circuit with optimization invariant structures. Net 391 is a marked net which cannot be modified during optimization. Part 270 is a marked part which cannot be modified during optimization. The disadvantage to marking a net as not modifiable is that if the net cannot change, then the total number of input and output pins on the net must remain the same. This means that none of the parts which are attached to the net can be deleted or combined during optimization.

3.3.2 Extracting Only a Primary Output

Figure 25:
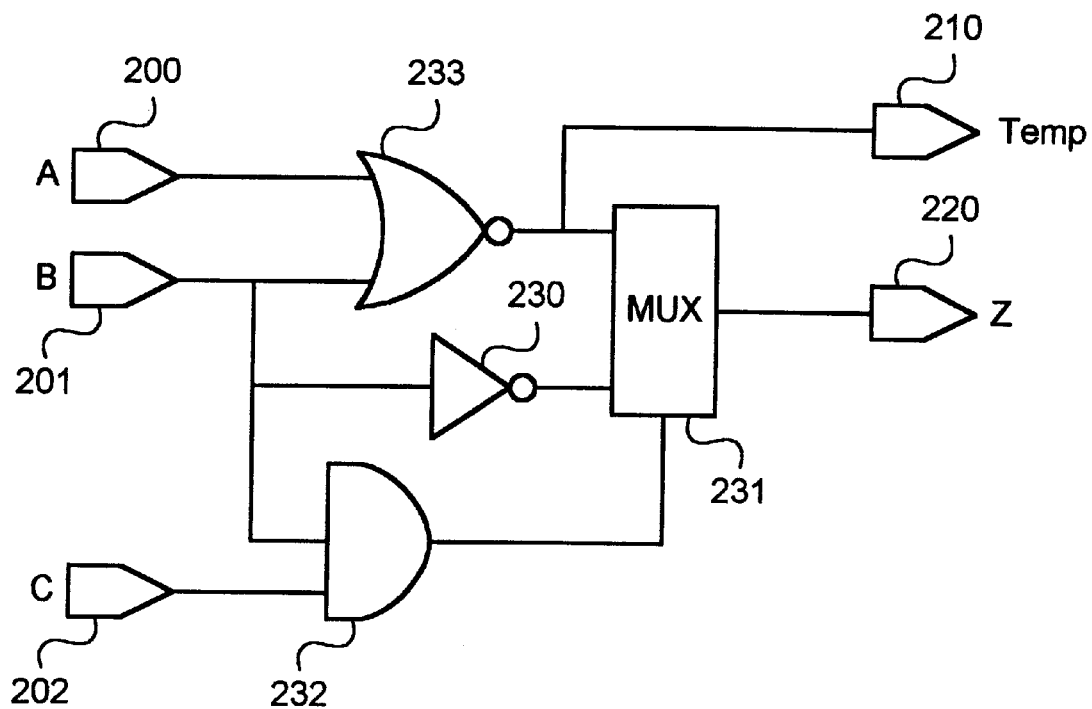
FIG. 25: A third alternative method of implementing probes in accordance with the present invention.

Another method of creating an initial GTech circuit with optimization invariant GTech circuit structures corresponding to the probe directives involves creating only a primary output at a higher level in the hierarchy. A sample GTech circuit with a primary output extracted is shown in FIG. 25. The method shown in FIG. 8 created both a primary input and a primary output. If only a primary output but no primary input is extracted, the marked net does not need to be divided into an input net and an output net. However, this technique might lead to unpredictable results during optimization.

Figure 26:
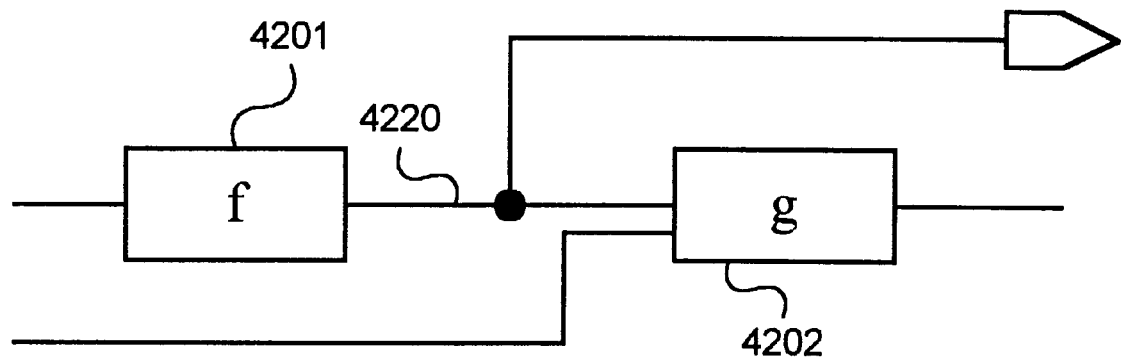
FIG. 26: shows a GTech circuit with an optimization invariant circuit structure implemented as a primary output.
Figure 27:
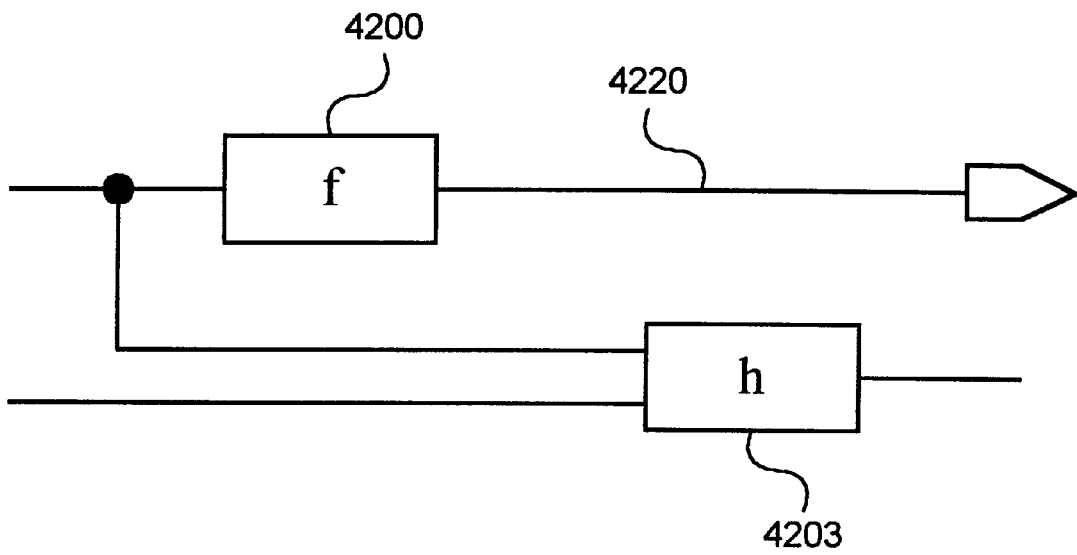
FIG. 27: shows the mapped circuit resulting from the GTech circuit of FIG. 26.

Consider the GTech sub-circuit shown in FIG. 26. Part 4201 computes function f, and produces an output on net 4220. Part 4202 computes function g. Net 4220 is marked and probed by attaching only a primary output. In some circumstances, the optimizer may effectively proceed by producing a mapped sub-circuit as shown in FIG. 27. For example, such a mapped sub-circuit might be produced if the optimizer is attempting to minimize the critical path. Here, part 4200 is a replica of part 4201, and computes f, which drives net 4220 as before. Part 4201 and part 4202 have been combined by the optimizer to produce part 4203, which computes h, a combination of f and g. While this mapped sub-circuit will produce the correct output, the timing information associated with the created primary output might not be useful because it is not associated with a signal path in the functioning part of the mapped sub-circuit. However, adding only a primary output is simpler than adding both a primary input as well as a primary output, might enable the optimizer to perform better than if a primary input/primary output pair were added, and might allow the designer sufficient traceability back to the original probe directive in the source HDL.

3.4 Examples 3.4.1 Mapped Circuit Analysis with Probe Directives

FIG. 11, FIG. 12, FIG. 25, FIG. 29, FIG. 16, FIG. 22, FIG. 30, FIG. 31, FIG. 32, FIG. 33, FIG. 34, FIG. 35, FIG. 36, FIG. 37, and FIG. 38 illustrate by example how probe directives work and how the mapped circuit analysis information is displayed to a user. The examples use VHDL as the source language. The principles illustrated do not depend on the particular language. For example, the system works with Verilog as well.

FIG. 11 shows a text editor window 300 containing an example of a VHDL code fragment 400 that does not contain any probe directives. The code fragment shown in FIG. 11 is repeated below:

```
1000if (C and B) then
1001Z <= not(A or B);
1002else
1003Z <= not(B);
1004end if;
```

FIG. 12 shows a graphical representation of the parse tree constructed while translating the source code in FIG. 11. The "if" statement in VHDL has three parts: a condition, a VHDL statement to process when the condition is true; and a VHDL statement to process when the condition is false. The condition is dealt with in the tree descending from node 1001. The true condition is handled by the tree descending from node 1004. The false condition is handled by the tree descending from node 1010. The assignments represented by nodes 1004 and 1010 are used to link the signal values represented by node 1005 and node 1011 to their functions represented in the trees descending from nodes 1006 and 1012 respectively.

Without a probe directive, the VHDL fragment translates into the GTech circuit of FIG. 25 using conventional synthesis translation techniques described earlier. Inputs A, B, and C are schematically represented by the connectors 200, 201, and 202. The "if" statement translates into multiplexor 231. The condition "(C and B)" would translate into and gate 232. The "true" condition translates into nor gate 233 while the "false" condition translates into inverter 230.

Figure 29:
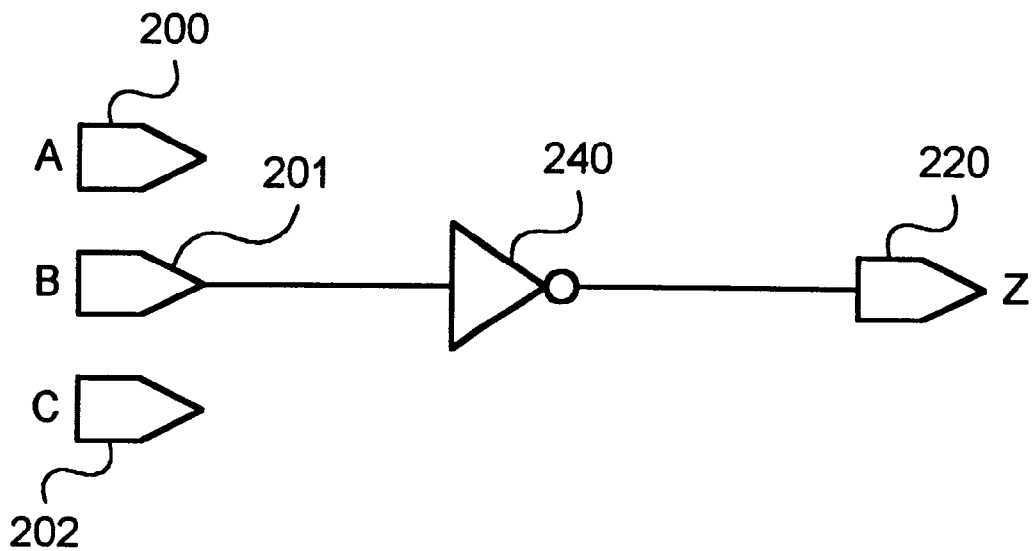
FIG. 29: An optimized mapped circuit created from the GTech circuit of FIG. 25.

FIG. 29 shows a mapped circuit optimized from the GTech circuit of FIG. 25. In particular, the logic function that this code fragment really performs is not(B). At this point, without probes in the conventional synthesis design process, the designer can not obtain much information about the internal timing information descending from the fragment. For example, if the designer needed to know when the value of not(A or B) was computed to help analyze some other aspect of the design, then the designer would not be able to deduce that information from the resulting analysis of the circuit in FIG. 28.

FIG. 16 shows a probe directive 401 inserted into the source description. The code fragment is repeated below:

```
1005if (C and B) then
1006--Synopsys probe_statement
1007Z <= not(A or B);
1008else
1009Z <= not(B);
1010end if;
```

In VHDL, "—" begins a comment. The word "Synopsys" immediately after the "—" indicates that this is not an ordinary comment, but rather a directive to the translator or other part of the computer aided design tool environment. The word "probe_statement" indicates that the subsequent VHDL statement should be processed by the translator so that it will be possible to relate subsequently obtained analysis information to this point in the HDL representation of the digital circuit.

FIG. 22 shows a GTech circuit produced by a translator from the code fragment shown in FIG. 16 with the probe directive. The parse tree produced with the probe directive is the same as before, namely the tree of FIG. 12. However, the probe directive will cause the signal represented by node 1005 to behave as both a primary output and a primary input.

In one embodiment, the translator adds temporary input 203 and new temporary output 221 while creating the GTech circuit of FIG. 22 from the parse tree. In addition to creating this GTech circuit, the translator connects the new temporary input to the new output at a higher level in the net list produced from translating the whole specification. This effectively makes this internal node visible at a higher level in the design hierarchy.

Figure 30:
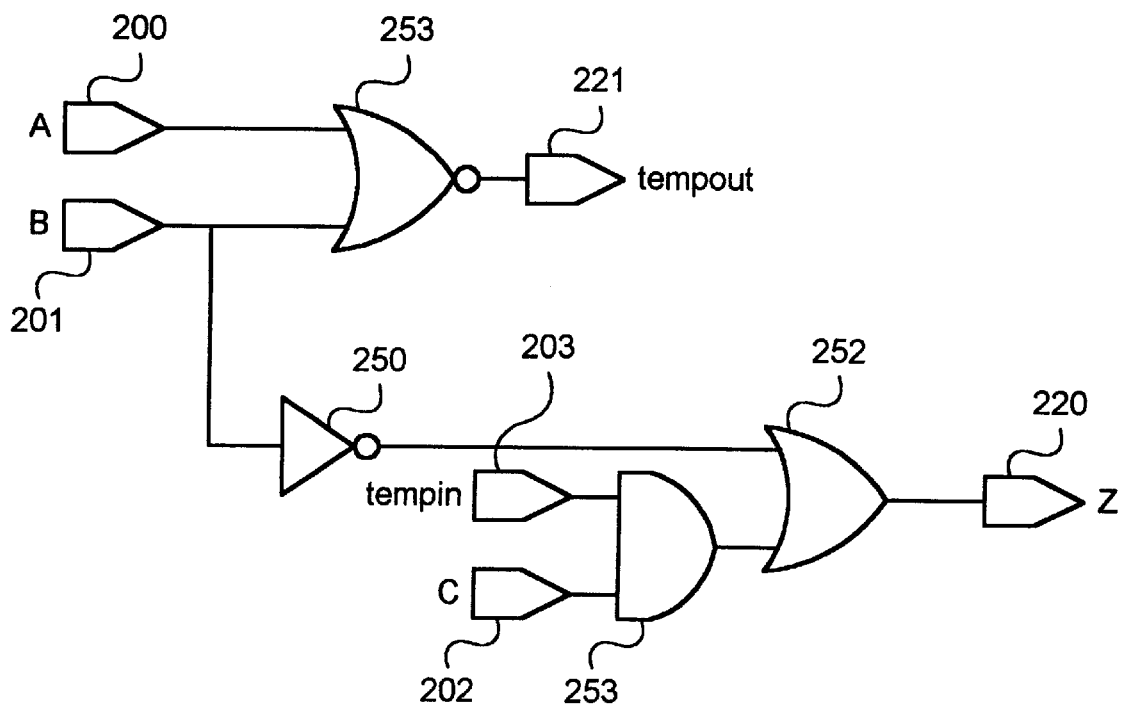
FIG. 30: An optimized mapped circuit derived from the GTech circuit of FIG. 22.

FIG. 30 shows the mapped circuit of FIG. 22 after optimization. The optimizer is not permitted to optimize GTech circuits past the boundaries established by the probe directive. This means that nor gate 233 of FIG. 22 would be transformed into nor gate 253 of the optimized mapped circuit. The optimization process begins with a GTech circuit that does not have timing or area information associated with the GTech components. After the optimization process, the mapped components do have area and timing information associated with them. Therefore, nor gate 233 in FIG. 22 is not "the same" as nor gate 253 in FIG. 30.

Figure 31:
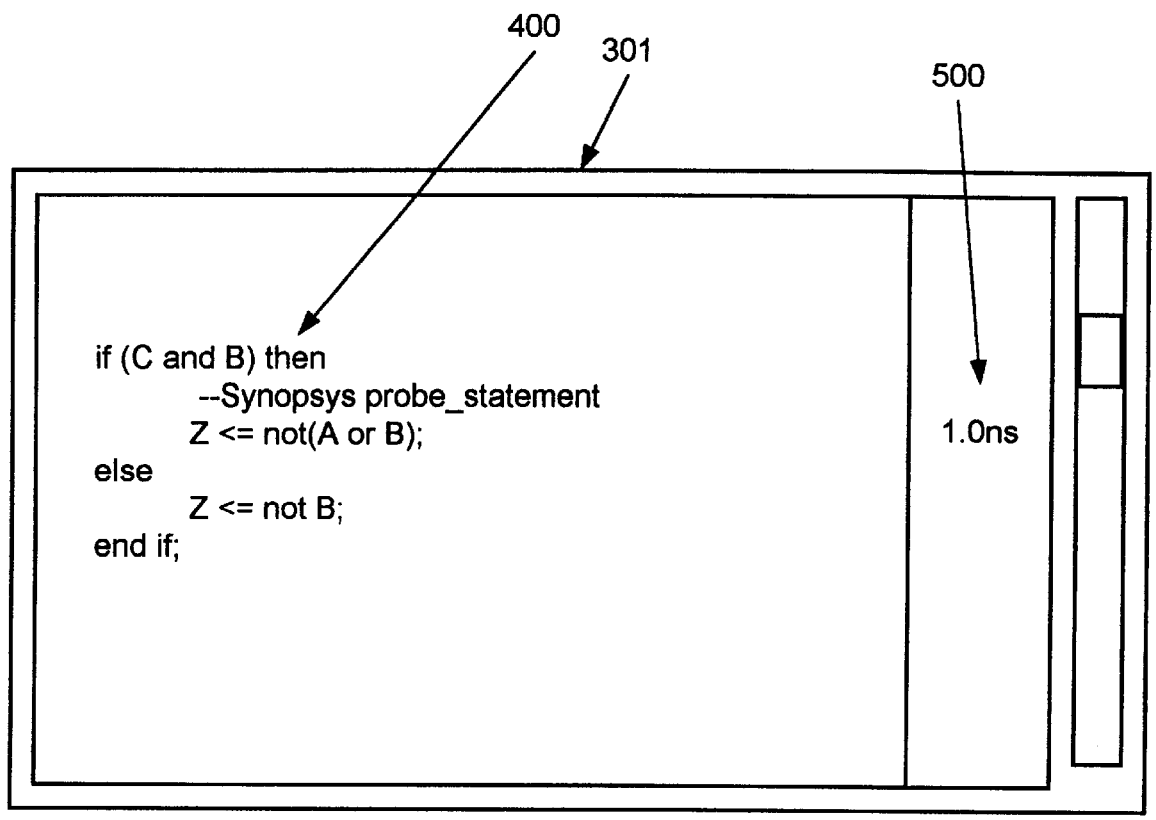
FIG. 31: An example of a display relating information found from analysis of the optimized mapped circuit of FIG. 30 to the source HDL.

Because the logic optimization process left temporary input 203 and temporary output 221 alone, and those points correspond to a particular point in the HDL source, any analytic result related to temporary input 203 or temporary output 221 can be identified with the probe directive 401 in the HDL. FIG. 31 shows the relation of timing information to the HDL source text through a special text window 301. For example, suppose a critical path analysis tool determined that it took 1.0 nanoseconds to produce temporary output 221 of FIG. 30 after a clock edge arrived at a flip-flop somewhere else in the mapped circuit. By using the fact that temporary output 221 came from this line of the source, the timing result 500 can be displayed next to the appropriate line of the output.

3.4.2 Example of Block Probe Directive

FIG. 32, FIG. 33, FIG. 34, FIG. 35, FIG. 36, FIG. 37, FIG. 38, and FIG. 39 show another way to use probes to evaluate the performance of blocks of HDL code. FIG. 32 shows a text window with an HDL entity described. This text has no probe directives inserted, and the code is repeated below.

```
1011entity interrupt_controller is
1012 port(new_request : in bit_vector(3 downto 1);
```

```
1013 current_level: in bit_vector(1 downto 0);
1014 should_service: out bit);
1015 end;
1016
1017 architecture synthesizable of interrupt_controller is
1018 signal new_level: bit_vector(1 downto 0);
1019 begin
1020 decode: process(new_request)
1021 begin
1022   if(new_request(3) = '1') then
1023     new_level <= "11";
1024   elsif(new_request(2) = '1') then
1025     new_level <= "10";
1026   elsif(new_request(1) = '1') then
1027     new_level <= "01";
1028   else
1029     new_level <= "00";
1030   end if;
1031 end process;
1032
1033 compare: process(current_level, new_level)
1034 begin
1035
1036   if(new_level(1) > current_level(1)) then
1037     should_service <= '1';
1038   elsif(new_level(1) < current_level(1)) then
1039     should_service <= '0';
1040   elsif(new_level(0) > current_level(0)) then
1041     should_service <= '1';
1042   else
1043     should_service <= '0';
1044   end if;
1045
1046 end process;
1047 end;
```

The function of this VHDL source code model is to compute whether a new interrupt of a particular priority should be serviced given priority over the interrupt being serviced. A request for a processor interrupt arrives on inputs new_request[3], new_request[2], or new_request[1]. The input current_level[1:0] indicates the priority level of the interrupt currently being serviced. If the request for an interrupt comes in on a higher level input than the current level of the interrupt being serviced, then the should_ service output is set. Otherwise, it is set low.

This source code computes the interrupt service request in two steps. First, it determines the level of the highest pending interrupt request in the process labeled decode. Second, it compares that level with the current interrupt level.

Figure 33:
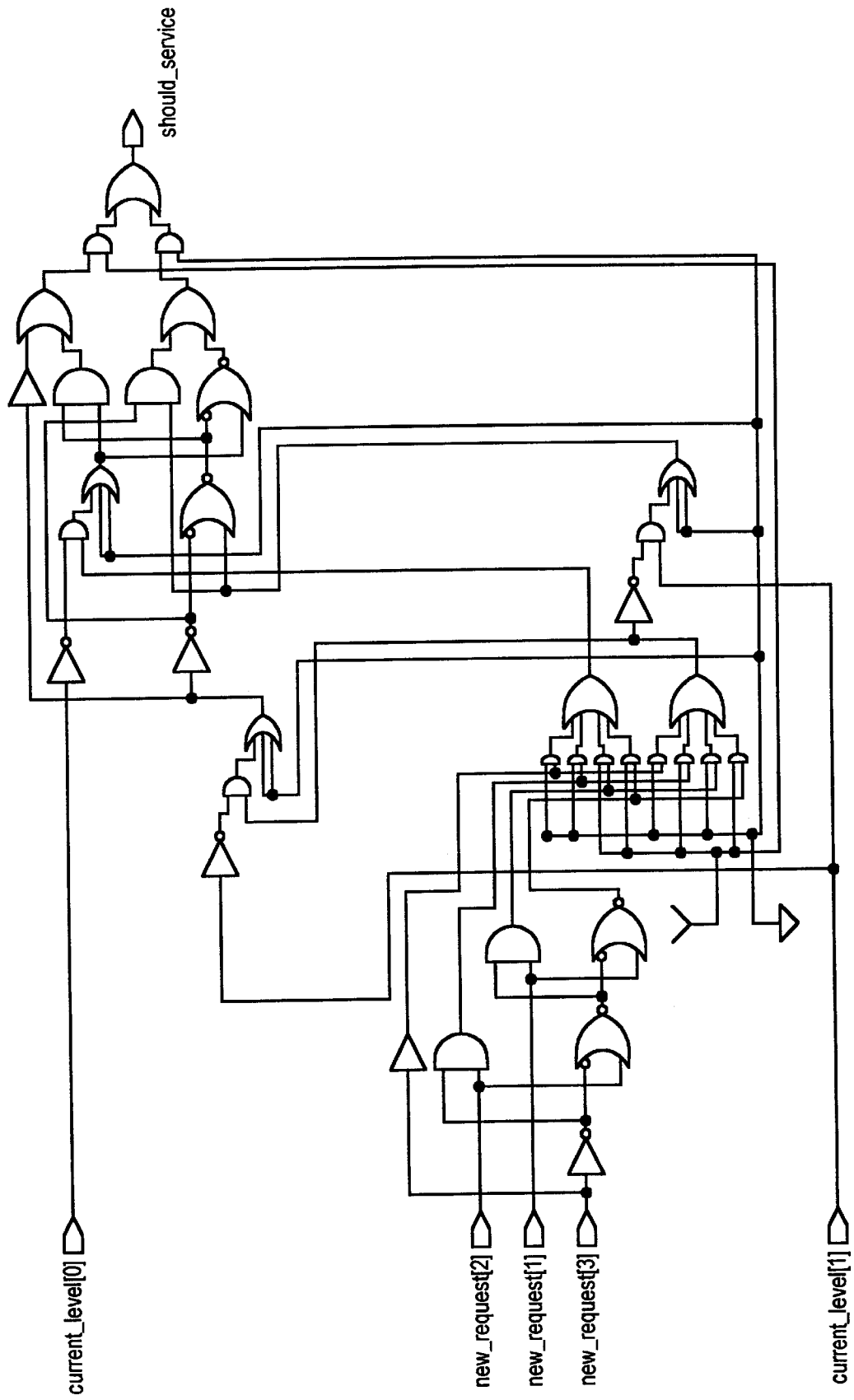
FIG. 33: Conventional translation of the source in FIG. 32 into a GTech circuit.
Figure 34:
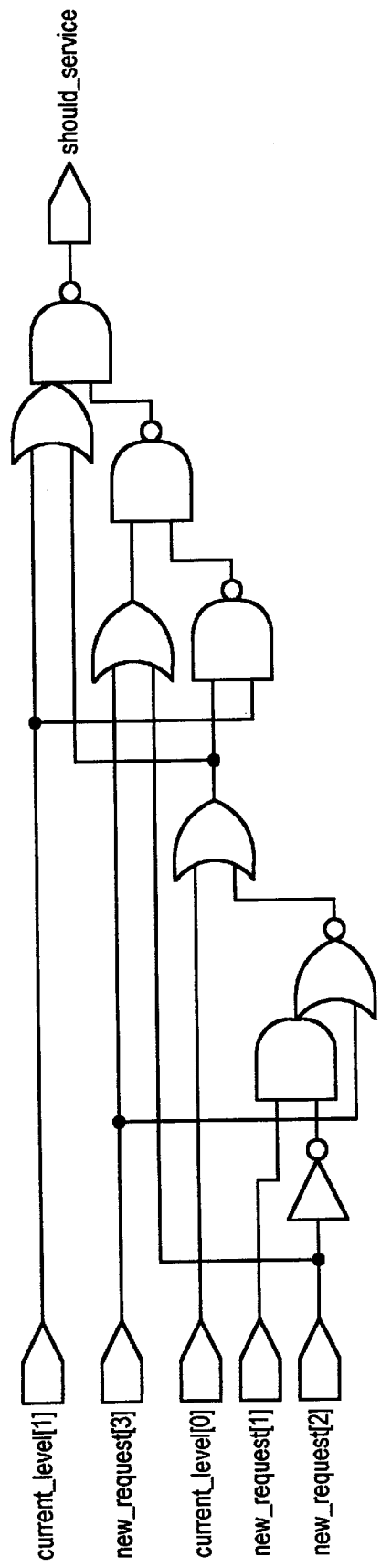
FIG. 34: An optimized mapped circuit derived from the GTech circuit of FIG. 33.

FIG. 33 shows the GTech circuit resulting from translating the VHDL source. FIG. 34 shows the mapped circuit that results from optimizing the GTech circuit in FIG. 33.

FIG. 35 shows a special text window that summarizes some of the performance information about the mapped circuit. The analysis tool can provide information about the design as viewed from the inputs. For example, one analysis tool would provide an estimate of the area of the design by counting gates. Another analysis tool would compute the longest delay through the entire design. The designer could compare this information with the designer's requirements to determine if this mapped circuit is too big or too slow. The optimization process blurred the distinction between the decode function and the compare function. It is not feasible for a designer to determine the area or the delay associated with each function.

To determine where the problems lie, the designer would insert "block probes" textually near the definition of the decoding and comparing processes, as shown in the text window of FIG. 36. This would probe all signals entering or leaving the sequence of HDL code delineated by the begin block and end block statements. When translated, the probed HDL becomes the GTech circuit of FIG. 37. The translator would create temporary inputs 2010 and 2011, and temporary outputs 2000 and 2001, much as it did with the statement probe.

Figure 37:
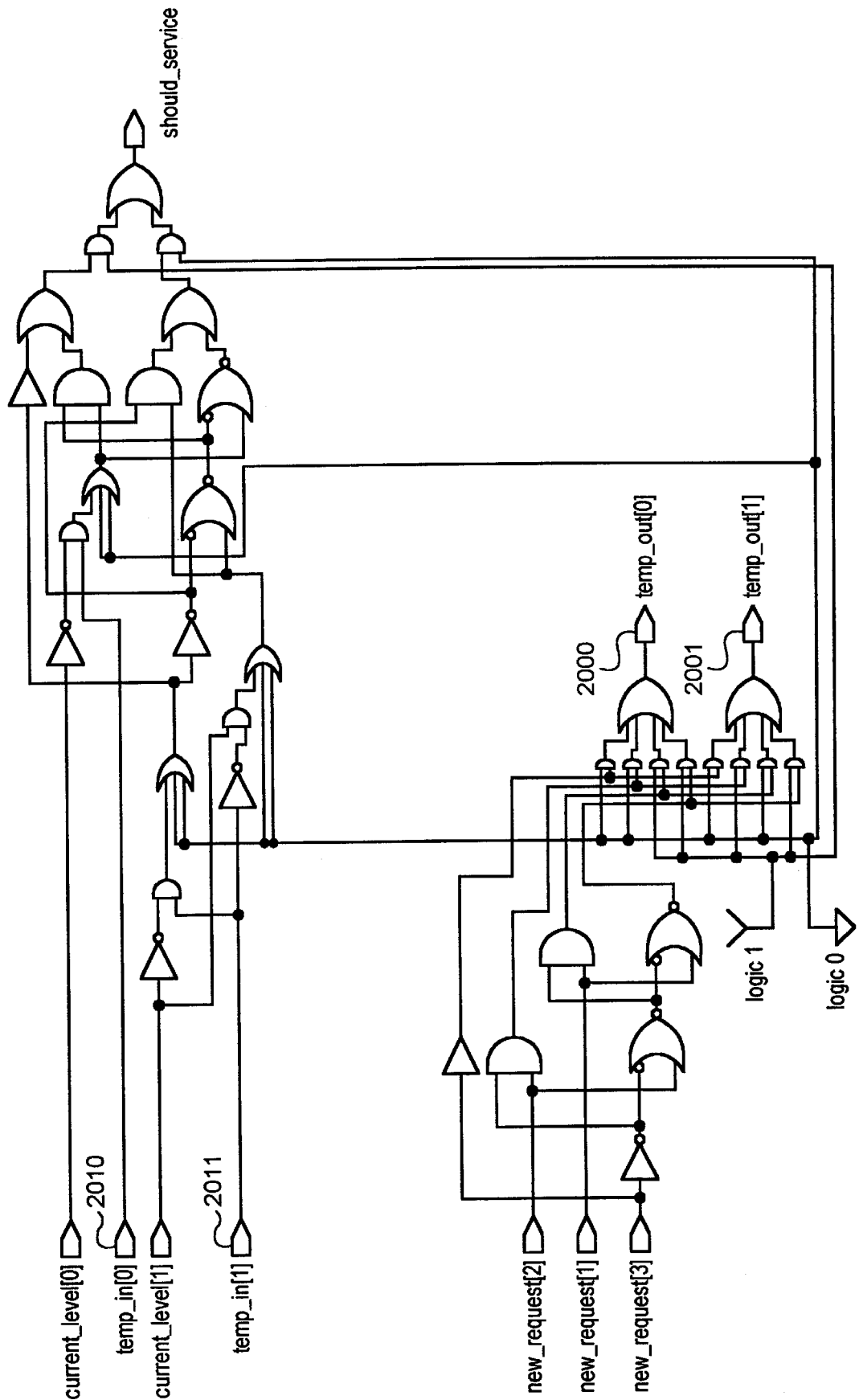
FIG. 37: A GTech circuit generated by translating the VHDL source of FIG. 36.
Figure 38:
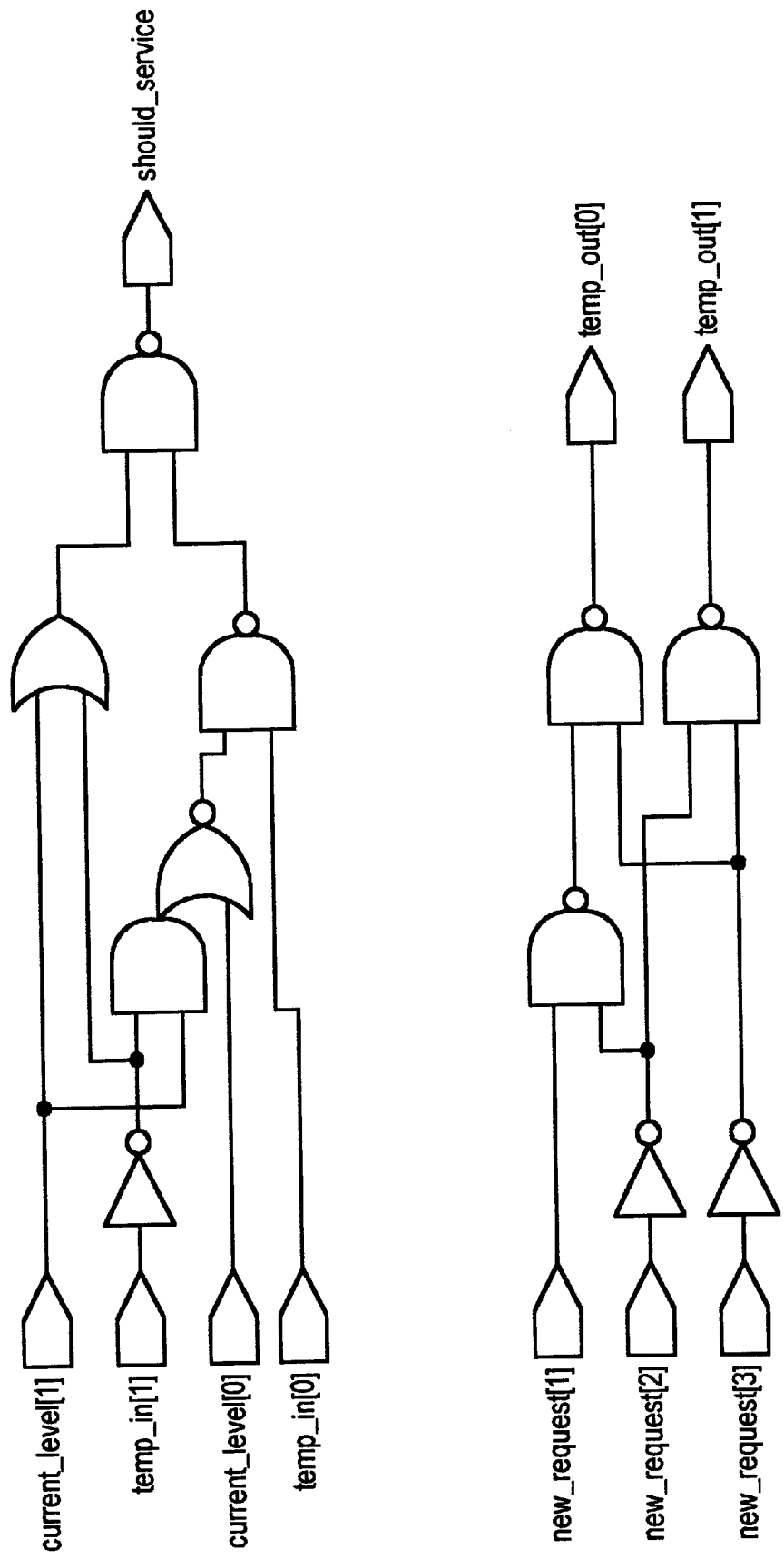
FIG. 38: The mapped circuit obtained by optimizing the GTech circuit of FIG. 37.

The optimizer transforms the GTech circuit of FIG. 37 into the mapped circuit of FIG. 38. This allows the analysis tools to compute timing and area characteristics of both parts of the mapped circuit. A special purpose display tool can then display, for example, timing and area analysis, as shown in FIG. 39. In this example, the decoding mapped circuit is approximately the same size and delay as the comparator mapped circuit.

4.0 Linking HDL Source to Circuit Analysis Tools

The previous sections describe how the HDL source can be related to the GTech or mapped circuit. Once the HDL source to GTech or mapped circuit relationship has been established, GTech or mapped circuit analysis tools can use this link to enable the designer to analyze the GTech or mapped circuit while viewing the source HDL. This section describes how an HDL source level analysis system is built using a variety of GTech and mapped circuit analysis tools which are linked back to the HDL source.

Many types of GTech and mapped circuit analysis software tools can leverage HDL source level analysis. Therefore, the system is designed to support any number of GTech and mapped circuit analysis tools. The system includes a central data manager. This data manager receives analysis queries from user level analysis tools, determines which analysis tool can respond to the query, and communicates the response to the appropriate user level display tool(s). Note also that the system uses the GTech or mapped circuit to text link to display the portion of the HDL text corresponding to the part of the GTech or mapped circuit which is relevant to the current query. During source level analysis, the HDL source text, a representation of the parse tree, the GTech circuit, and the mapped circuit are all simultaneously resident in the computer's memory.

One embodiment of an HDL source level digital circuit analysis system is described in the HDL Advisor User Guide, Version 3.3a, which is available from Synopsys, Inc. of Mountain View, Calif. and is hereby incorporated by reference.

The HDL Advisor has a central data manager. The central data manager supports two types of tools; display tools and analysis tools. Each display tool can display data in a certain format. For example, the HDL Advisor includes a stacked bar graph display tool, a histogram display tool, and a text display tool, among others. Each analysis tool can answer queries about a certain property of a digital circuit. For example, the HDL Advisor includes a timing verifier which can perform timing analysis on a mapped circuit. The central data manager coordinates communication between the display tools and the analysis tools.

The HDL Advisor remembers the current selection. The user makes a selection by using an input device such as a keyboard or mouse to indicate one or more display objects on the screen. Display objects are displayed in display tools and may have many different graphical representations. For example, a bar in a histogram, a fragment of text, or a drawing of a GTech gate are all display objects. Display objects are drawn by display tools to represent circuit objects. Each display tool maintains the correlation between each display object that it draws and the underlying circuit object. Circuit objects include any representation of a digital circuit structure in any domain. For example, a process statement, a GTech gate, and a mapped pin are all circuit objects which can be selected via a corresponding display object.

Display objects represent circuit objects in a specific domain. Thus, display objects can be used to select a circuit object in multiple domains. For example, ports can be selected in the source domain by selecting the line of HDL text which defines the port, in the GTech domain by selecting the symbol for the GTech port, or in the mapped domain by choosing the symbol for the mapped port. Chosen display objects are called the visual selection. The underlying circuit objects they represent are called the circuit selection. The HDL Advisor includes a selection manager which communicates the circuit selection to multiple display tools in multiple domains. The selection manager will be described further in a later section.

4.1 System Architecture Overview

This section provides an overview of the circuit analysis system architecture using two examples.

4.1.1 RelatingAnalysis Results to Source

Figure 58:
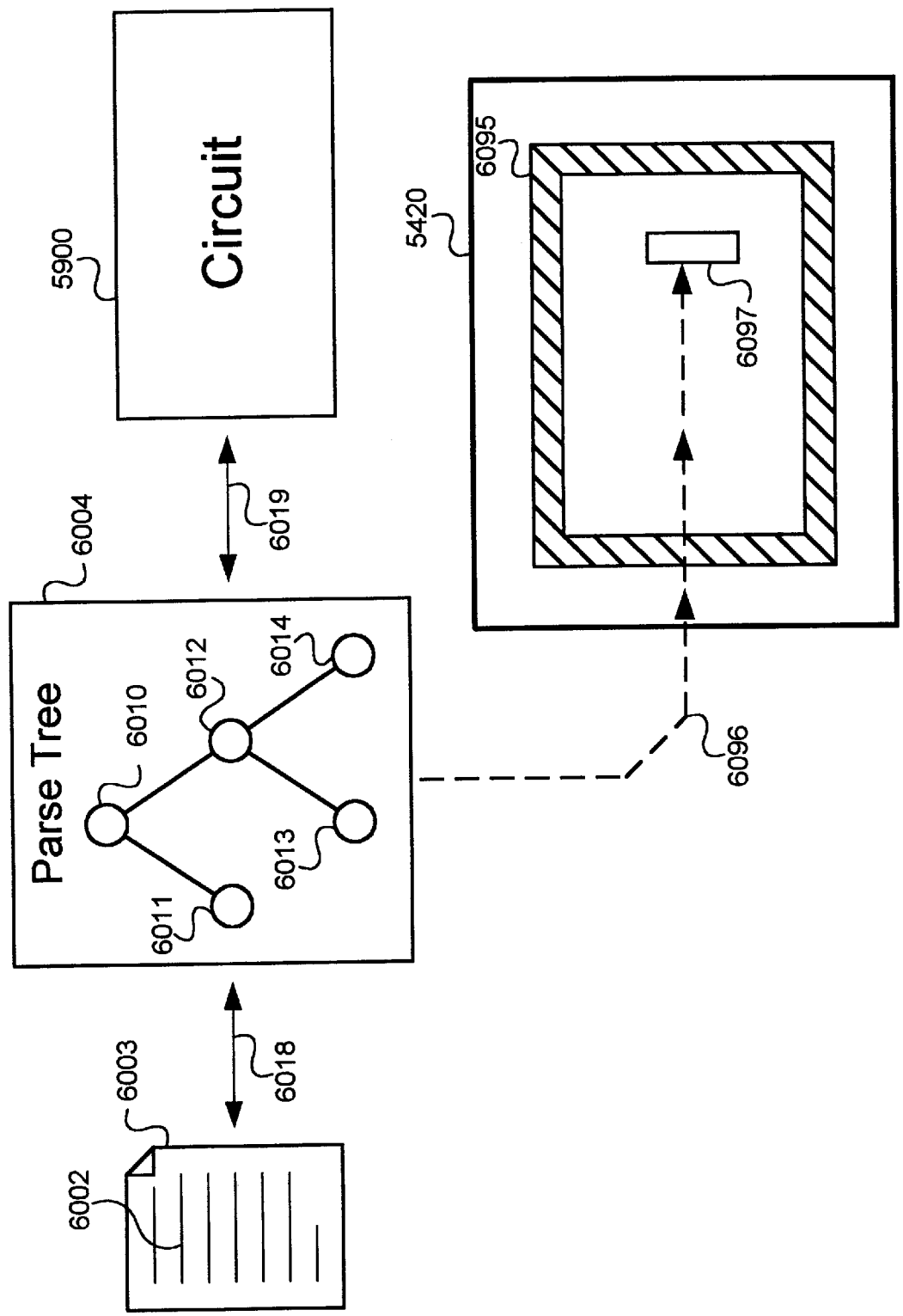
FIG. 58: shows an example of the relationship between the text description, the parse tree, the circuit and the display of a circuit analysis result in accordance with the present invention.

FIG. 58 shows the relationship between the text description of a digital system, the parse tree derived from that text description, the circuit synthesized from the parse tree, and a visual display of a circuit analysis result. The text description 6003 comprises a sequence of characters 6003. The parse tree 6004 comprises parse nodes 6010, 6011, 6012, 6013, and 6014, and is constructed by parsing the text description 6003. The parse tree is stored. A relationship between the text and the parse nodes is maintained as indicated by relationship 6018.

Figure 59:
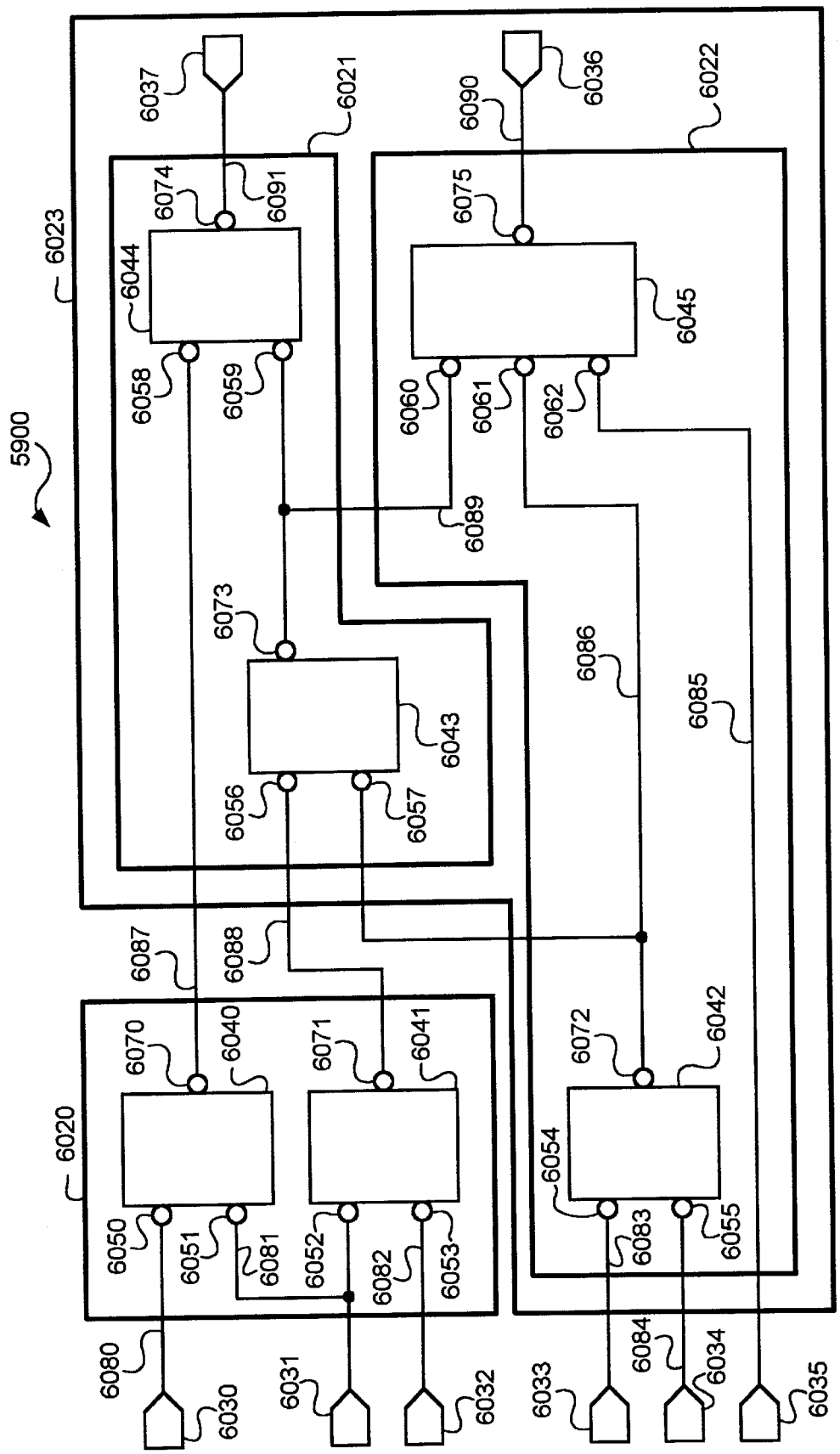
FIG. 59: shows the details of the circuit used in FIG. 58.

The digital circuit 5900 shown in FIG. 59 is synthesized from the parse tree 6004. The digital circuit 5900 consists of circuit elements. Digital circuit 5900 includes input ports 6030, 6031, 6032, 6033, 6034, and 6035, and output ports 6036 and 6037.

The digital circuit also includes cells 6040, 6041, 6042, 6043, 6044, and 6045. The cells include input pins 6050, 6051, 6052, 6053, 6054, 6055, 6056, 6057, 6058, 6059, 6060, 6061, and 6062. The cells include output pins 6070, 6071, 6072, 6073, 6074, and 6075. The digital circuit also includes nets 6080, 6081, 6082, 6083, 6084, 6085, 6086, 6087, 6088, 6089, 6090, and 6091.

An aspect of the present invention maintains the relationship 6019 between the parse nodes and the circuit elements. In this example, parse node 6011 is related to grouping 6020. Parse node 6013 is related to grouping 6021. Parse node 6014 is related to grouping 6022. Parse node 6012 is related to grouping 6023, and parse node 6010 is related to digital circuit 5900.

Analysis tools can be used to associate numerical circuit analysis results with the circuit elements. For example, if the circuit is in the G-Tech domain, then each net could have the number of logic levels from input port to that net. If each cell in this example was one gate, then net 6090 is 1 logic level from an input, while net 6091 is 3 logic levels from an input port. The gate count is another example of G-Tech analysis. Suppose each cell has one gate. Groupings 6020, 6021, and 6022 each have two gates. Grouping 6023 has 4 gates. Similar results can be obtained in the mapped circuit domain. The analysis tool could generate the results for all of the relevant circuit elements upon inquiry or the results could be stored with the circuit element or cached in the system.

Analysis results are displayed in a window 6095 on a computer screen 5420. The size or display characteristics of a display object 6097 can be set by the numerical circuit analysis results. The designer can choose a display object in window 6095 that is linked to a parse node. For example, the text description could be in VHDL. The window 6095 could have a list of VHDL processes near or coincident with visual display object 6097. Using a mouse or keyboard, the designer selects a visual object corresponding to part of the text or a parse node. The designer also selects a type of analysis desired. The system then identifies the corresponding circuit group from the selected parse node using relationship 6019. For example, suppose the designer selects parse node 6012 and wants to know the gate count. The gate count will be obtained for corresponding circuit grouping 6023.

The system then aggregates the results attached to the circuit elements to produce a aggregated result associated with the circuit grouping. For a gate count, the aggregation comprises adding up the gates in the circuit grouping. For circuit group 6023, this is 4. For delay, the aggregation function would be the maximum value on a net or pin within the circuit grouping.

The aggregated result could then be used to set the display characteristics of a display object. For instance, the height of a rectangle corresponding to parse node 6012 in a stacked bar graph could be set to the number of gates in circuit grouping 6023 divided by the number of gates in the whole design. This would permit a designer to determine what fraction of the gates in a design were attributable to a parse node, and hence to the source HDL text. Visually relating the design characteristics to the source text responsible for those characteristics quickly and efficiently represents dramatically improves designer productivity.

4.1.2 Inter-Domain Selection Overview

Figure 60:
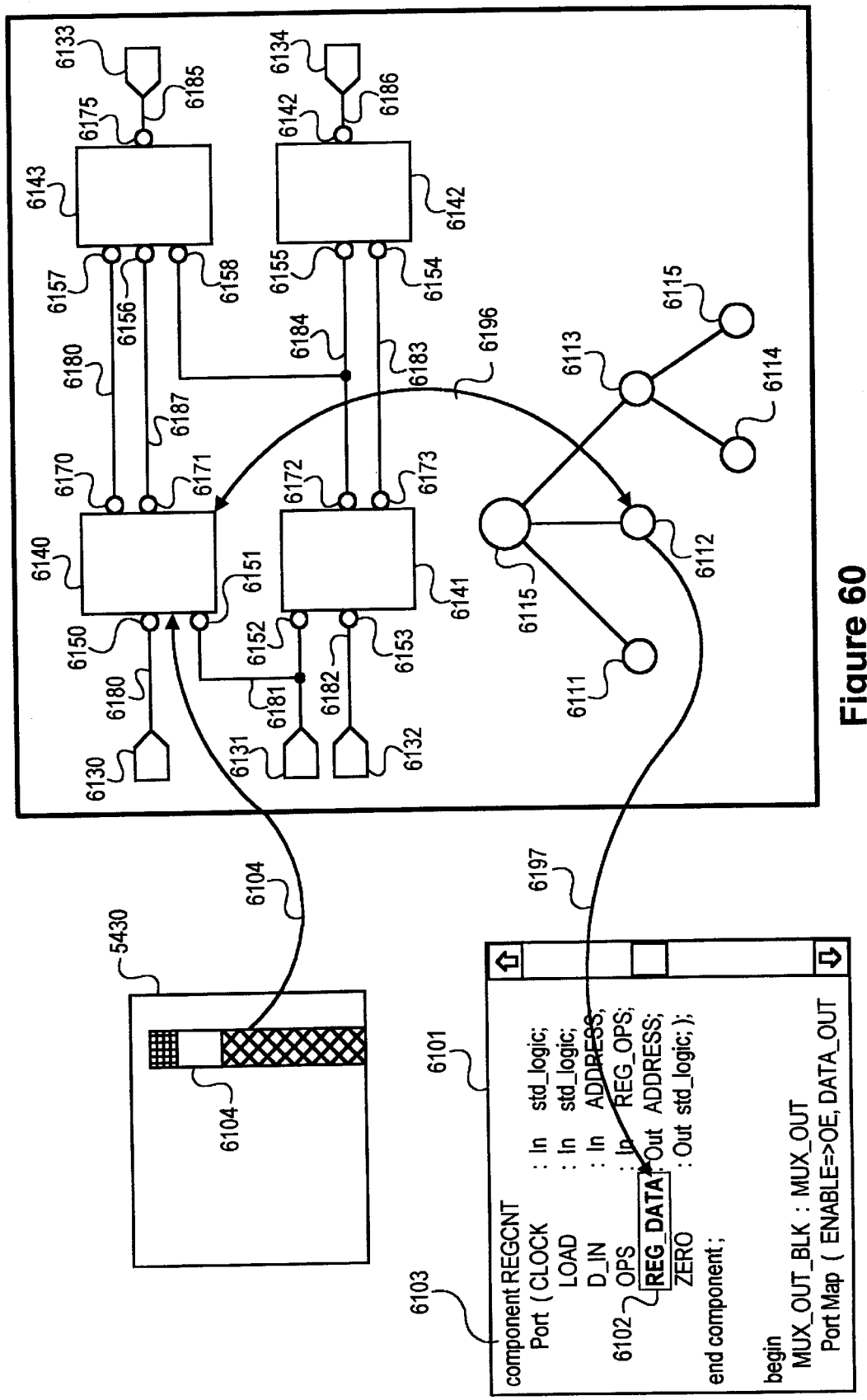
FIG. 60: shows an example of the inter-domain selection relationship.

FIG. 60 illustrates the structure of an inter-domain selection. In this example text 6103 is parsed to obtained the parse tree comprising nodes 6110, 6111, 6112, 6113, 6114, and 6115. The digital circuit is synthesized in accordance with the parse tree. The digital circuit in this example has ports 6130, 6131, 6132, 6133, and 6134. It has cells 6140, 6141, 6142, and 6143. It has input pins 6150, 6151, 6152, 6153, 6154, 6155, 6156, 6157 and 6158. It has output pins 6170, 6171, 6172, 6173, 6174 and 6175. It has nets 6180, 6181, 6182, 6183, 6184, 6185, 6186, and 6187. In particular, text string 6102 corresponds with parse node 6112 which corresponds with a circuit element using relationship 6196. In this case, the corresponding circuit element is cell 6140.

Inter-domain selection involves choosing a display object linked to a circuit object in one domain, and changing the display characteristics of another display object that is linked to a circuit object in another domain where the two circuit objects are related by the parse node-circuit relationship. In this examnple, display object 6104 is in window 6100. It is linked to cell 6104. This type of linking would be found with the path browser tool. Using the inter-domain selection techniques described later, the designer could select display object 6104, and change the display characteristics of text string 6102 displayed in window 6101 using relationship 6196. This type of linking simplifies the designer's job of finding the source code corresponding to problematic paths in a digital circuit.

4.2 System Architecture Details

Figure 40:
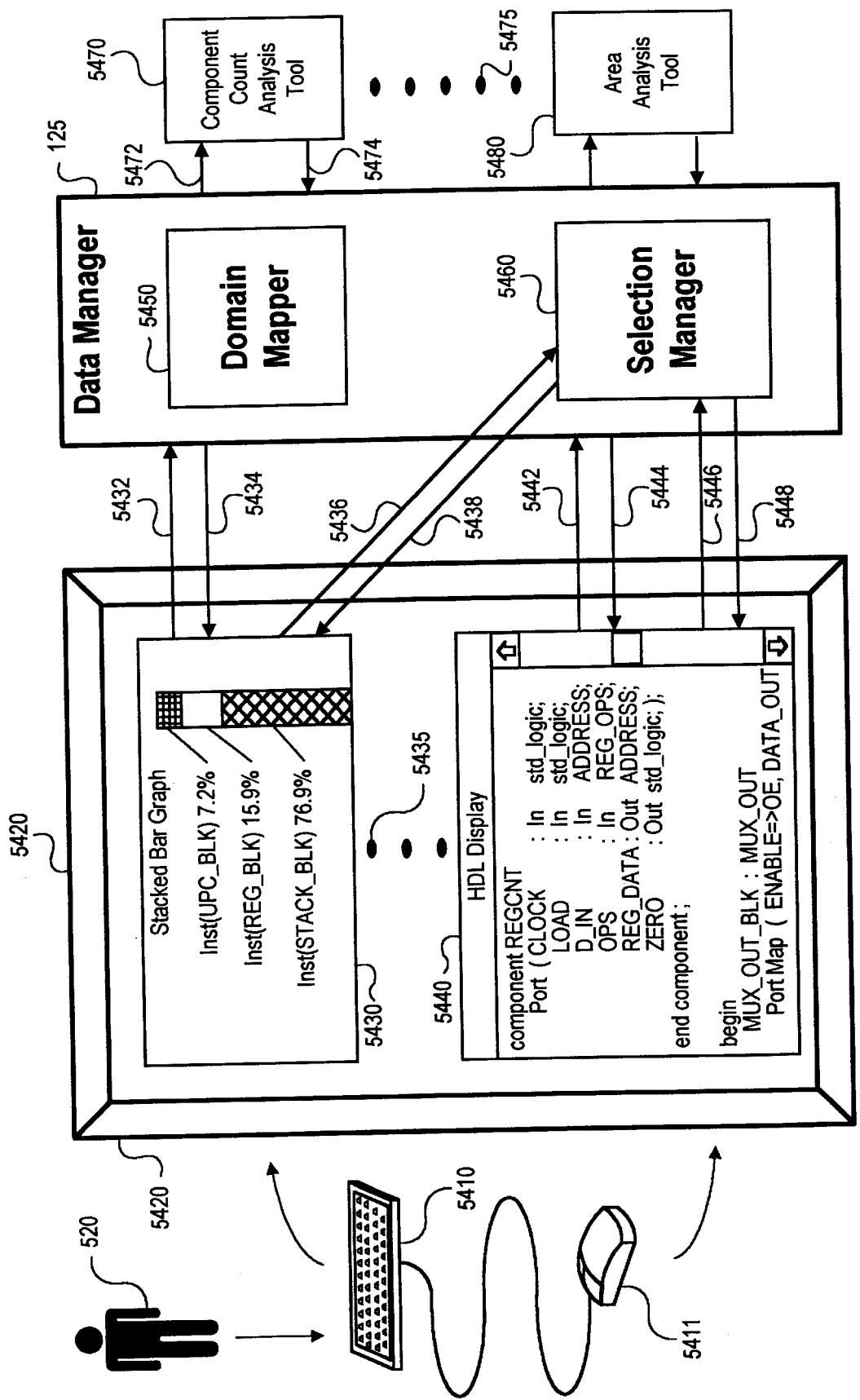
FIG. 40: shows the components of the HDL Analysis Tool.

FIG. 40 shows the components of the HDL Advisor. The Designer 520 uses conventional input tools such as a keyboard 5410 or a mouse 5411 to interact with display tools which appear on a computer screen 5420. There can be any number of display tools in the HDL Advisor. For the sake of clarity, a stacked bar graph display 5430 and an HDL display 5440 are shown specifically. The stacked bar graph display 5430 and the HDL display 5440 will be described in further detail in a later section. This section describes how these display tools interact with the other components of the system. Additional display tools behave in a similar manner.

Figure 42:
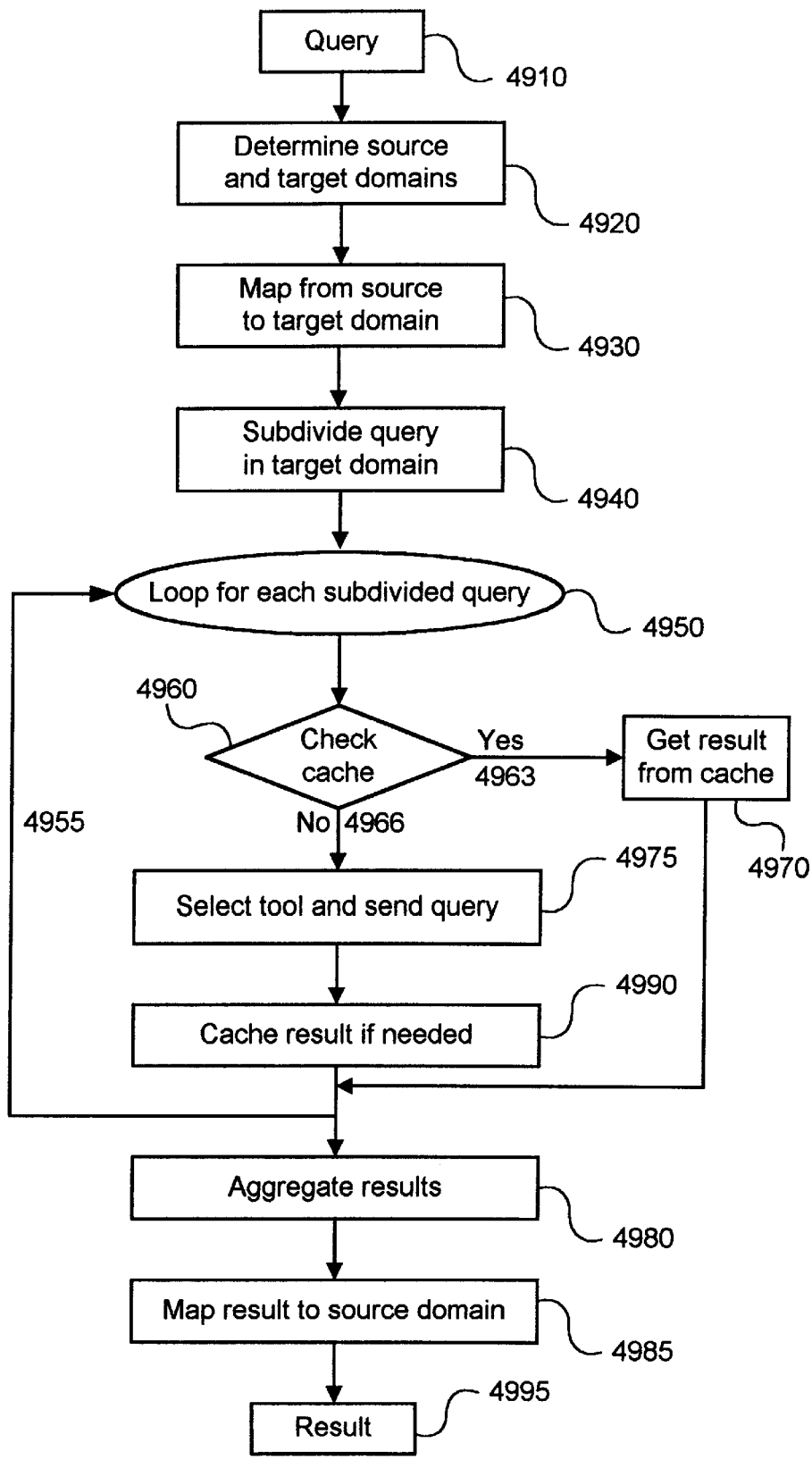
FIG. 42: shows how the Data Manager processes a query.

The histogram display 5430 and the HDL display 5440 each send queries to and receive responses from the central data manager 125. The data manager 125 uses analysis tools to assist in processing queries. Any number of analysis tools may be registered with the data manager 125. For the sake of clarity, two sample analysis tools are shown, a logic levels analysis tool 5470, and a timing verifier 5480. A method for processing queries is shown in FIG. 42.

Figure 41:
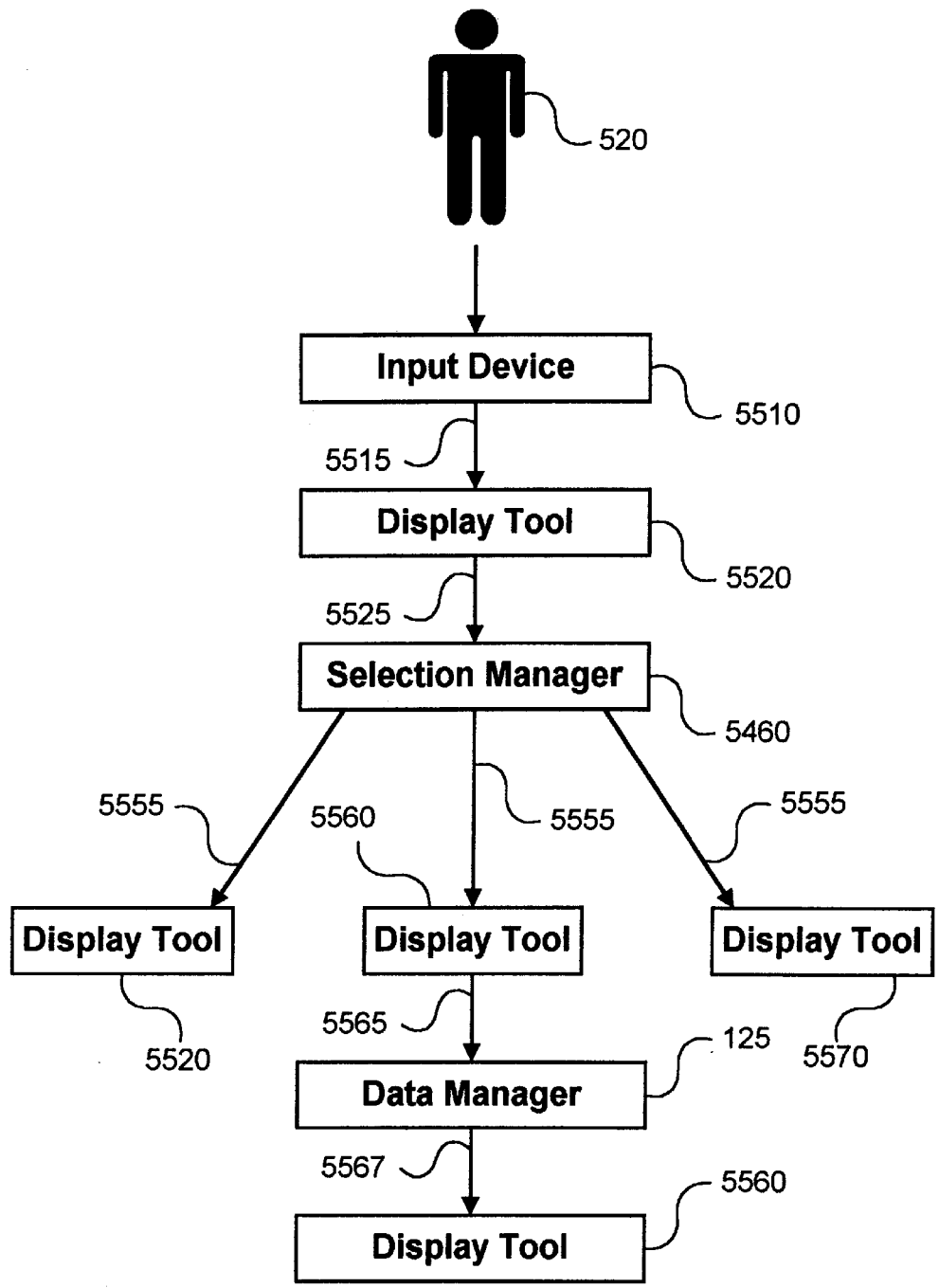
FIG. 41: shows how the selection manager processes the selection.

Display tools also communicate with the selection manager 5460 regarding which circuit object or circuit objects the user selects. This process is shown in FIG. 41. The data manager 125 includes a domain mapper 5450. The domain mapper takes as input a circuit object in a source domain, the initial domain, and a target domain and finds the corresponding circuit object in the target domain. This process is shown in FIG. 4 and FIG. 5.

4.2.1 Architecture of the Data Manager

The HDL Advisor enables diverse display and analysis tools to communicate with one another. A data manager is central to the system. It performs several functions. Most importantly, the data manager allows display tools to pose a query in a particular domain and receive an answer in the same domain even though the answer is computed in a different domain. Thus, the role of the data manager is to function as both a domain mapper and as a message coordinator between the display and analysis tools. In addition, the data manager can break complex queries into series of simpler queries. It ascertains which analysis tool can answer a given query. To enhance performance, the data manager contains a cache of recently posed queries and the answers. This section describes how the data manager is built, and how display and analysis tools are connected to it.

The data manager uses global ids to identify objects. In one embodiment, a global id is a number. A global id can be passed with a domain to the data manager. The data manager will attempt to return an object in the passed domain which corresponds to the global id. In one embodiment, the data manager uses the global id as an index into a table to look up a circuit object in a domain. The data manager uses the domain mapping capability described earlier to map the circuit object to the desired domain.

FIG. 42 shows how the data manager processes a query 4910. A query contains an indicator as to what type of query this is (e.g. area, power), a list of circuit objects being queried, a flag indicating if the result of the query is to be cached, and a function for aggregating the results of processing this query for each circuit object. Aggregating is the process of combining multiple results into a single result. An aggregate function is a function which is used to combine the results of subqueries. Subqueries are discussed with step 4940. The aggregate function is determined by the query and can be stored in a table with the query. For instance, area queries are aggregated by summing the area results produced by subqueries. Longest delay queries are aggregated by finding the maximum result returned from the set of queries.

In one embodiment, the type of query is provided to the display tool by the data manager when the display tool is registered. Registration of display tools will be discussed further in a later section. The query is created by a display tool interface in response to an action from the designer 520. The query arrives as a message from a display tool, and will be answered by one of the registered analysis tools. Note that the query may arrive in one domain, be processed in another, and the response sent in the original domain. The domain in which the query is issued is referred to as the initial domain. The domain in which the query can be processed is referred to as the target domain. Neither the display nor the analysis tool need know about the domain transformation.

Step 4920 determines the initial and target domains for the query. The initial domain is the domain in which the objects passed in the query are represented. The target domain is determined by the type of the query. The target domain for each query is stored in a table which is indexed by the type of the query. For instance, a timing query can be answered using information contained in the gate domain. A logic level query, which can be used to analyze paths in a translated circuit, can be answered using information contained in the GTech domain. Step 4920 also sets the aggregate function for the query.

Step 4930 maps the circuit objects in the query from the initial to the target domain. This mapping is done by mapping through consecutive domains as described previously and shown in FIG. 4 and FIG. 5.

Step 4940 subdivides the query in the target domain. This is necessary if the circuit objects in the query are composed of multiple circuit objects. Note that the circuit objects in the query are subdivided varies with the type of the query. For example, suppose the query is finding the area of an HDL "process" circuit object. Since a process is made up of many logic components, the query must find the area of each of these components and add them together. This subdivision is implemented by keeping a table of routines that is indexed by the type of query. Each routine in the table takes a circuit object in the target domain for this type of query and returns a list of circuit objects in the same domain which have been subdivided if necessary.

Loop 4950 loops over each subdivided query. Arrow 4955 is the return branch of the loop.

Step 4960 checks to see if the result of the given subdivided query on the given circuit object is in a cache of query results.

If the result is in the cache, branch 4963 causes step 4970 to be processed and the result is retrieved from the results cache.

If the result is not in the cache, branch 4966 causes step 4975 to be processed and an analysis tool is selected for this subdivided query. The query is sent to the analysis tool and a result is returned.

Step 4990 caches the query and its result if the cache flag was set in the original query. Note that the only purpose of caching results is to improve performance. In another embodiment, results may be cached, and the cache checked, at different points in the process. For instance, results might be cached after the results are aggregated in step 4980.

Step 4980 aggregates the results of all of the subdivided queries. Aggregating the results of the subqueries combines them to produce a single result which will be returned for the original query. The results are aggregated using the aggregate function in the query.

Step 4985 maps the aggregated result from the target domain to the initial domain. This mapping is done by mapping through consecutive domains as described previously and shown in FIG. 5.

Result 4995 is a message which is sent from the data manager to the display tool which originally requested the result.

4.2.2 Architecture of the Selection Manager

The selection manager uses intra-domain mapping to track circuit selection in multiple domains. When an display object is selected by the user, a message is sent to the selection manager indicating the corresponding selected circuit object. The selection manager then broadcasts information regarding the current circuit selection to all of the display tools. Each display tool uses the circuit selection information to select the correct display object within its display. The selection manager can communicate the circuit selection in any domain by using the intra-domain mapping capability. By communicating information about the circuit selection, the selection manager allows the user to easily find a circuit object of interest using one type of display tool, and then further examine that circuit object using another display tool.

FIG. 41 shows how the selection manager handles the circuit selection. First, the designer 520 uses an input device 5510 such as a keyboard or mouse to make a visual selection within a display tool 5520. Next, the display tool 5520 notifies the selection manager 5460 of the circuit selection. The selection manager 5460 broadcasts the circuit selection to each of the available display tools 5560. Note that the display tool 5520 which initiated the circuit selection is also included in the broadcast message. The selection is broadcast using a list of one or more global ids. Each display tool may optionally ask the data manager 125 to map the global ids to circuit objects in a particular domain. In FIG. 41, display tool 5560 sends a query to data manager 125 requesting the GTech value of the broadcast global ids. The data manager then returns the requested GTech objects to display tool 5560.

The ability to track the circuit selection between multiple display tools is used throughout the HDL Advisor. The uses of circuit selection tracking can be grouped into three main categories: identifying a circuit selection in a non-text display tool and viewing a visual selection of that circuit selection in the HDL source, identifying an HDL source construct and viewing a visual selection of that circuit selection in a non-text display tool, and the "follow selected" in HDL source feature.

Consider the display tools of FIG. 40. Suppose that the designer 520 selects a visual representation of a particular GTech primary output which is shown within the stacked bar graph display 5430. A method for making a visual selection within the stacked bar graph display will be described further in a later section. The stacked bar graph display then communicates the corresponding circuit selection in the GTech domain to the selection manager 5460. The selection manager then uses the domain manager 5450 to map the circuit selection to supported domains. The relationships and process of mapping between domains was shown in FIG. 4, FIG. 5, and FIG. 6. Thus, the selection manager determines the source domain parse node which represents the selected primary output. The selection manager then broadcasts the id of the parse node and the HDL display 5440 receives the parse node id of the circuit selection. Selecting a display object, and thus the corresponding circuit object, in the HDL display 5440 and viewing it in the GTech display is accomplished in the same manner.

A feature of all display tools in the HDL Advisor is called "follow selected." The follow selected feature causes a display such as the HDL text display 5440 to track the GTech or mapped circuit structure being analyzed by the designer 520 in another display such as the stacked bar graph display 5430. For example, this feature enables the HDL text display 5440 to always show the current HDL source. Thus, the designer can examine a GTech or mapped circuit structure, and simultaneously view the HDL source from which the GTech or mapped circuit structure was created. This feature assists HDL source level digital circuit analysis by automatically linking conventional analysis to the HDL source. Each time the selection manager broadcasts the selection, the HDL text display requests the appropriate circuit object in the source domain and visually selects the corresponding display object. The HDL text display 5440 will scroll the text display to make the selected text appear in the HDL text display window.

A special case occurs for the selection manager and for the display tools if no specific circuit object is selected. In this case, the selection manager and display tools assume that the designer desires information about the entire design being analyzed by the HDL Advisor. Thus, the first selection which the selection manager broadcasts when a design is loaded into the computer memory used by the HDL Advisor is the entire design.

4.2.3 Architecture of Display Tools

Within a computer system, the information specifying the design is represented in binary form. For the human designer 520 to develop and analyze the design, information about that design must be presented in a form that can be understood by the human, such as by a visual display on a monitor. In addition, the designer 520 must also have a way to manipulate the design information, such as by keyboard and mouse. Display tools such as 5430 and 5440 provide a mechanism for that interaction.

However, digital circuit design information is complicated, and efficiently allowing the designer 520 to control and analyze the design requires that the display tools allow the designer to take advantage of the structure of the design data.

One way to take advantage of the structure is to design particular display tools to communicate with a particular domain in the data manager. However, many display tools interact with multiple domains. For example, a stacked bar graph, which will be described in a later section, can communicate information regarding both area, which concerns the gate domain, and gate count, which concerns the GTech domain. Regardless of whether a display tool is tuned to display information from a particular domain, each display tool uses the data manager to gather the information which it displays.

Regardless of which domains are handled, each display tool interacts with the data manager by communicating messages back and forth. These messages involve specifying a circuit object in a domain and some related query to perform on that circuit object. A display tool is able to display a display object which represents a circuit object and store a list of queries that can be answered for that circuit object, although the display tool does not answer those queries. The data manager, in contrast, is able to provide the display tool with circuit objects and process queries associated with objects. In one embodiment, at start-up time the data manager also provides each display tool with a list of queries which can be answered. This allows new analysis tools to be added to the system more easily. Information about available analysis is stored centrally in the data manager, rather than duplicated in each display tool.

Display tools communicate with the data manager through display tool interfaces. The purpose of a display tool interface is to provide a layer of data abstraction to the display tool. This allows the display tool to be as generic as possible. For example, a stacked bar graph, which will be discussed in a later section, can analyze different digital circuit properties, including, for example, area and power usage. A display tool interface frames queries concerning the specific type of data which the tool is displaying. Thus, the tool only needs to be able to frame general queries and the display tool interface will translate each query into one which the data manager can understand.

The display tool is unaware of how its queries are answered. The fact that many analysis tools are available to compute answers, perhaps in a different domain from the domain in which the query was issued, is hidden from the display tool interface. This enables display tools to support display in a different domain from that which the data originates. This ability is important because much circuit information is available in the GTech or mapped logic domains but display objects are often desired in the source domain.

At system start-up, each display tool registers itself with the data manager when the system is initialized. At this time, the data manager informs the display tool of all of the queries to which it can respond.

Display tool interfaces send messages to the data manager requesting information about digital circuit structures in a given domain, and receive responses. The data manager responds to a query in the same domain, regardless of which domain an analysis tool used to compute the answer. For example, suppose that a source text display tool wants to know the arrival time for a particular parse node. The source text display tool sends a message to the data manager with the parse node and the request for an arrival time. If the information is available, the data manager responds with the same parse node and the actual arrival time.

As described earlier, display tools also communicate with a selection manager to inform the selection manager when a circuit object is selected when the user interacts with that display tool.

4.2.4 Architecture of Analysis Tools

Analysis tools are used to process information contained within a domain. In general terms, there are two kinds of analysis that one might want to perform in a given domain. Conventional kind of analysis tools take one or more circuit objects in a domain, and computes characteristics associated with those circuit objects. For example, in the gate domain, a timing analyzer is used to compute the delay times and slacks to various parts of the mapped circuit. The timing analyzer determines the time that the data signal on an output pin will become valid after a clock edge. In the GTech domain, a logic levels analysis tool computes the longest path of chained 2 input gates through the GTech circuit. In the gate domain, an area analysis tool computes the area required to build the mapped circuit. In the GTech domain, a component count analysis tool computes the number of 2-input gates that would be used if the GTech circuit were implemented with 2 input gates only.

Another kind of analysis involves summarizing the characteristics associated with a particular group of circuit objects. For example, estimating the total area in a mapped circuit at the gate level involves summing the area associated with each component and connection.

For an analysis tool to summarize characteristics of circuit objects, the analysis tool requires information about the structure of the circuit objects and the connections between them. Therefore, analysis tools are associated with a particular domain. For example, a timing verifier 5480 deals with the mapped domain, while a logic levels analysis tool 5470 deals with the GTech domain.

In general terms, analysis tools communicate with the data manager 125 by messages. The data manager provides the analysis tool with one or more circuit objects, and the analysis tool returns one or more characteristics of those circuit objects or a summary of the characteristics of those circuit objects, or both.

Analysis tools perform three kinds of interactions with the data manager. First, each analysis tool registers itself with the data manager when the system is initialized. Registration consists of informing the data manager what kinds of queries and in which domain a tool can answer. For example the timing verifier can answer timing queries in the gate domain. Later, the analysis tool can receive and answer queries.

The data manager is responsible for ascertaining which analysis tool can respond to a given query. In addition, the data manager is responsible for posing queries in the correct domain for the analysis tool. The data manager uses the relationships between domains to translate queries to the correct domain for the analysis tool. For example, consider a query concerning the arrival time of a signal on an output port specified in the HDL source. In one embodiment, a timing verifier is registered with the data manager. The data manager will ascertain that the timing verifier can provide arrival times, and will determine which port in the gate domain corresponds to the port specified in the HDL source. The data manager will then send a message to the timing verifier asking for the arrival time on that port. The timing verifier determines the arrival time, and then sends a return message indicating the arrival time of the port in the gate domain. The analysis tool is not aware of the source of the query, or of the fact that domain mapping may occur. It simply answers the query in the domain which it understands.

4.2.5 Analysis in the GTech Domain

An aspect of the present An aspect of the present invention allows for meaningful digital circuit analysis in the GTech domain. Because the GTech circuit is a direct translation of the HDL source, the quality of the HDL source is directly related to the quality of the GTech circuit. By determining which parts of the GTech circuit are problematic, and improving the source responsible for those parts of the GTech circuit, the start point for optimization will be improved. As it is difficult to predict the effect that optimization will have on a translated GTech circuit, it is important to create the best possible GTech circuit before optimization. When the original GTech circuit is of good quality, there are fewer choices that the optimizer must make. This causes the final result to be more reliable, and probably of better quality because the optimizer has a much smaller range of changes to make.

Some query types specifically refer to the GTech domain. For example, a query type such as "GTech_GateCount" requests the gate count that a GTech part would require if mapped to simple logic gates. This gate count can be used to analyze the initial area required before optimization. Another possible query type is "GTech_LogicLevels" which requests the number of levels of logic that a longest path in a GTech circuit would require if mapped to simple logic gates.

GTech analysis uses the intra-domain mapping capability to select structures in the gate domain, relate those structures to the GTech domain, and then perform analysis in the GTech domain where complete HDL source to GTech circuit mapping is available. An example of this sort of analysis is start/end mode in the Path Browser window, which will be discussed further in a later section.

4.3 Example Digital Circuit Analysis with Reference to HDL Source

This section explains how a designer uses the HDL Advisor to relate characteristics of the design found in one domain to aspects of the design found in another domain. For this example, the design includes representations in the source, GTech, and gate domains.

The designer 520 selects a display object to evaluate by selecting some text, such as the decode: process statement in the text of FIG. 36. HDL text selection uses the text to parse node relationship described earlier. Methods for text selection will be described further in a later section. The text to parse node mapping is used to determine the parse node which represents the selected text, and the parse tree node number is sent to the selection manager.

The designer 520 of FIG. 40 then obtains a display tool such as the stacked bar graph display 5430. Next, he obtains a visual representation of an aspect of the design, for example, in the source domain using the HDL text display 5440. The display tool 5440 displays the text of an HDL source file. The example described in this section is shown in FIG. 32, FIG. 33, FIG. 34, FIG. 35, FIG. 36, FIG. 37, FIG. 38, and FIG. 39.

The designer 520 also selects a type of analysis to be performed from the available choices. One approach is that the designer 520 selects it from a menu or a push button. Another approach would be to have the designer 520 select it before selecting the text. In this example, assume that the designer 520 asks for the area of the gates which make up of the decode process.

The parse tree node number and the query type comprise a query that is sent to the data manager 125. Suppose that the desired analysis concerns the area of the gates that make up the selected parse node. Because of start up registration, the data manager 125 can identify that the required information is in the gate domain. The data manager 125 computes the area corresponding to the identified parse node. The data manager does this by using the inter-domain mapping shown in FIG. 5 to identify the gates in the gate domain that correspond to that parse node. In this example, the designer 520 wants to know what the area of one of the processes is, and the designer 520 used probe points to segregate the design to permit the intra domain mapping to the gate level.

Thus, the initial query sent to the data manager concerns the area of a VHDL process statement in the source domain. First, the data manager ascertains that an area query must be answered in the mapped domain. Therefore, the data manager uses the intra-domain mapping capability to find the gates related to the process statement. Next, the data manager determines that the query must be divided into a subquery for each gate. In this situation, the data manager determines that the total area for the process can be computed by summing the area value for each gate.

After the data manager 125 identifies the relevant gates, it then computes the total area consumed by these gates. In the gate domain, each gate has several characteristics associated with it. One of these characteristics is area. The data manager chooses an area analysis tool 5480 which can answer queries regarding gate area. In one embodiment area analysis tool 5480 determines the area of a gate by looking up the area value for the gate in a technology library. The technology library is provided by the semiconductor vendor who manufactures the physical gate.

For each subquery, area analysis tool 5480 then produces a numerical value for the area that is sent back to data manager 125. Each area value is the area of one of the gates corresponding to the process. The data manager then aggregates the area values returned by each subquery by adding them together.

The final area result is then sent to HDL text display tool 5440 which can display the result directly or use it to modify the display characteristics in the display tools.

4.4 Sample Display Tools

The flexibility of the architecture shown in FIG. 40 permits multiple display tools. The display tools relate digital circuit analysis information about parts of the GTech or mapped circuit to the source text that generates those parts. This section describes a number of display tools but by no means all display tools. An example is used to clarify the use of the display tools.

By linking display tools to the data manager, display tools are able to display results in one domain that are computed in another domain. Furthermore, the designer is able to use a tool such as the stacked bar graph described below to investigate a design attribute such as gate count. The designer can then view the source HDL from which the part of interest was synthesized. For example the designer can use the stacked bar graph to find a portion of the mapped circuit which has a high gate count. This mapped circuit portion can then be associated with the source HDL.

FIG. 43, FIG. 44, FIG. 45, FIG. 46, FIG. 47, FIG. 48, FIG. 49, and FIG. 50 show display techniques for displaying digital circuit analysis data. FIG. 43, FIG. 44, FIG. 45, FIG. 46, FIG. 47, FIG. 48, FIG. 49, and FIG. 50 show the display tools displaying an AMD2910A design. The source and resulting mapped circuit is described in Introduction to HDL-Based Design Using VHDL, by Steve Carlson, published in 1991, which is hereby incorporated by reference. This book is available from Synopsys, Inc., 700 East Middlefield Road, Mountain View, Calif. 94043-4033. The display tools are further described in the HDL Advisor User Guide, Version 4.0a Beta Draft, which is available from Synopsys, Inc. of Mountain View, Calif. and is hereby incorporated by reference.

The HDL source for the AMD2910A design is partitioned into multiple files. A separate parse tree is created for each of the files according to conventional parsing techniques. Each parse tree is linked to the HDL source and to the GTech circuit created from it according to the methods described above. The HDL source for the AMD2910A design infers levels of design hierarchy. The levels of hierarchy are linked to one another according to conventional techniques such as those used in Design Compiler produced by Synopsys Inc., in Mountain View, Calif.

4.4.1 Stacked Bar Graph Display

Figure 43:
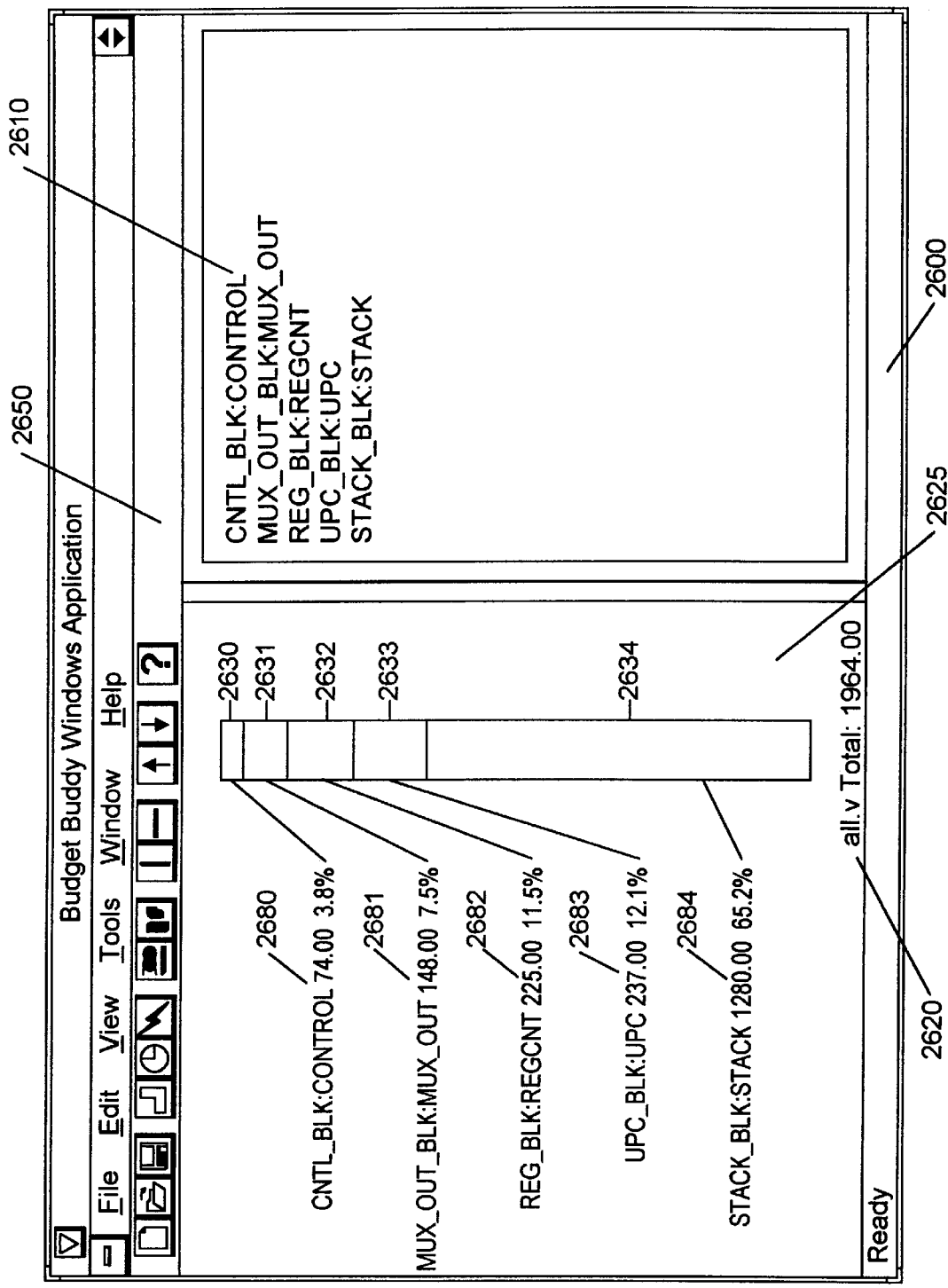
FIG. 43: shows a stacked bar graph display of mapped circuit information.

FIG. 43 shows a stacked bar graph displaying information about the relative contributions of parts of the HDL source. Often, a design written in an HDL is described hierarchically, with higher level modules containing lower level modules. At a particular level in the hierarchy, the designer might want to know the characteristics of the modules visible at that level. The stacked bar graph of FIG. 43 shows relative areas associated with different parts of the design. At the highest level of the AMD 2910A, there are five functional sub-blocks: CNTL_BLK, MUX_OUT_BLK, REG_BLK, UPC_BLK, and STACK_BLK. The names of these blocks are shown in the display object list area 2610 of window 2600. The total measured area is displayed at the bottom of the window. The total area of the mapped circuit is shown as 1964.0 gates. In this example, the characteristic is area. However, other characteristics such as power and time can be similarly displayed.

Each of the sub-blocks has a measured characteristic which is shown by text statements 2680 through 2684. For example, CNTL_BLK uses 74.00 gates, which is 3.8% of the total as shown by statement 2680. MUX_OUT_BLK occupies 148.00 gates, which is 7.5% of the total as shown by statement 2681. REG_BLK occupies 225.00 gates, which is 11.5% of the total as shown by statement 2682. UPC_BLK occupies 237.00 gates, which is 12.1% of the total as shown by statement 2683. STACK_BLK occupies 1280.00 gates, which is 65.2% of the total as shown by statement 2684. A stacked bar graph is constructed by drawing a graphical box corresponding to each functional sub-block with the size of the box proportional to the percentage of the sub-block's characteristic to the total characteristic. This is shown with boxes 2630 through 2634.

The stacked bar graph display of FIG. 43 can be constructed without reference to the physical nature of the particular characteristic. Therefore, power, timing, or another characteristic can be displayed by the same software. The data manager need only transfer the names of circuit objects, the numerical value associated with those circuit objects to the display tool, and a global id which the display tool can use to initiate further queries and update the selection manager.

Figure 44:
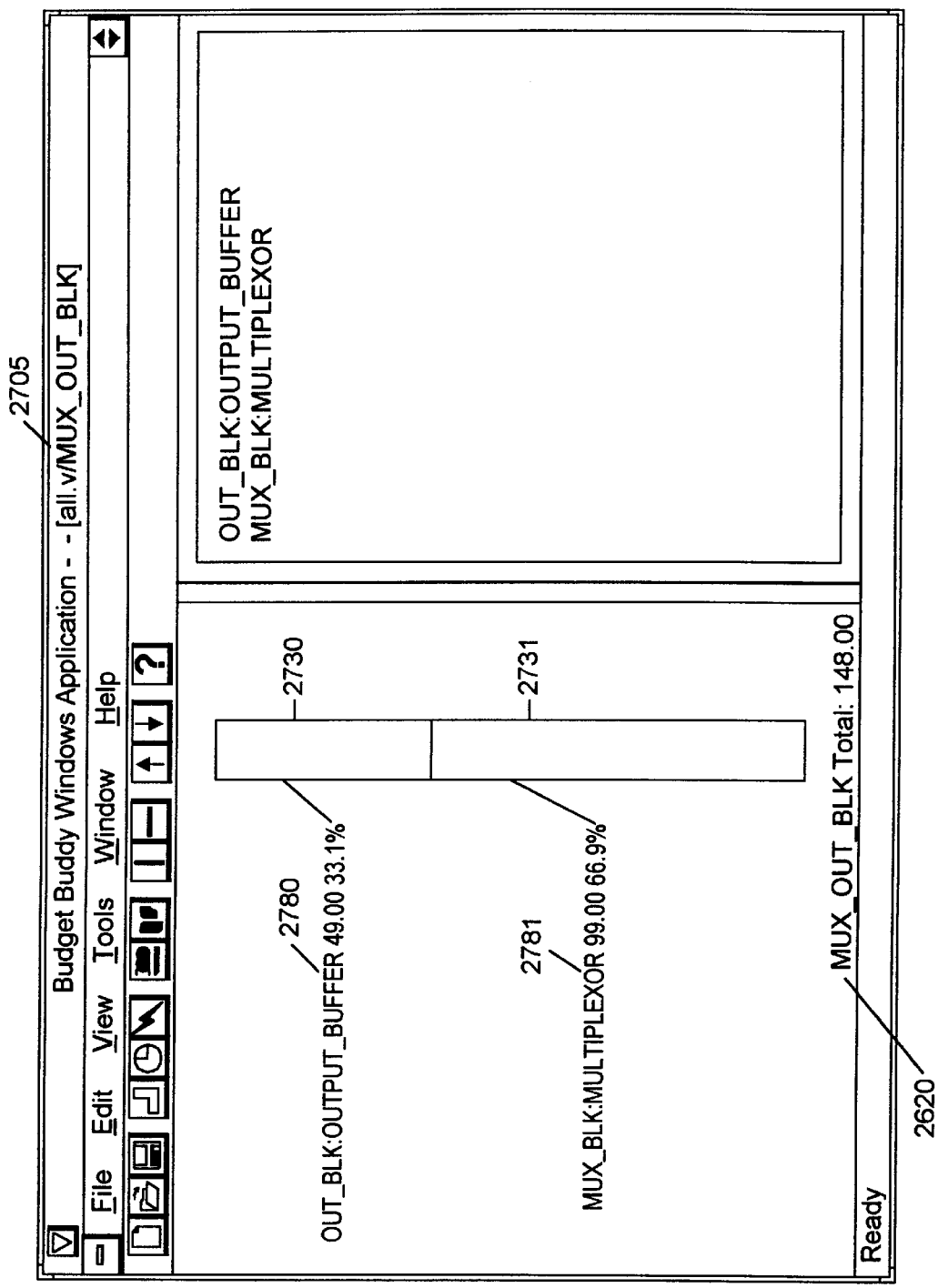
FIG. 44: shows a stacked bar graph display of mapped circuit information showing the relative contribution of one of the sub-blocks in FIG. 43.

Furthermore, each box, such as box 2630 through box 2634, forming part of the stacked bar graph is a selectable button. The user can "push" the button using conventional pointing and clicking techniques and gain information about the sub-block associated with the box. FIG. 44 shows the result of the user selecting the sub-block MUX_OUT_BLK box by selecting box 2631. Here, the sub-block MUX_OUT_BLK itself contains two sub-blocks, OUT_BLK and MUX_BLK. The total measured characteristic 2620 changes to 148.00 to reflect the size of MUX_OUT_BLK. The sub-block OUT_BLK has 49.00 gates representing 33.1% of the area of MUX_OUT_BLK, as indicated by statement 2780. This information is also shown graphically by box 2730. The sub-block MUX_BLK has 99.00 gates representing 66.9% of the area of MUX_OUT_BLK, as indicated by statement 2781. This information is also shown graphically by box 2731. In addition, the window also shows the current location in the hierarchy with a path statement 2705. In addition, statements such as statement 2780 could also act as buttons to change levels.

Figure 45:
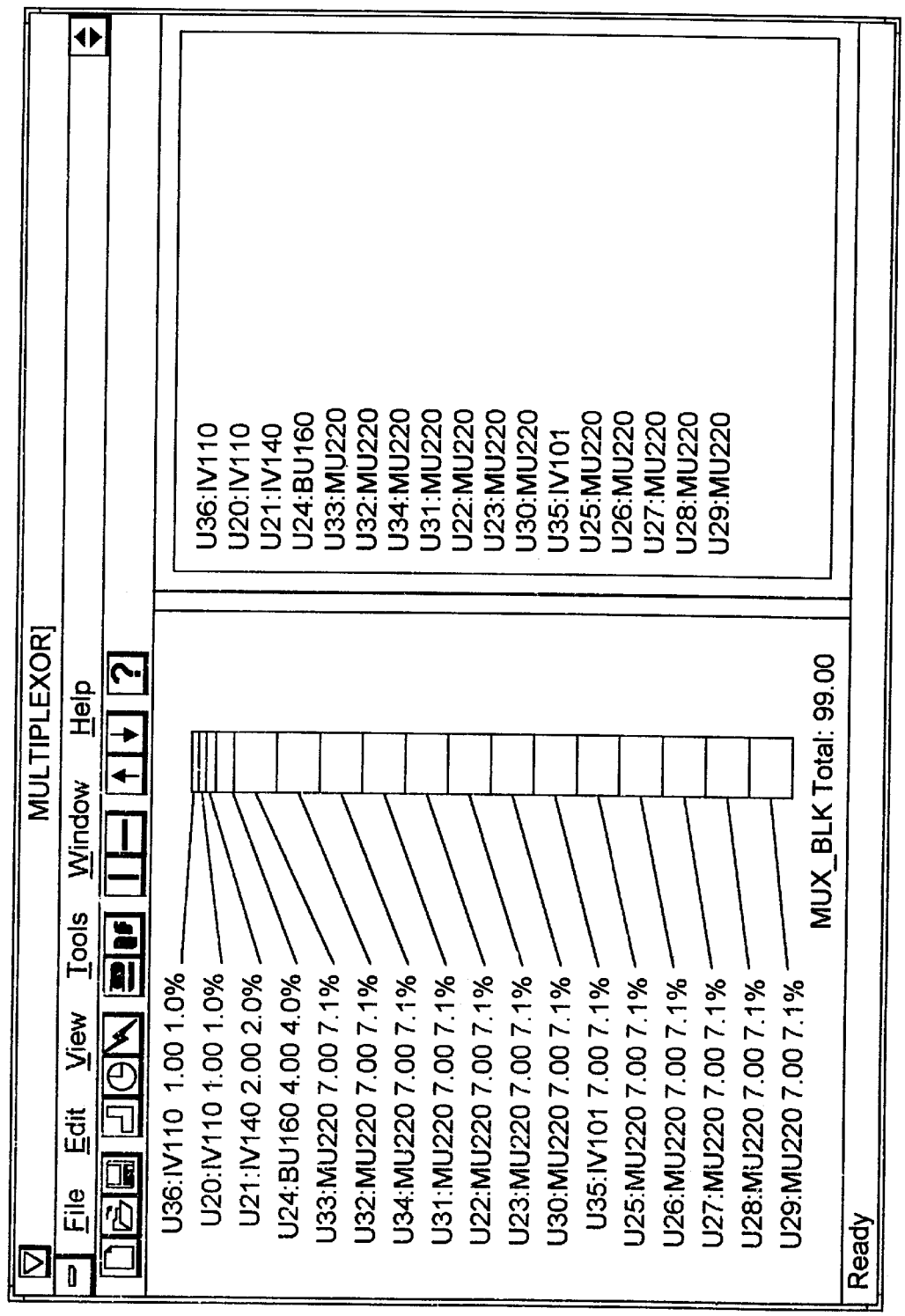
FIG. 45: shows a stacked bar graph display of mapped circuit information showing the relative contribution of one of the sub-blocks in FIG. 44.

FIG. 45 shows the information displayed if the designer selects MUX_BLK to see how the 99.00 gates are allocated.

Note also that when the user "pushes" one of the selectable buttons or selects one of the components of the bar graph such as those shown in FIG. 45, the selection manager is updated with the current circuit selection. Thus, the profiler allows the designer to quickly select a portion of the design which meets certain characteristics, as well as to view overall statistics for the design.

4.4.2 Histogram Display

Figure 46:
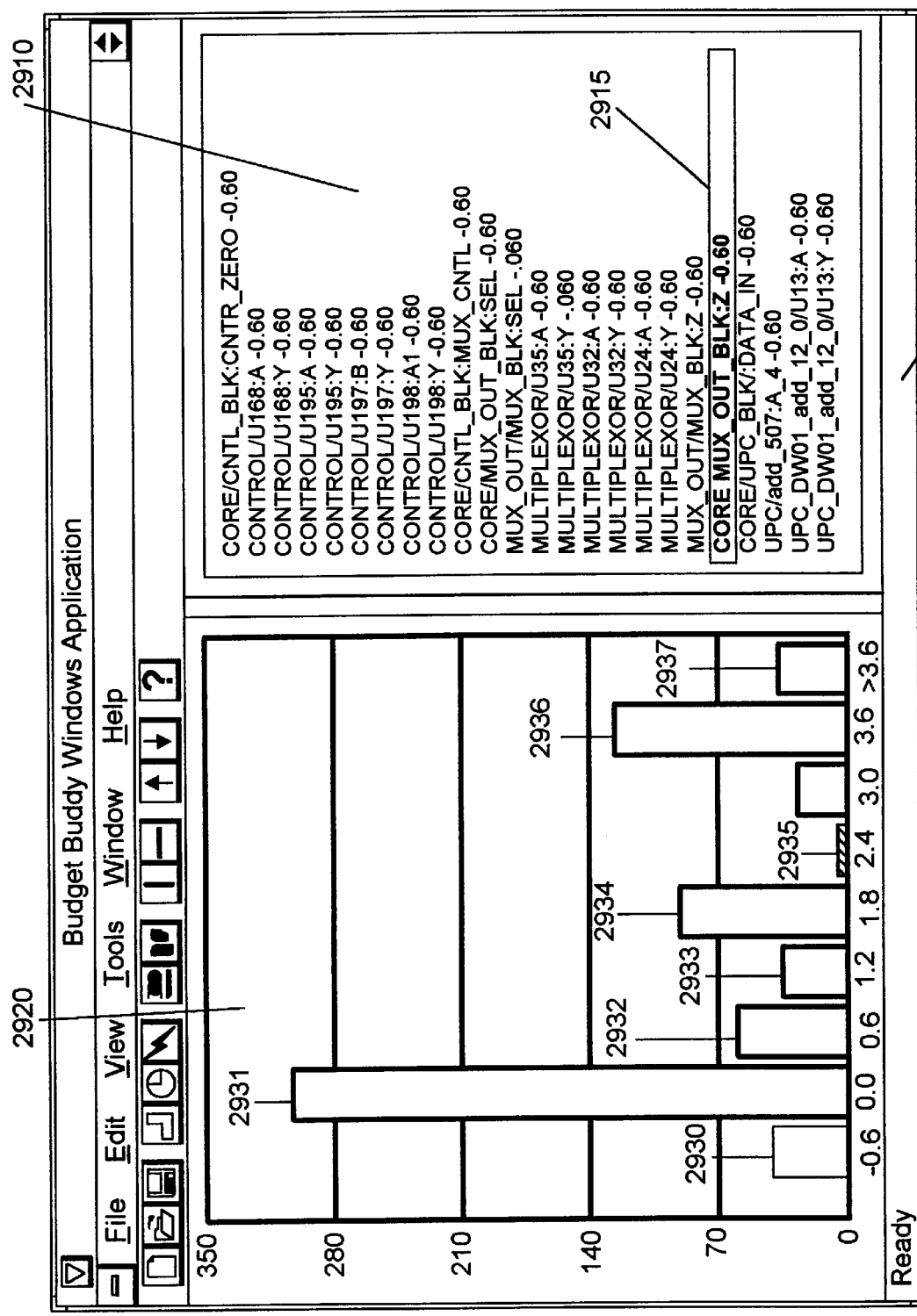
FIG. 46: shows a histogram display of mapped circuit timing information.

The histogram display of FIG. 46 provides a designer with information about the extent of problems in the design. For example, one aspect of the performance of a mapped circuit is the longest delay along any path from the output of one flip-flop to the input of another. Once a designer specifies the clock waveforms, a timing verifier can determine arrival and required times throughout the mapped circuit. At any point in the mapped circuit, the arrival time can be determined relative to a clock edge by measuring the longest path from all registers affected by the clock to the point within the mapped circuit. Similarly, required times may be computed relative to a clock edge by measuring the longest path from the point in the mapped circuit to a register affected by the clock. Once the relationships between all clocks and all clock waveforms are specified, the timing verifier can determine the worst slack for each point within the mapped circuit by subtracting arrival from required times for each possible combination of relevant clock edges. The smallest, or most negative result can be considered the worst slack for that point in the mapped circuit. The Design Compiler Reference Manual V3.1a from Synopsys describes timing analysis, and is hereby incorporated by reference. If any node has a negative slack time, then the timing constraint has not been met. If only a few nodes are have negative slacks, or the negative slacks are close to zero, then the designer might have a small problem that can be fixed by tuning a portion of the design. However, if many nodes have negative slacks or the slack times are large, then the designer faces a substantial design problem. The histogram tool of FIG. 46 can provide guidance on the extent of a problem facing a designer.

The histogram display uses conventional histogram creation techniques. The histogram tool displays the distribution of a numerical characteristic of the GTech or mapped circuit and allows a user to see a list of display objects representing circuit objects having that characteristic. The example in FIG. 46 shows timing analysis for the AMD 2910A. The histogram display tool forms a query asking the data manager about the desired attribute, in this case the slack time, of circuit objects in the design. The data manager uses a timing analyzer to compute the slack times at several points in the circuit. The mapped circuit nodes with similar slack times are grouped into categories, counted, and a histogram is created.

Histogram-list window 2900 contains two sub-windows: the histogram window 2920 and the list window 2910. The histogram window 2920 contains bars 2930 through 2937 with one bar per range of values. The height of the bars indicates the number of nets that fall into that range. If the user selects one of the bars, the list window 2910 shows the list of names that identify the nets that are in that range. Individual items in the list display can be selected, as indicated by selected item 2915.

These mechanisms allow the designer to narrow the circuit selection to a circuit object with a particular property. The selection manager is updated as the designer explores the design. For example, the circuit object with the least amount of slack time can be found by creating a slack histogram and viewing the display objects which make up the worst range of values. The designer can then use other display tools to gain more information about the selected circuit object.

4.4.3 HDL Browser Display

Figure 47:
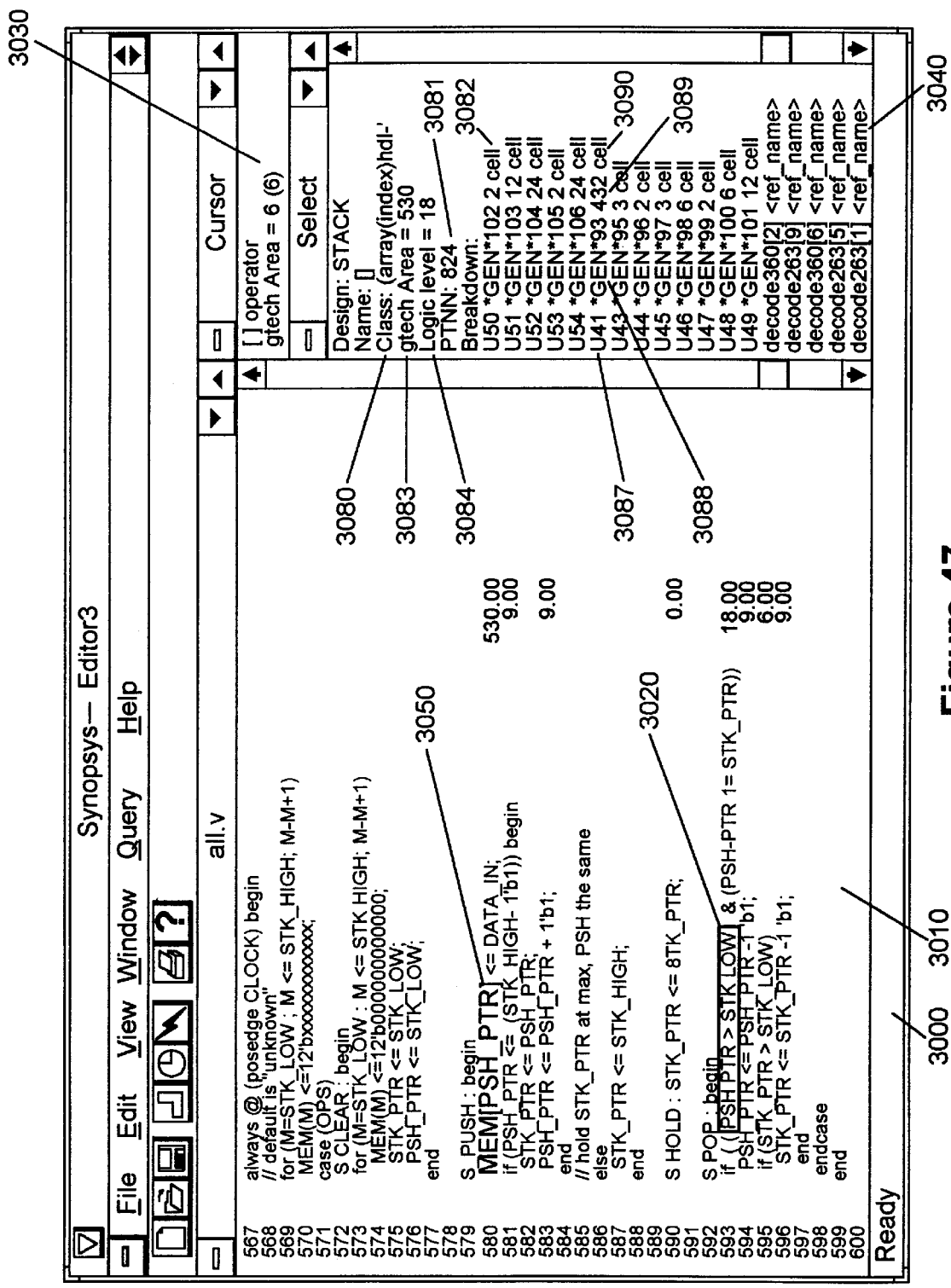
FIG. 47: shows a text display of HDL source code and GTech circuit information related to that source code.

FIG. 47 shows HDL Browser which is also called the HDL text display window. The HDL Browser provides textual display of HDL source code that annotates that source code with additional information. In one embodiment, text display window 3000 contains three smaller windows. Text window 3010 contains the source text. Select window 3040 shows GTech or mapped circuit information related to text that has been selected. Cursor window 3030 shows GTech or mapped circuit information related to text that is under the cursor. Column report 3060 shows GTech or mapped circuit information associated with lines of the text. In an alternate embodiment, the select window and cursor window are independent windows and not contained within the HDL browser.

In one embodiment, selecting text can be done with the usual window based text selection mechanisms. For example, the designer could move a cursor to the relevant portion of the screen and push a button. Alternately, the designer could drag the cursor across an extended portion of text to be selected.

An alternate embodiment allows the designer to select all of the text corresponding to a parse node with a single visual selection. The designer indicates the initial point or the visual selection as usual by moving the cursor and clicking a button. However, the text window 3010 constructs a text box 3020 around the entire parse node represented by the text at which the cursor is pointing. In addition, whenever the user moves the cursor across some text, the text window draws a box around all of the text represented by the first parse node which fully contains the text. Furthermore, the text display window shows the visual selection by drawing a box around all of the text representing the selected parse node. One fast method of determining the limits of text box 3020 uses the parse tree representation described in co-pending U.S. application by Gregory entitled "Method and Apparatus for Context Sensitive Displays" filed on Jun. 3, 1994 as U.S. application Ser. No. 08/253,453.

Here, cursor window 3030 shows a gate count of the GTech circuit parts associated with the display object under the cursor. The phrase "gtech Area=6" indicates that the implementation of the comparison function performed by condition "PSH_PTR>STK_LOW" indicated by cursor text box 3020 requires 6 area units in the generic technology domain in the data manager. Cursor window 3030 could display other characteristics associated with the text pointed to by the cursor.

Select window 3040 shows information associated with selected text. Here, the size and font of the selected text 1050 is changed. One fast method of determining the limits of selected text 1050 would be to use the parse tree representation described in co-pending U.S. application by Gregory entitled "Method and Apparatus for Context Sensitive Displays", filed on Jun. 3, 1994 as U.S. application Ser. No. 08/253,453. In this example, the select window 3040 shows detailed information about the HDL construct MEM[PSH_PTR] 3050. Statement 3080 shows the type of HDL construct that the selected circuit object is—in this case, the construct is an array index. Statement 3083 shows the estimated area of the construct in the G-Tech domain 1510, here 530 area units. Statement 3084 shows the length of the longest path in levels of logic from a register to the gates that implement the construct, here 18 gates. Statement 3081 shows the parse tree node number. A detailed list 3082 shows the netlist components in the G-Tech domain implementing the construct 3050. For each component in this list, the following information is displayed: the component's netlist instance name 3087, the type of netlist component 3088 (reference name), its contribution to the total area estimate 3089, and the class of netlist component 3090 e.g. cell, pin, net, or port. Other information could be displayed at the designer's option.

Column report 3060 shows information associated with each line. Here, the column report is showing the area associated with the HDL constructs on each line.

4.4.4 Virtual Schematic Display

Figure 48:
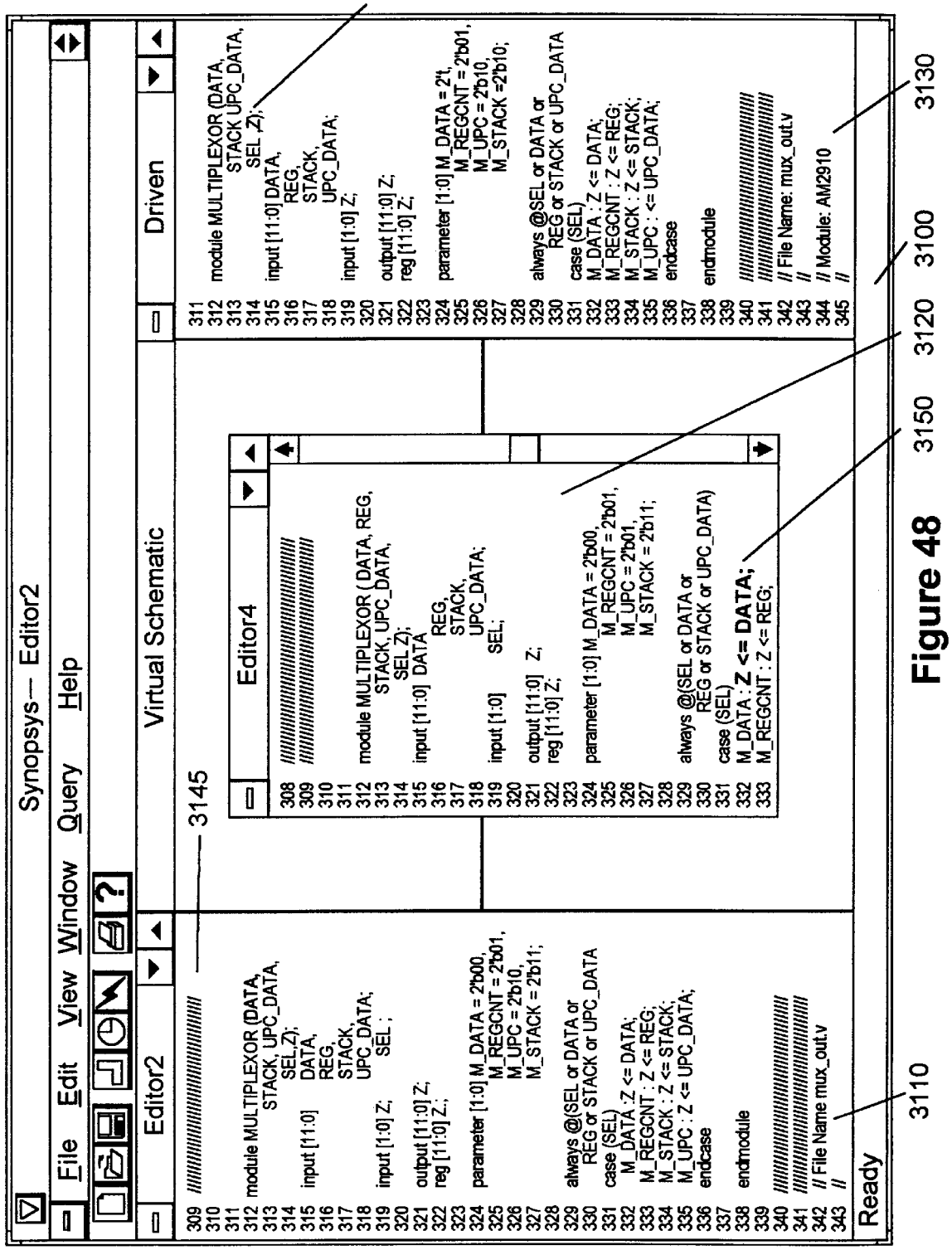
FIG. 48: shows a virtual schematic display showing the inputs and outputs associated with a particular part of VHDL source code.

Part of the digital circuit analysis process involves tracing the drivers and driven or, inputs and outputs of specific GTech or mapped circuit parts. The virtual schematic display shown in FIG. 48 provides the designer with the ability to find the HDL source that provides inputs to and takes outputs from another point in the HDL source. The virtual schematic display has a virtual schematic window 3100 which has three window regions: an input region 3110, a current region 3120, and an output region 3130. The designer uses the cursor to indicate selected text 3150 in the current region. This selected text 3150 corresponds to a GTech circuit object 3151 (not shown) in the data manager. GTech circuit object 3151 has inputs and outputs. The data manager then links the input region 3110 to those portions of the HDL source text that show where the inputs of GTech circuit object 3151 originated. Here, the input "DATA" comes from an input to the module MULTIPLEXOR as indicated by input argument 3145. The data manager also links the output region 3130 to those portions of the HDL source text that show where the outputs of GTech circuit object 3151 go to. Here, as indicated by output argument 3155, output "Z" goes to the output of module MULTIPLEXOR.

Figure 49:
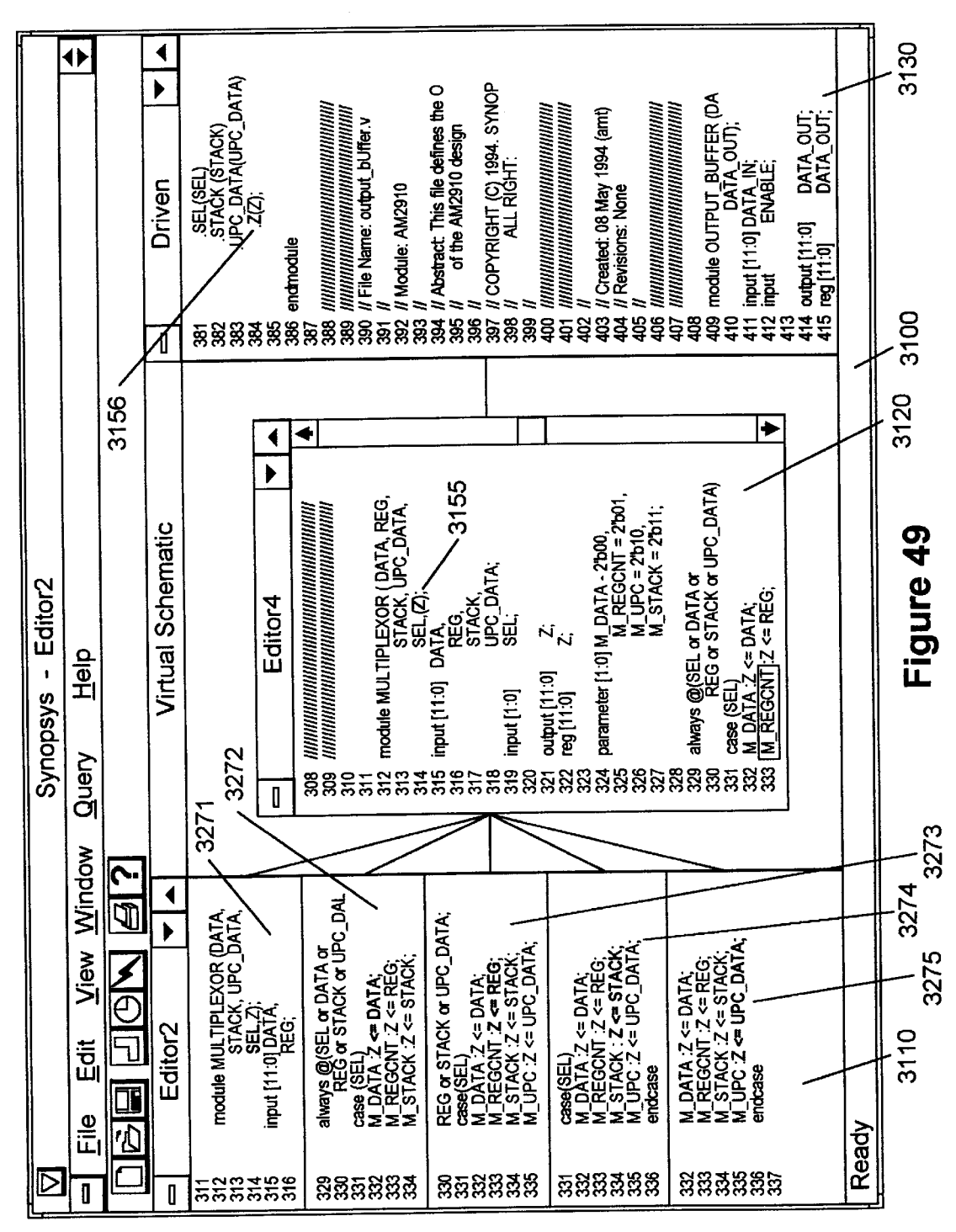

By clicking in the output region, the designer can trace the transitive fanout. FIG. 49 shows the changes that occur in the regions. The text of the output region now moves to the current region 3120. The text of the output region changes to show synthesis source text corresponding to circuit objects driven by output argument 3155. Here, output argument 3155 drives another output at the next level module boundary, as shown by output argument 3156. Input region 3110 changes to show all of the places in the source text that set or define the selected output argument 3155. Here, there are five text sources for output argument 3155 as shown in windows 3271, 3272, 3273, 3274, and 3275. The originally selected statement 3150 is shown again in window 3272.

An additional input comes from the MULTIPLEXOR input argument SEL as shown in window 3271. Z is also takes on values at different points in a case statement as shown in windows 3272, 3273, 3274, and 3275.

Figure 50:
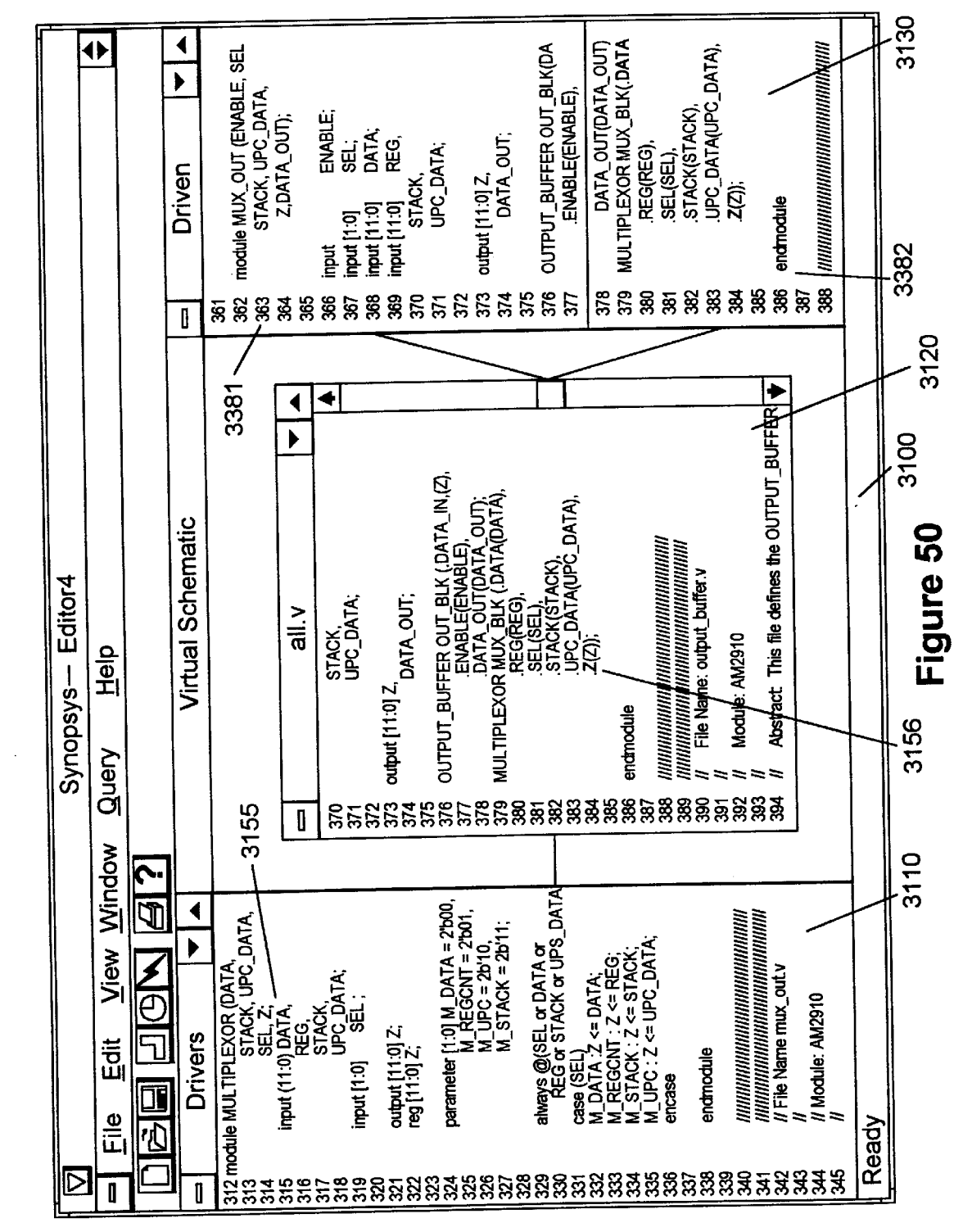

FIG. 50 shows the results of pursuing the output argument 3156. Here, the high level module definition appears in the current region 3120 while the input region 3110 displays the module interface shown in the current region of FIG. 49.

Inputs can be pursued in the same manner as outputs. Note that by selecting circuit objects via display objects in the virtual schematic the designer is updating the selection manager so the HDL Browser window is also updated as the GTech fan-in and fan-out is analyzed.

The collection of all of the points in a circuit leading to a particular point is referred to as the transitive fan-in of that point. The collection of all of the points in a circuit that depend on the value of a particular point is the transitive fan-out. The preceding example showed how to trace transitive fan-in and transitive fan-out using the virtual schematic.

During analysis, the designer might need to consider the impact that a change in one part of the design would have other parts of the design. If the designer is considering changing the source HDL, the designer would find it useful to identify how the proposed change will influence the resulting GTech circuit. Suppose that the designer wishes to change a particular function in the source HDL. The designer will find it useful to determine all of the inputs to that function or all of the outputs to that function to see how the change will affect the remainder of the GTech circuit. While tracing all of the inputs (or outputs) of a particular part of the source HDL is a difficult task using only the HDL source, using the direct correspondence between the HDL and the initial GTech circuit formed during translation makes it possible to highlight the inputs (or outputs) in the source HDL.

4.4.5 Logic Inspector

The logic inspector window displays the transitive fan-in logic to selected endpoints in the design. This logic is calculated from the GTech representation of the design. The logic inspector window displays the inputs that are used to compute a value within the design, the initial boolean structure implied by the HDL source, and the probable effect of boolean minimization after optimization.

Boolean minimization can be invoked from the logic inspector window to show the potential reduction of the original logic structure, which is based on logic level or component count reduction goals before logic optimization. Note that a portion of the GTech circuit is isolated for boolean minimization when the transitive fanin of an endpoint is selected.

To view boolean logic corresponding to the current circuit selection, the designer chooses the "New Logic" option in the logic inspector by choosing a menu item or pushing a button. The logic inspector causes logic corresponding to the current circuit selection to be created as follows. First, the logic inspector determines the current circuit selection in the GTech domain by querying the selection manager. The selection manager sends the logic inspector a GTech circuit object. The logic inspector may limit the logic created by asking the designer to specify the bit position in the circuit selection from which to create the logic.

First, the logic inspector queries the data manager to compute all of the circuit objects which make up the transitive fan-in for the selected circuit object. The logic inspector then asks the data manager to send the group GTech parts to a logic optimizer. In one embodiment, the logic optimizer optimizes the logic represented by the GTech parts and returns a string which represents the logic equations produced after the logic has been optimized. Note that the optimizer attempts to improve the GTech logic using standard optimization techniques such as those described above, but does not map it. In one embodiment, the designer can specify the optimization effort used when optimizing the logic. The logic inspector then displays the string returned as a schematic.

Figure 52:
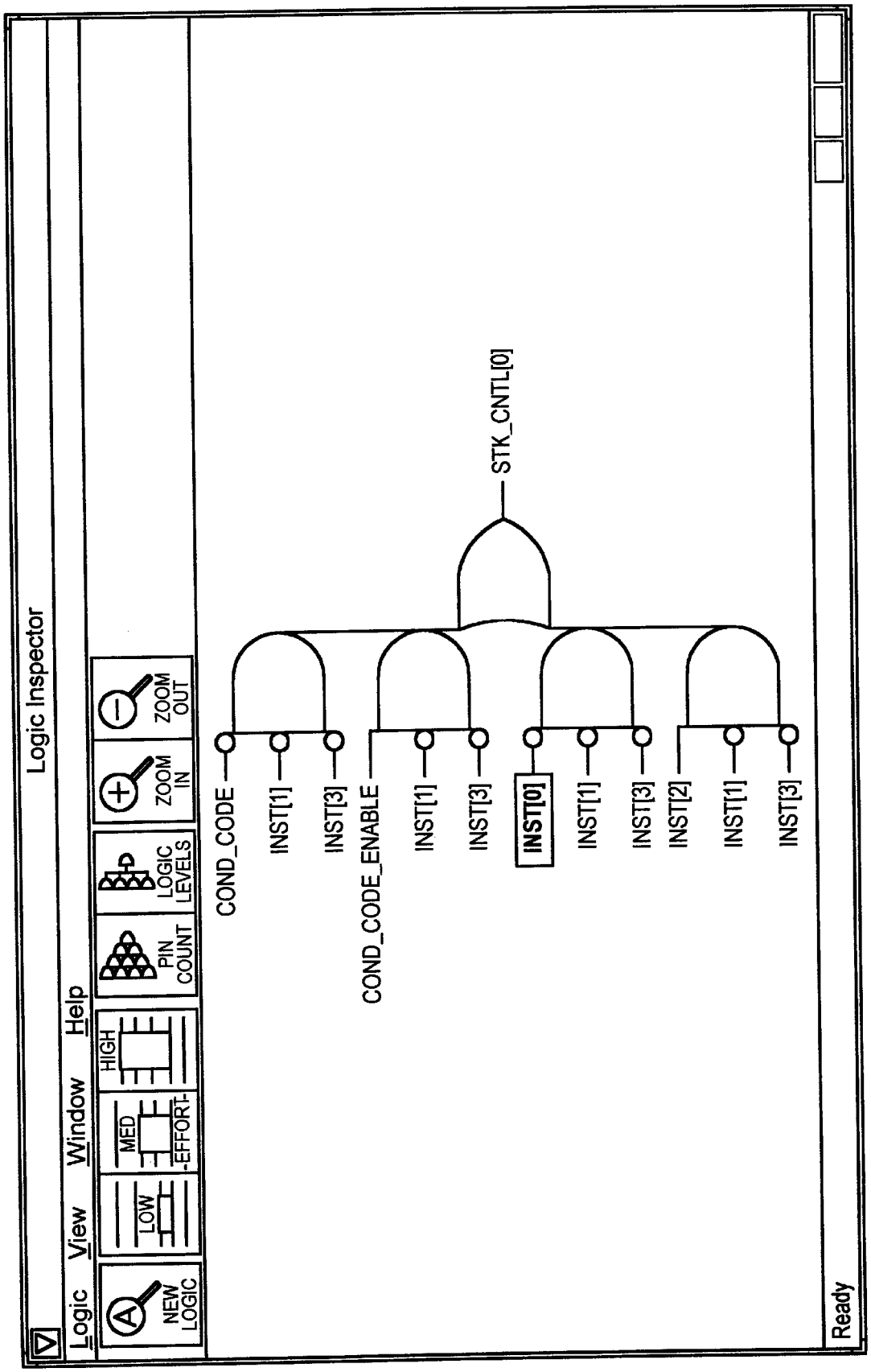
FIG. 52: shows the logic inspector displaying a graphical representation of logic created by the logic inspector.

FIG. 52 shows the logic inspector displaying a graphical representation of logic created by the logic inspector. This logic was optimized using a medium level of effort. The optimization effort level determines the complexity of the optimization strategies which are invoked.

The schematics displayed by the logic inspector represent GTech boolean logic, rather than mapped circuit structures. A property of GTech boolean logic is that simple gates such as AND, OR, NAND, and NOR gates do not differentiate between their inputs. Thus, there is no need to route signals between such gates. Therefore, the logic inspector symbol generator is very fast because it simply draws a gate for each operator in the boolean equation. The gates are connected directly to one another, creating complex gates which represent the boolean equation.

The logic inspector symbol generator creates complex symbols from boolean equations using a two step process. First, the symbol generator traces from each input to the outputs it drives in order to compute the size of the gates driving each symbol. Next, the symbol generator starts at the output of the equation and works backwards. Each boolean expression is displayed as a simple logic gate. As the symbol generator works backwards it places new gates directly behind the previous level. The gates are placed far enough apart so that there is room to place the driving gates before them. When the terminals of the equation are reached, they are simply connected to the pins of the last layer of logic. Note that the same terminal may be added to more than one pin, without needing to route the signal represented by the terminal from a single port.

4.4.6 Path Browser

Figure 51:
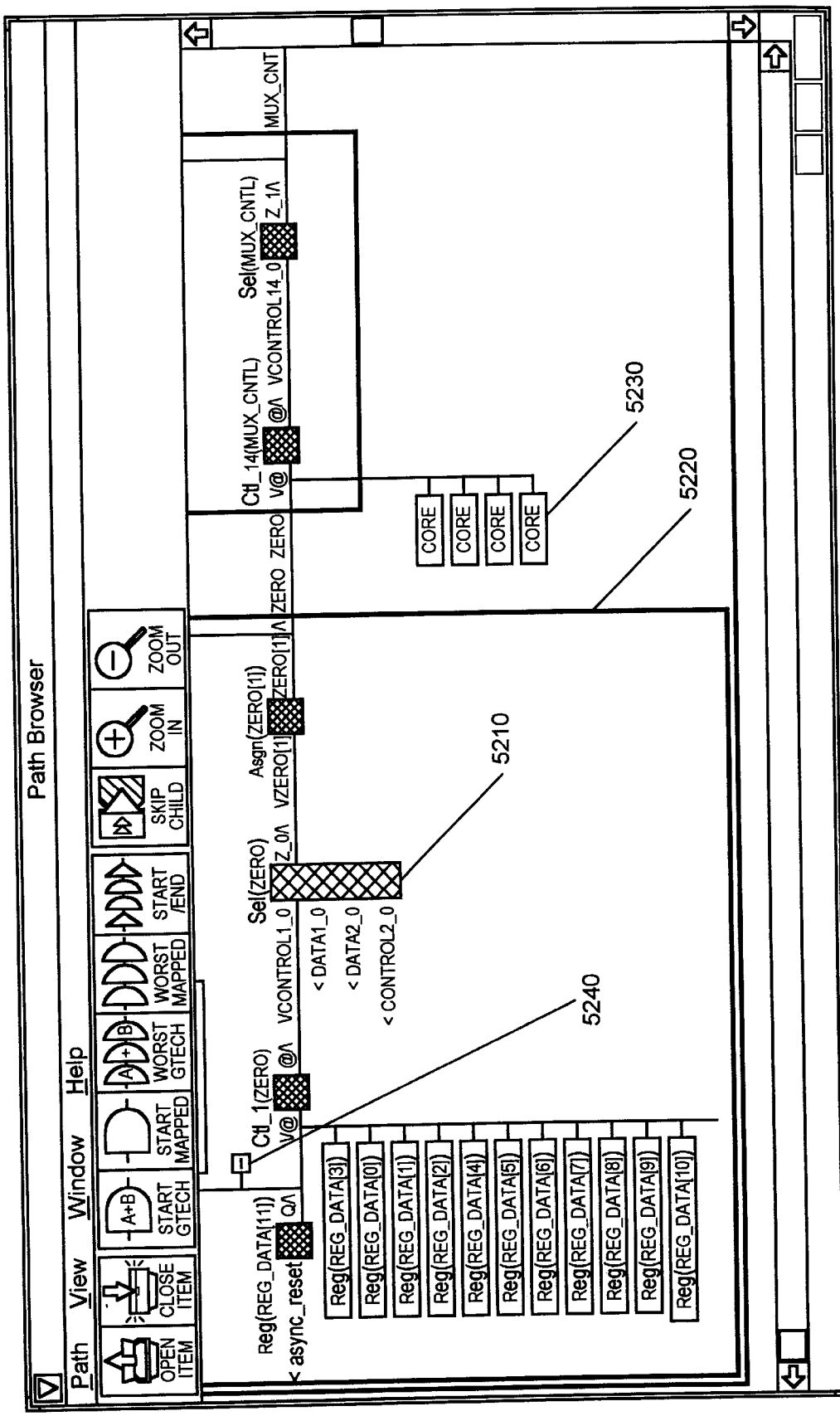
FIG. 51: shows the Path Browser window.

FIG. 51 shows the path browser window displaying a path in a GTech representation of the AMD 2910A.

The path browser window enables the designer to explore graphically the connections in the design. This window displays a single path in the design, including all of the fan-in and fan-out logic of the elements along the path. The paths may be displayed in either the GTech or the gate domain. Connectivity implications of the HDL source can be understood by using the intra-domain mapping capability to relate any point on a GTech path to the source HDL. The path browser window shows the fanout of drivers on the displayed path. An example of this is GTech part 5240. Showing fanouts allows the designer to view the effect of loading on the path. The path browser window also shows the fanin onto the path. An example of this is GTech gate 5230. Levels of hierarchy are displayed as boxes 5220 around logic on the path. Levels of hierarchy are important because they might influence the optimizer's ability to improve the GTech or mapped circuit.

The path browser window is interactive. By clicking on a display object in the path browser window, the user can expand that display object to show all of the inputs to and outputs from the circuit object represented by that display object. GTech part 5210 has been expanded in this manner. Clicking on a logic element also updates the circuit selection stored in the selection manager. An alternate path can be displayed by choosing a new pin or port and using that pin or port as the startpoint for another GTech or mapped path.

A mechanism for GTech analysis, "start/end mode" further leverages the intra-domain mapping capability. Start/End mode allows the designer to choose a path in the mapped logic domain. The start and end points of the path are mapped to the GTech domain using the intra-domain mapping. The GTech timing verifier then computes the longest path in the GTech circuit between the start and end points. Using the mapping between the GTech and the source domains, the path is displayed in the HDL text. This process allows the designer to perform timing analysis in the original HDL and to improve the timing characteristics of the design at the source level.

Note that the HDL Advisor does not create traditional multi-sheet schematics. The path browser window displays a graphical representation of a path through the digital circuit arising from an HDL. The path might be composed of either GTech or mapped logic components.

4.5 Analysis Tools

As described earlier, the architecture of the HDL Advisor allows any number of digital circuit analysis tools to be registered to answer queries. For example, a non-exhaustive list of analysis tools includes:

A timing verifier

An area analysis tool

A power analysis tool

A path tracing tool

A layout analysis tool

A GTech logic levels analysis tool

A GTech component count analysis tool 4.6 Detailed Example

This section describes an example using the three part architecture described in preceding sections. This example uses an AMD2910A design. The source and resulting mapped circuit is described in Introduction to HDL-Based Design Using VHDL, by Steve Carlson, published in 1991, which is hereby incorporated by reference. This book is available from Synopsys, Inc., 700 East Middlefield Road, Mountain View, Calif. 94043-4033. The AMD2910A design has been loaded into the HDL Advisor as described in the HDL Advisor User Guide, Version 4.0a Beta Draft, which is available from Synopsys, Inc. of Mountain View, Calif. and is hereby incorporated by reference.

4.6.1 The Designer's View

In this example, the designer wishes to evaluate the component count of a GTech design before synthesis and then identify the portions of the HDL code that consume a large number of components.

Figure 55:
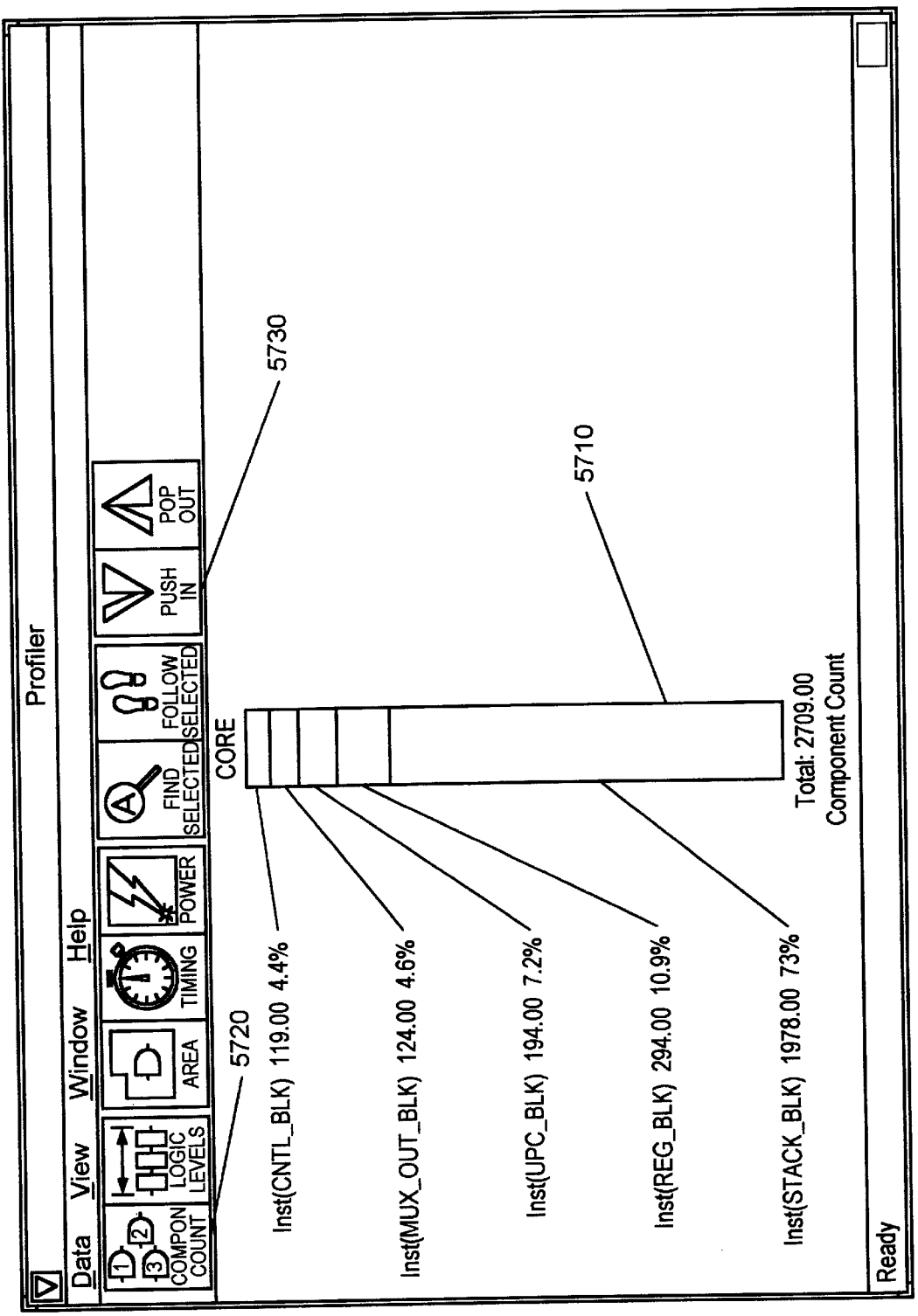
FIG. 55: shows the stacked bar graph displaying component counts for the AMD2910A.

First, the designer uses the stacked bar graph display tool to display a stacked bar graph of the component counts of the entire GTech circuit. FIG. 55 shows the stacked bar graph displaying component counts for the AMD2910A. To obtain this display, the designer first opens the stacked bar graph display window using a conventional method such as choosing a menu item. The designer then clicks on the Component Count icon 5720 in the stacked bar graph display. The data that appears in this display shows the distribution of the segments within the "CORE" design of the AMD2910A. Notice that the display is partitioned in terms of the HDL source. Each section of the stacked bar graph represents a circuit object in the source domain. Analysis is done in the GTech domain, but the results are grouped by objects in the source domain.

In the stacked bar graph display, the designer sees that the majority of the components are used in the "STACK_BLK" component. This is indicated by the display object, in this case a large bar, representing the components in the STACK_BLK 5710. The designer now wishes to obtain further information regarding the distribution of the components within the STACK_BLK. The designer selects display object representing the STACK_BLK 5710 by clicking on it. The designer looks deeper into the STACK_BLK by clicking the PUSH IN icon 5730. An alternate method of simultaneously selecting the display object and looking deeper is to double click on the display object.

Figure 56:
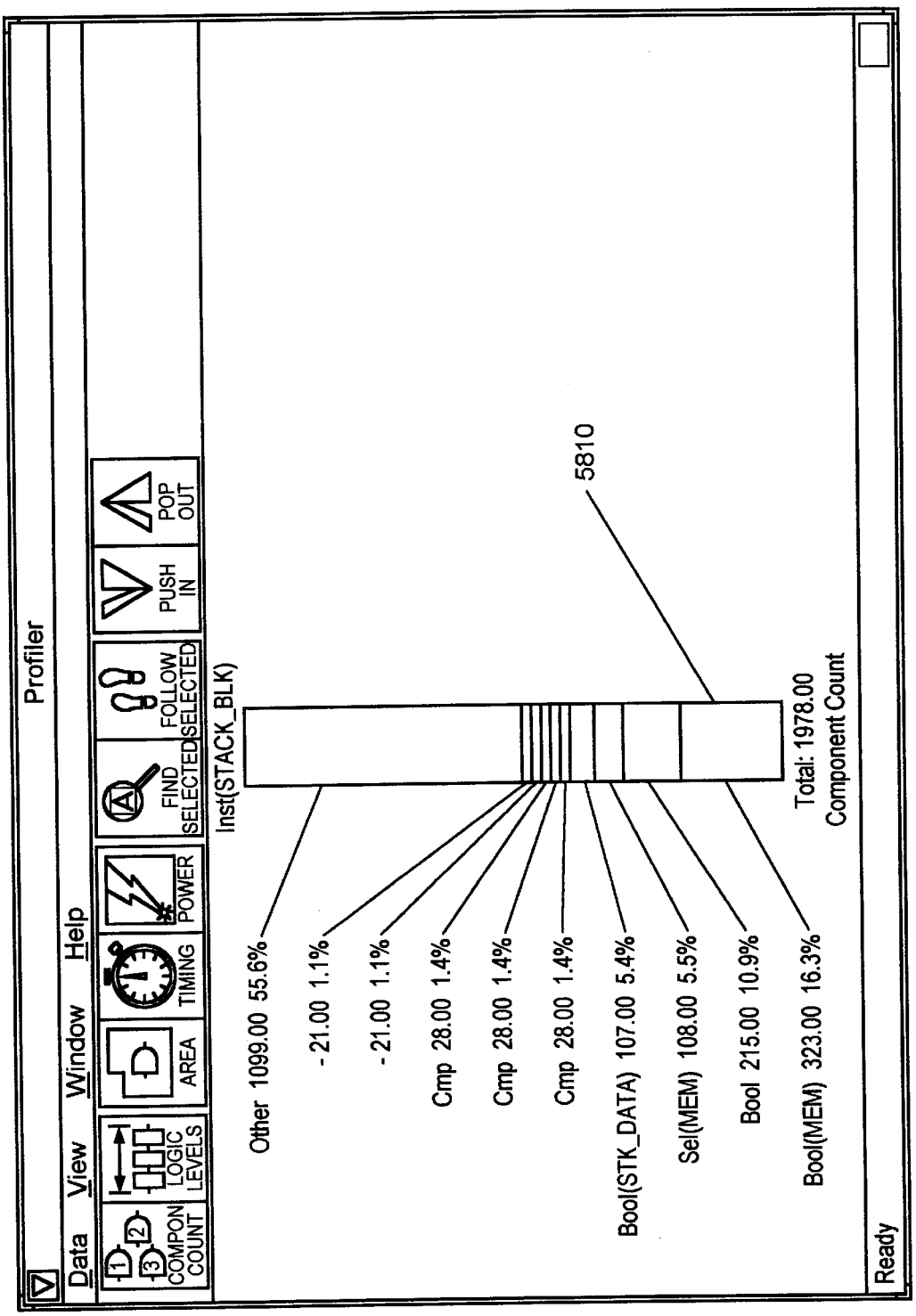
FIG. 56: shows the stacked bar graph displaying component counts for the STACK_BLK module of the AMD2910A.

When the designer looks deeper into the STACK_BLK the stacked bar graph display changes to show the component counts of modules within the STACK_BLK. FIG. 56 shows the stacked bar graph displaying component counts for the stack module of the AMD2910A.

In addition, when the designer selects the display object representing the STACK_BLK 5710, the HDL text browser displays the HDL source which instantiated the STACK_BLK. FIG. 57 shows the HDL text browser with the source code for the STACK_BLK 5910 hilighted By hilighting the source code for the STACK_BLK, the HDL text browser is indicating both that the STACK_BLK circuit object is selected, and also providing a convenient mechanism for the user to see the selected display object.

At this point, the designer selects the largest single element bar in the STACK_BLK display 5820. This bar represents a variable array index in the GTech circuit. The HDL Browser highlights the HDL source code for the variable array index, and the designer may consider if the construct could be rewritten to reduce the component count. For example, the array size may be reduced, or the data may be extracted with a shift operation which consumes less components. Alternatively, the designer can select other large bars in the STACK_BLK so he can consider rewriting their related source HDL.

This tool architecture helps the circuit designer by graphically displaying important design characteristics, such as component count, and providing the designer with a simple mechanism to display the portion of the HDL source that is responsible for the particular characteristics.

4.6.2 Implementation

Figure 61:
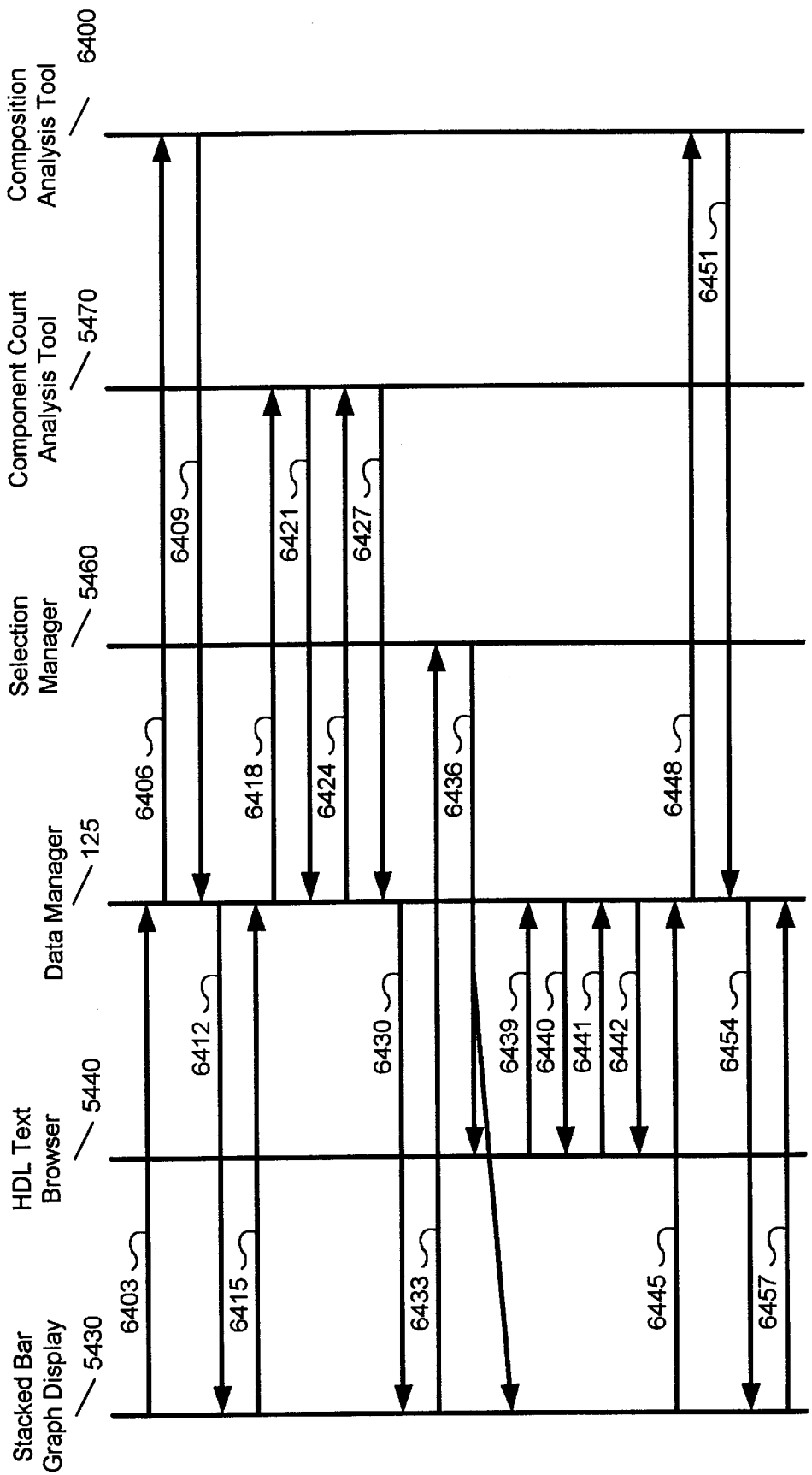
FIG. 61: shows the communication flow as the designer analyzes a specific design.

This section describes how the HDL Advisor software creates the displays viewed by the designer in the previous example. FIG. 61 shows the communication flow as the designer analyzes the design.

First, the designer 520 uses the stacked bar graph display tool 5430 which is also shown in shown in FIG. 55 to display a stacked bar graph of the component counts of the entire GTech circuit. The stacked bar graph display tool 5430 appears in a conventional window on the screen of a computer.

When the designer pushes the component count icon 5710 in the stacked bar graph display 5430, the stacked bar graph display tool 5430 issues a query to the data manager 125 to find the component counts of all of the circuit objects which make the entire design. In one embodiment, there is a special global id called the <design_id> which represents the entire design.

In one embodiment, finding component counts for the entire design is a two step process. First, the stacked bar graph display tool (-- --) 5430 issues a query 6403 to the data manager 125 asking for a list of the components which make up the design in the source domain. In one embodiment, the query 6403 has the following fields: ("composition", [<design_id>], False, Null). "Composition" is the type of query and indicates that the query is requesting the circuit objects which make up the objects in the object list, which is [<design_id>]. False indicates that the results should not be cached. Null is the aggregation function because none is needed for a composition query.

The data manager 125 then computes the answer to the query 6403. In one emodiment, the data manager 125 determines that a composition query 6403 can be anwered by a composition analysis tool 6400 which operates in the GTech domain. The data manager 125 uses the domain mapper to map the <design_id> from the source domain to a circuit object in the GTech domain. Note that analysis tools do not use global id's, but rather circuit objects in a domain. The data manager 125 then sends the composition analysis tool 6400 a query 6406 to find the composition of the design. In one embodiment, the query 6406 has the following fields: ("composition", <design>, False, Null). "Composition" is the type of query and indicates that the query is requesting the circuit objects which make up the design, which is indicated by <design>. False indicates that the results should not be cached. Null is the aggregation function because none is needed for a composition query. The composition analysis tool 6400 then traverses the GTech circuit, finds the composition of the design, and returns the data manager 125 a message 6409 with the result. In one embodiment, the message 6409 is: message ("composition_result", [<CNTL_BLK>, <MUX_OUT_BLK>, <UPC_BLK>, <REG_BLK>, <STACK_BLK>]). The data manager 125 then determines global ids for each of these objects. In one embodiment, the data manager 125 uses the objects as indices into a table to look up the global ids. In another embodiment, the global ids are stored on the objects. The data manager 125 then sends the stacked bar graph 5430 a response 6412 to the query. In one embodiment, the return message is message ("composition_result", [<CNTL_BLK_ID>, <MUX_OUT_BLK_ID>, <UPC_BLK_ID>, <REG_BLK_ID>, <STACK_BLK_ID>]).

Next, the stacked bar graph display tool 5430 issues a query 6415 to the data manager 125 asking for the component count of each of the circuit objects in the composition list. In one embodiment, the query 6415 has the following fields: ("component_count", [<CNTL_BLK_ID>, <MUX_OUT_BLK_ID>, <UPC_BLK_ID>, <REG_BLK_ID>, <STACK_BLK_ID>], False, Sum). "Component_count" is the type of query and indicates that the query is requesting the circuit objects which make up the objects in the object list, [<CNTL_BLK_ID>, <MUX_OUT_BLK_ID>, <UPC_BLK_ID>, <REG_BLK_ID>, <STACK_BLK_ID>]. False indicates that the results should not be cached. Sum is the aggregation function because a component count result is aggregated by summing the results of subqueries. In one embodiment, sum is chosen as the aggregation function by looking up the component_count query type in a table.

The data manager 125 then computes the answer to the query 6415. In one embodiment, the data manager 125 determines that a component_count query can be answered by a component count analysis tool 5470 which operates in the GTech domain. The data manager 125 uses the domain mapper to map the objects in the object list from the source domain to a circuit object in the GTech domain. The data manager 125 then creates a subquery for each of the objects in the object list. In one embodiment, the first subquery 6418 has the following fields: ("component_count", <CNTL_BLK>, False, Sum). "Component_count" is the type of query and indicates that the query is requesting the circuit objects which make up the CNTL_BLK, which is indicated by <CNTL_BLK>. False indicates that the results should not be cached. Sum is the aggregation function because component count results are aggregated by summing the component counts together. The component count analysis tool 5470 then traverses the GTech circuit, finds the component count of each element in the CNTL_BLK, sums all of the component counts together, and returns the data manager 125 a message 6421 with the result. In one embodiment, the message 6421 is: message ("component_count_result", 119.0). The data manager 125 issues a series of subqueries 6424 for each of the objects in the object list and the component count analysis tool 5470 sends response messages 6427. The data manager 125 then sends the stacked bar graph a response to the original query. In one embodiment, the return message 6430 is message ("composition_result", [119.0, 124.0, 194.0, 294.0, 1978.0 ]). The stacked bar graph display uses these number to create the stacked bar graph shown in FIG. 55.

The designer then selects the display object representing the STACK_BLK to obtain more information about this part of the design.

When the designer selects the display object representing the STACK_BLK 5720, the stacked bar graph sends the selection manager 5460 a message 6433 indicating the new selection. In one embodiment, the message 6433 is message ("selection_set", <STACK_BLK_ID>). The selection manager 5460 in turn broadcasts the selection to all of the display tools using a message. In one embodiment, the message 6436 is message( "selection", <STACK_BLK_ID>). One of the recipients of this message 6436 is the HDL text browser 5440.

The HDL text browser 5440 sends a message 6439 to the data manager 125 to get the selection as a source domain circuit object. In one embodiment, the message 6439 is: message ("GetGlobalId", [<STACK_BLK_ID>], Source). The data manager 125 returns a message 6440 to the HDL text browser 5440 which includes the global id which represents the STACK_BLK in the source domain. The HDL text browser 5440 then sends a message 6441 to the data manager 125 requesting the parse tree node number corresponding to the global id. In one embodiment, the message 6441 is: message ("GlobalIdToLocalID", [<STACK_BLK_ID>]). The data manager 125 returns a message 6442 which includes the parse tree node number corresponding to the <STACK_BLK_ID> to the HDL text browser 5440. The HDL text browser 5440 then hilights the text which corresponds to the parse tree node represented by the parse tree node number. In one embodiment, the text is hilighted by drawing a darker background for it as shown in FIG. 57.

The designer now obtains further information regarding the distribution of the elements within the STACK_BLK and the stacked bar graph display changes to show the component counts of modules within the STACK_BLK. The stacked bar graph display determines the composition and the component_count of the STACK_BLK module.

In one embodiment, the stacked bar graph 5430 sends the data manager 125 a query 6445 ("composition",[<STACK_BLK_ID>], False, Null). The data manager 125 then determines the answer to the query 6445. In one embodiment, the data manager 125 determines that a composition query can be answered by a composition analysis tool 6400 which operates in the GTech domain. The data manager 125 uses the domain mapper to map the <STACK_BLK_ID> from the source domain to a circuit object in the GTech domain. The data manager 125 then sends the composition analysis tool 6400 a query 6448 to find the composition of the STACK_BLK. In one embodiment, the query 6448 has the following fields: ("composition", <STACK_BLK>, False, Null) "composition" is the type of query and indicates that the query 6448 is requesting the circuit objects which make up the STACK_BLK, which is indicated by <STACK_BLK>. False indicates that the results should not be cached. Null is the aggregation function because none is needed for a composition query. The composition analysis tool 6400 then traverses the GTech circuit, finds the composition of the STACK_BLK, and returns the data manager 125 a message 6451 with the result. In one embodiment, the message 6451 is: message ("composition_result", [<Bool_mem>, <Bool>, <Sel_MEM>, <Bool_STK_DATA>, ... ]). After converting from objects to global id's, the data manager 125 sends the stacked bar graph 5430 a response to the query. In one embodiment, the return message 6454 is message ("composition_result", [[<Bool_Mem_ID>, <Bool_ID>, <Sel_MEM_ID>, <Bool_STK_DATA_ID>, ... ]]) In this example, [<Bool_Mem_ID>, <Bool_ID>, <Sel_MEM_ID>, <Bool_STK_DATA_ID>, ... ] is a partial list of the elements in the STACK_BLK. The other global ids are omitted for clarity.

Next, the stacked bar graph display tool 5430 issues a query 6457 to the data manager 125 asking for the component count of each of the circuit objects in the composition list. In one embodiment, the query 6457 has the following fields: ("component_count", [<Bool_Mem_ID>, <Bool_ID>, <Sel_MEM_ID>, <Bool_STK_DATA_ID>, ... ], False, Source, Sum).

The data manager 125 answers the component count query 6457 for this new object list using the component count analysis tool 5470 in the same fashion as described above. The stacked bar graph display 5430 uses the returned results to create the stacked bar graph shown in FIG. 56. At this point, the designer 520 selects the largest single element bar 5810 in the STACK_BLK display. The selection manager 5460 communicates the new selection to the HDL text display 5440 in the same fashion as described above. The HDL text display 5440 then highlights the HDL source code for the variable array index.

We claim:

1. A computer-aided circuit analysis tool for analyzing a text description of a digital system written in a circuit design language, comprising:

a parse generator generating a parse data structure stored in a memory of the system, in accordance with the text description, the parse data structure including a parse node, wherein a portion of the text description refers to the parse node and the parse node refers to the portion of the text description;

a digital Gtech circuit representation generator generating a digital Gtech circuit representation stored in the memory, the digital Gtech circuit representation synthesized from the parse data structure and including a Gtech circuit element, the Gtech circuit element referring to the parse node, wherein the parse node also refers to the Gtech circuit element; and wherein the portion of the text description, related to the Gtech circuit element, can be determined by following the reference from the Gtech circuit element to the parse node and the reference from the parse node to the portion of the text description.

2. A computer-aided circuit analysis tool for analyzing a text description of a digital system written in a circuit design language, comprising:

a parse generator generating a parse data structure stored in a memory, in accordance with the text description, the parse data structure including a parse node, wherein a portion of the text description refers to the parse node and the parse node refers to the portion of the text description;

a digital circuit representation generator generating a digital circuit representation stored in the memory, the digital circuit representation synthesized from the parse data structure and including a first circuit element, the first circuit element referring to the parse node, wherein the parse node also refers to the first circuit element; and wherein the portion of the text description, related to first circuit element, can be determined by following the reference from the first circuit element to the parse node and the reference from the parse node to the portion of the text description.

3. The computer-aided circuit analysis tool of claim 2, wherein said circuit design language is Verilog.

4. The computer-aided circuit analysis tool of claim 2, wherein said circuit design language is VHDL.

5. A computer-aided circuit analysis, tool for analyzing a text description of a digital system written in a circuit design language, comprising:

a parse generator generating a parse data structure stored in a memory in accordance with the text description, the parse data structure including a parse node, wherein a portion of the text description refers to the parse node and the parse node refers to the portion of the text description;

a digital circuit representation generator generating a digital circuit representation stored in the memory, the digital circuit representation synthesized from the parse data structure and including a first circuit element, the first circuit element referring to the parse node, wherein the parse node also refers to the first circuit element;

a numerical physical characteristic of said first circuit element, stored in the memory; and a computer window generator causing to be displayed a visual object linked to said parse node and having a visual display characteristic determined by said numerical physical characteristic.

6. The computer-aided circuit analysis tool of claim 5, wherein said first circuit element includes one or more circuit parts, with each circuit part possessing an area, and said numerical physical characteristic is the sum of the areas of said circuit parts.

7. The computer-aided circuit analysis tool of claim 5, wherein said first circuit element includes a circuit part input pin and a primary input, and said numerical physical characteristic is a time delay from said primary input to said circuit part pin.

8. The computer-aided circuit analysis tool of claim 5, wherein said visual object is a rectangle having a height, said visual display characteristic being said height.

9. The computer-aided circuit analysis tool of claim 5, wherein said visual object is a text character said visual display characteristic is a displayed font of said text character.

10. The computer-aided circuit analysis tool of claim 5, wherein said visual object is a text character and said visual display characteristic is a displayed color of said text character.

11. The computer-aided circuit analysis tool of claim 5, wherein said circuit design language is Verilog.

12. The computer-aided circuit analysis tool of claim 5, wherein said circuit design language is VHDL.

13. A computer-aided circuit analysis tool for analyzing a text description of a digital system written in a circuit design language, comprising:

a parse generator generating a parse data structure stored in a memory, in accordance with the text description, the parse data structure including a parse node, wherein a portion of the text description refers to the parse node and the parse node refers to the portion of the text description;

a digital circuit representation generator generating a digital circuit representation stored in the memory, the digital circuit representation synthesized from the parse data structure and including a first circuit element, the first circuit element referring to the parse node, wherein the parse node also refers to the first circuit element;

a first display window generator causing to be displayed in a first display window, a first display object linked to said parse node; and a second display window generator, causing to be displayed in a second display window, a second display object linked to said first circuit element.

14. The computer-aided circuit analysis tool of claim 13, wherein said first display object includes a sequence of one or more characters from said text description, and wherein said sequence of characters includes a subsequence of characters related to said parse node in accordance with said circuit description language.

15. The computer-aided circuit analysis tool of claim 14, wherein said subsequence of characters is displayed with a visual characteristic distinct from the visual characteristic of said sequence of characters not included in said subsequence.

16. The computer-aided circuit analysis tool of claim 13, wherein said first display object includes a sequence of one or more characters from said text description related to said parse node in accordance with said circuit description language.

17. The computer-aided circuit analysis tool of claim 13, wherein said circuit design language is Verilog.

18. The computer-aided circuit analysis tool of claim 13, wherein said circuit design language is VHDL.

19. A computer-aided circuit analysis tool for analyzing a text description of a digital system written in a circuit design language, comprising:

a parse generator generating a parse data structure stored in a memory, in accordance with the text description, the parse data structure including a parse node, wherein a portion of the text description refers to the parse node and the parse node refers to the portion of the text description;

a digital circuit representation generator generating a digital circuit representation stored in the memory, the digital circuit representation synthesized from the parse data structure and including a first circuit element, the first circuit element referring to the parse node, wherein the parse node also refers to the first circuit element; and an optimizer that optimizes the digital circuit representation, yielding a mapped circuit representation stored in the memory, the mapped digital circuit representation including a second circuit element, the second circuit element referring to one of said parse node or said first circuit element, so that there is a traceable path between the second circuit element and the parse node.

20. The computer-aided circuit analysis tool of claim 19, wherein there is a traceable path between the second circuit element and the first circuit element.

21. A computer-aided circuit analysis tool for analyzing a text description of a digital system written in a circuit design language, comprising:

a parse generator generating a parse data structure stored in a memory, in accordance with the text description, the parse data structure including a parse node, wherein a portion of the text description refers to the parse node and the parse node refers to the portion of the text description;

a digital circuit representation generator generating a digital circuit representation stored in the memory, the digital circuit representation synthesized from the parse data structure and including a circuit element, the circuit element referring to the parse node, wherein the parse node also refers to the circuit element; and a stacked bar graph window display generator causing a stacked bar graph to be displayed on a display screen, the stacked bar graph representing a numerical physical characteristic of the circuit element, stored in the memory.

22. The computer-aided circuit analysis tool of claim 21, wherein the numerical physical characteristic represented by the stacked bar graph is power.

23. The computer-aided circuit analysis tool of claim 21, wherein the numerical physical characteristic represented by the stacked bar graph is area.

24. The computer-aided circuit analysis tool of claim 21, wherein the numerical physical characteristic represented by the stacked bar graph is logic levels.

25. The computer-aided circuit analysis tool of claim 21, further comprising:

a text window display generator causing a portion of the text description that is traceable to the stacked bar graph to be displayed with a different physical property.

26. The computer-aided circuit analysis tool of claim 25, wherein the entire portion of the text description that is traceable to the stacked bar graph is displayed with a predetermined physical property.

27. The computer-aided circuit analysis tool of claim 25, further comprising:

a user input receiver that receives an indication that a user has selected a portion of the stacked bar graph;

wherein the text window display generator causes a portion of the text description that is traceable to the selected portion of the stacked bar graph to be displayed with the predetermined physical property in accordance with the user selection.

28. The computer-aided circuit analysis tool of claim 25, further comprising a user input receiver that receives an indication that a user has selected a portion of the stacked bar graph;

wherein the stacked bar graph window display generator causes a second stacked bar graph to be displayed on a display screen in accordance with the user selection, the second stacked bar graph representing the numerical physical characteristic of a lower hierarchy of said circuit element.

29. The computer-aided circuit analysis tool of claim 21, a user input receiver that receives an indication that a user has selected a portion of the displayed text description;

wherein the stacked bar graph window generator causes to be displayed a stacked bar graph that is traceable to the selected portion of the text description in accordance with the selection of the user.

30. A computer-aided circuit analysis tool for analyzing a text description of a digital system written in a circuit design language, comprising:

a parse generator generating a parse data structure stored in a memory, in accordance with the text description, the parse data structure including a parse node, wherein a portion of the text description refers to the parse node and the parse node refers to the portion of the text description;

a digital circuit representation generator generating a digital circuit representation, stored in the memory, the digital circuit representation synthesized from the parse data structure and including a plurality of circuit elements, at least one of the plurality of circuit elements referring to the parse node, wherein the parse node also refers to the at least one circuit element; and a path browser window display generator, causing at least one circuit element, along a first path through a digital circuit representation of the digital system, to be summarized such that only its input and output which are part of the first path are displayed.

31. The computer-aided circuit analysis tool of claim 30, wherein the digital circuit representation is a Gtech circuit representation.

32. The computer-aided circuit analysis tool of claim 30, wherein the digital circuit representation is a gate level circuit representation.

33. The computer-aided circuit analysis tool of claim 30, further comprising:

a text window display generator, causing a portion of the text description that is traceable to the digital circuit representation to be displayed with a predetermined physical property.

34. The computer-aided circuit analysis tool of claim 33, wherein the entire portion of the text description that is traceable to the digital circuit representation is displayed with the predetermined physical property.

35. The computer-aided circuit analysis tool of claim 33, further comprising:

a user input receiver that receives an indication that a user has selected a portion of the path browser summary;

wherein the text window display generator causes a portion of the text description that is traceable to the selected portion of the path browser summary to be displayed with a predetermined physical property in accordance with the user selection.

36. The computer-aided circuit analysis tool of claim 35, a user input receiver that receives an indication that a user has selected a portion of the displayed text description;

wherein the path browser window generator causes to be displayed a path browser summary that is traceable to the selected portion of the text description in accordance with the selection of the user.

37. The computer-aided circuit analysis tool of claim 30,
a user input receiver that receives an indication that a user has selected a portion of the path browser summary;
wherein the text window generator causes to be displayed a text summary that is traceable to the selected portion of the path browser summary in accordance with the selection of the user.

38. The computer-aided circuit analysis tool of claim 30, further comprising:
a user input receiver that receives an indication that a user has indicated a "start/end" path in the circuit representation; and
a text window display generator, causing a portion of the text description that is traceable to the start/end path to be displayed with a predetermined physical property.

39. A computer-aided circuit analysis tool for analyzing a text description of a digital system written in a circuit design language, comprising:
a parse generator generating a parse data structure stored in a memory system, in accordance with the text description the parse data structure including a parse node, wherein a portion of the text description refers to the parse node and the parse node refers to the portion of the text description;
a digital circuit representation generator generating a digital circuit representation, stored in the memory, the digital circuit representation synthesized from the parse data structure and including a circuit element, the circuit element referring to the parse node, wherein the parse node also refers to the circuit element; and
a virtual schematic window generator, causing a virtual schematic to be displayed on a display screen, the virtual schematic displaying the text of at least one of a fanin or fanout of a user-selected portion of the text description.

40. The computer-aided circuit analysis tool of claim 39, further comprising:
a text window display generator, causing a portion of the text description that is traceable to one of the fan ins and fanouts of the selection portion of the circuit representation to be displayed with a predetermined physical property.

41. The computer-aided circuit analysis tool of claim 40, wherein the entire portion of the text description that is traceable to the circuit representation is displayed with the predetermined physical property.

42. The computer-aided circuit analysis tool of claim 40, further comprising:
a user input receiver that receives an indication that a user has selected a displayed fanin or fanout;
wherein the text window display generator causes a portion of the text description that is traceable to the selected portion of the fanin or fanout to be displayed with a predetermined physical property in accordance with the user selection.

43. The computer-aided circuit analysis tool of claim 40,
a user input receiver that receives an indication that a user has selected a portion of the displayed text description;
wherein the virtual schematic window generator causes to be displayed a portion of the circuit representation, along with its fanins and fanouts that is traceable to the selected portion of the text description in accordance with the selection of the user.

44. A computer-aided circuit analysis tool for analyzing a text description of a digital system written in a circuit design language, comprising:

a memory storing;
a parse tree stored in a memory of the system, in accordance with the text description, the parse tree including a parse tree node, wherein a portion of the text description refers to the parse node and the parse node refers to the portion of the text description;
at least one digital circuit representation stored in the memory, the at least one digital circuit representation synthesized from the parse tree and including a circuit element the circuit element referring to the parse tree node, wherein the parse node also refers to the circuit element, the at least one circuit representation being stored in one or more different circuit domains;
a plurality of analysis tools each analysis tool capable of performing analysis on one or more of the circuit domains;
a plurality of display tools, each display tool capable of displaying data from one or more circuit domains;
a domain mapper, capable of mapping between ones of the plurality of circuit domains; and
a selection manager that informs the plurality of display tools when a user has selected a displayed element of the circuit representation within a one of the display tools.

45. The circuit analysis tool of claim 44, wherein one of the plurality of display tools is a display tool capable of displaying data from the at least one of the source domain and the circuit representation domain.

46. A computer-aided circuit analysis tool for analyzing a text description of a digital system written in a circuit design language, comprising:
a parse generator generating a parse data structure stored in a memory of the system, in accordance with the text description, the parse data structure including a parse node, wherein a portion of the text description refers to the parse node and the parse node refers to the portion of the text description;
a digital Gtech circuit representation generator generating a digital Gtech circuit representation stored in the memory, the digital Gtech circuit representation synthesized from the parse data structure and including a Gtech circuit element, the Gtech circuit element referring to the parse node, wherein the parse node also refers to the Gtech circuit element; and
wherein the Gtech circuit element, related to the portion of the text description, can be determined by following the reference from the portion of the text description to the parse node and the reference from the parse node to the Gtech circuit element.

47. A computer-aided circuit analysis tool for analyzing a text description of a digital system written in a circuit design language, comprising:
a parse generator generating a parse data structure stored in a memory, in accordance with the text description, the parse data structure including a parse node, wherein a portion of the text description refers to the parse node and the parse node refers to the portion of the text description;
a digital circuit representation generator generating a digital circuit representation stored in the memory, the digital circuit representation synthesized from the parse data structure and including a first circuit element, the first circuit element referring to the parse node, wherein the parse node also refers to the first circuit element; and wherein the first circuit element, related to the portion of the text description, can be determined by following the reference from the portion of the text description to the parse node and the reference from the parse node to the first circuit element.

48. The computer-aided circuit analysis tool of claim 47, wherein said circuit design language is Verilog.

49. The computer-aided circuit analysis tool of claim 47, wherein said circuit design language is VHDL.

50. The computer-aided circuit analysis tool of claim 47, further comprising:
   a numerical physical characteristic of said first circuit element, stored in the memory; and
   a computer window generator causing to be displayed a visual object linked to said parse node and having a visual display characteristic determined by said numerical physical characteristic.

51. The computer-aided circuit analysis tool of claim 50, wherein said first circuit element includes one or more circuit parts, with each circuit part possessing an area, and said numerical physical characteristic is the sum of the areas of said circuit parts.

52. The computer-aided circuit analysis tool of claim 50, wherein said first circuit element includes a circuit part input pin and a primary input, and said numerical physical characteristic is a time delay from said primary input to said circuit part pin.

53. The computer-aided circuit analysis tool of claim 50, wherein said visual object is a rectangle having a height, said visual display characteristic being said height.

54. The computer-aided circuit analysis tool of claim 50, wherein said visual object is a text character said visual display characteristic is a displayed font of said text character.

55. The computer-aided circuit analysis tool of claim 50, wherein said visual object is a text character and said visual display characteristic is a displayed color of said text character.

56. The computer-aided circuit analysis tool of claim 50, wherein said circuit design language is Verilog.

57. The computer-aided circuit analysis tool of claim 50, wherein said circuit design language is VHDL.

58. The computer-aided circuit analysis tool of claim 47, further comprising:
   a first display window generator causing to be displayed in a first display window, a first display object linked to said parse node; and
   a second display window generator, causing to be displayed in a second display window, a second display object linked to said first circuit element.

59. The computer-aided circuit analysis tool of claim 58, wherein said first display object includes a sequence of one or more characters from said text description; and
   wherein said sequence of characters includes a subsequence of characters related to said parse node in accordance with said circuit description language.

60. The computer-aided circuit analysis tool of claim 57, wherein
   said subsequence of characters is displayed with a visual characteristic distinct from the visual characteristic of said sequence of characters not included in said subsequence.

61. The computer-aided circuit analysis tool of claim 58, wherein said first display object includes a sequence of one or more characters from said text description related to said parse node in accordance with said circuit description language.

62. The computer-aided circuit analysis tool of claim 58, wherein said circuit design language is Verilog.

63. The computer-aided circuit analysis tool of claim 58, wherein said circuit design language is VHDL.

64. The tool of claim 47, further comprising:
   an optimizer that optimizes the digital circuit representation, yielding a mapped circuit representation stored in the memory, the mapped digital circuit representation including a second circuit element, the second circuit element referring to one of said parse node or said first circuit element, so that there is a traceable path between the second circuit element and the parse node.

65. The computer-aided circuit analysis tool of claim 64, wherein there is a traceable path between the second circuit element and the first circuit element.

\* \* \* \* \*